(12) United States Patent
Hwang et al.

(10) Patent No.: US 10,362,342 B2
(45) Date of Patent: Jul. 23, 2019

(54) BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

(71) Applicant: LG Electronics Inc., Seoul (KR)

(72) Inventors: Soojin Hwang, Seoul (KR); Jongyeul Suh, Seoul (KR); Sejin Oh, Seoul (KR); Hyunmook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/575,573

(22) PCT Filed: Jun. 14, 2016

(86) PCT No.: PCT/KR2016/006309
§ 371 (c)(1),
(2) Date: Nov. 20, 2017

(87) PCT Pub. No.: WO2016/204490
PCT Pub. Date: Dec. 22, 2016

(65) Prior Publication Data
US 2018/0139475 A1    May 17, 2018

Related U.S. Application Data

(60) Provisional application No. 62/186,382, filed on Jun. 30, 2015, provisional application No. 62/180,056, filed on Jun. 16, 2015.

(51) Int. Cl.
*H04N 7/01* (2006.01)
*H04N 21/235* (2011.01)
(Continued)

(52) U.S. Cl.
CPC .......... *H04N 21/2343* (2013.01); *H04N 7/01* (2013.01); *H04N 21/235* (2013.01);
(Continued)

(58) Field of Classification Search
CPC .... H04N 7/01; H04N 21/2362; H04N 7/0127; H04N 7/013; H04N 13/139
See application file for complete search history.

(56) References Cited

U.S. PATENT DOCUMENTS 8,374,246 B2 *   2/2013   Raveendran ......... H04N 19/139
                                                375/240.16
9,883,213 B2 *   1/2018   Roessler ............ H04N 21/6112
(Continued)

FOREIGN PATENT DOCUMENTS

| JP | 2014-082536 A | 5/2014 |
| KR | 10-2008-0111439 A | 12/2008 |
| KR | 10-2015-0040110 A | 4/2015 |
| KR | 10-2015-0057149 A | 5/2015 |

OTHER PUBLICATIONS

Li, et al.: "Comments on Field Indication SEI Message", XP030111825, Joint Collaborative Team on Video Coding (JCT-VC) of ITU-T SG16 WP3 and ISO/IEC JTC1/SC29/WG11, 9th Meeting, Geneva, CH, Apr. 27-May 7, 2012.

(Continued)

*Primary Examiner* — Nasser M Goodarzi
*Assistant Examiner* — Adil Ocak
(74) *Attorney, Agent, or Firm* — Dentons US LLP

(57) ABSTRACT

The present invention provides a broadcast signal transmission/reception method and device for pulled-down signal restoration. The broadcast signal transmission method according to one embodiment of the present invention comprises the steps of: pulling-down and reconstructing video data; encoding the reconstructed video data; encoding signaling information for the reconstructed video data; generating a broadcast signal including the encoded video data and the encoded signaling information; and transmitting the generated broadcast signal.

15 Claims, 43 Drawing Sheets

(51) Int. Cl.
*H04N 21/845* (2011.01)
*H04N 21/854* (2011.01)
*H04N 21/2343* (2011.01)
*H04N 21/2362* (2011.01)
*H04N 21/4402* (2011.01)

(52) U.S. Cl.
CPC . *H04N 21/2362* (2013.01); *H04N 21/234381* (2013.01); *H04N 21/440281* (2013.01); *H04N 21/8455* (2013.01); *H04N 21/85406* (2013.01)

(56) References Cited

U.S. PATENT DOCUMENTS

| | | | |
|---|---|---|---|
| 2009/0161009 A1 | 6/2009 | Glen | |
| 2010/0290537 A1* | 11/2010 | Moriyoshi | G11B 27/007 375/240.25 |
| 2011/0164115 A1* | 7/2011 | Bennett | G06F 3/14 348/46 |
| 2012/0148214 A1 | 6/2012 | Black | |
| 2013/0002946 A1* | 1/2013 | Chang | H04N 7/013 348/441 |
| 2017/0032504 A1* | 2/2017 | Lai | H04N 19/587 |
| 2017/0251284 A1* | 8/2017 | Chou | H04N 21/41407 |

OTHER PUBLICATIONS

Fogg, et al.: "Sequence Adaptive Filed/Frame metadata for field indication SEI", XP030054819, Joint Collaborative Team on Video Coding (JCT-VC) of ITU-T SG16 WP3 and ISO/IEC JTC1/SC29/WG11, 11th Meeting, Shanghai, CN, Oct. 10-19, 2012.

\* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1..999 |
|     @minorChannelNo | 0..1 | 1..999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
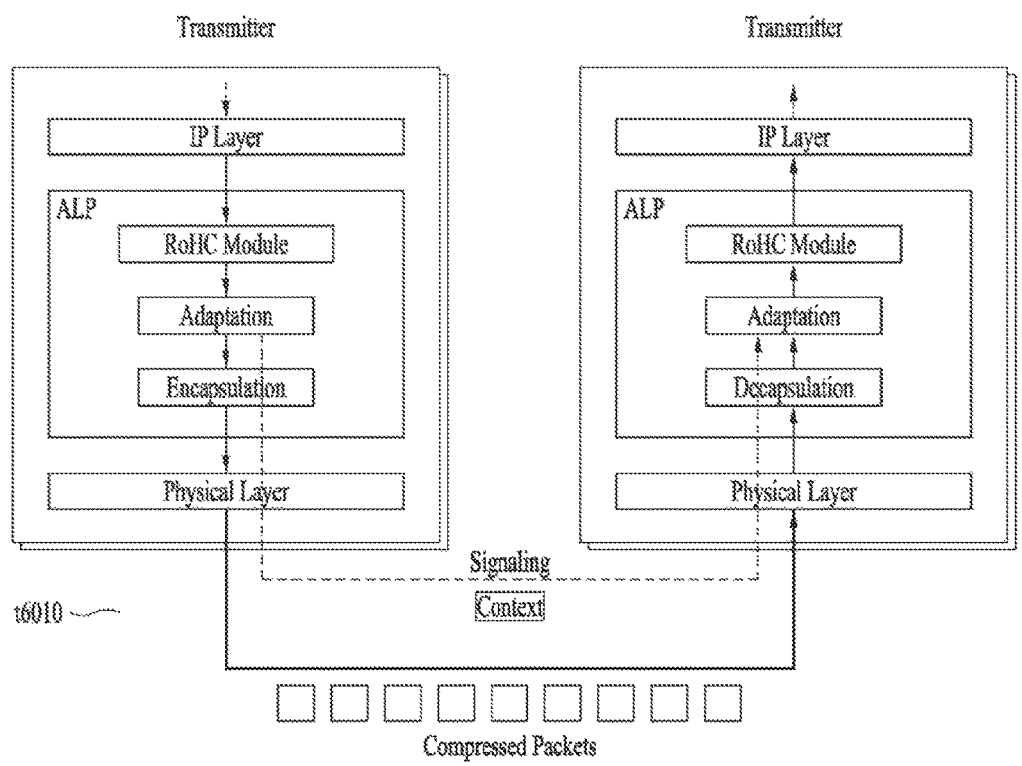
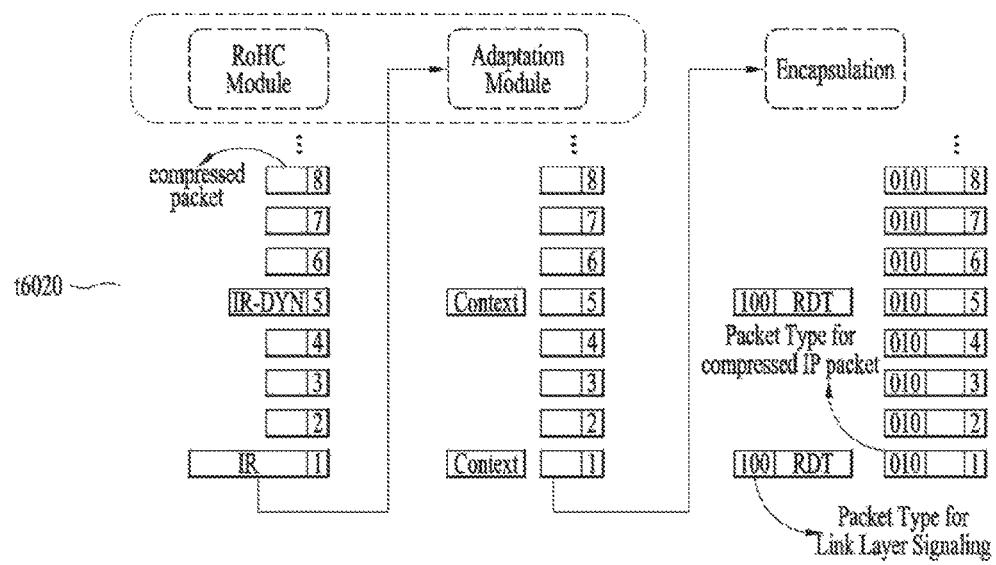

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i ++) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if (SID_flag == "1") { | | |
|          SID | 8 | uimsbf |
|       } | | |
|       if (compressed_flag == "1") { | | |
|          context_id | 8 | uimsbf |
|       } | | |
|    } | | |
| } | | |

| pull_down_info( payloadSize ) { | Descriptor |
|---|---|
| pull_down_type | u(3) |
| size_of_cadence | u(5) |
| start_of_cadence_flag | u(1) |
| pairing_mismatch_flag | u(1) |
| duplicate_flag | u(1) |
| reserved | u(5) |
| } | |

FIG. 25

| original_frame_info ( payloadSize ) { | Descriptor |
|---|---|
| frame_type | u(3) |
| duplicate_frame_flag | u(1) |
| start_of_cadence_flag | u(1) |
| end_of_cadence_flag | u(1) |
| original_frame_flag | u(1) |
| reserved | u(1) |
| } | |

D25010

| original_frame_info ( payloadSize ) { | Descriptor |
|---|---|
| frame_type | u(4) |
| start_of_cadence_flag | u(1) |
| end_of_cadence_flag | u(1) |
| original_frame_flag | u(1) |
| reserved | u(1) |
| } | |

D25020

| frame_type | |
|---|---|
| 0 | Frame doubling by duplicated |
| 1 | Frame doubling by interpolated |
| 2 | Frame tripling by duplicated |
| 3 | Frame tripling by interpolated |
| ... | ... |

```
aligned(8) class HFRConfigurationBox extends FullBox('hfrc', version=0, 0) {
    HFRConfiguration           hfr_cfg;
}
```

```
aligned(8) class HFRConfigurationBox (bit(24) hfr_flag=0){
    unsigned int(1)            SFR_compatibility;
    unsigned int(1)            HFR_SFR_transistion;
    unsigned int(1)            SFR_HFR_transistion;
    unsigned int(1)            HFR_type_transistion;
}
```

```
aligned(8) class PullDownRecoveryConfigurationBox extends FullBox('pdrc', version=0, 0) {
    PullDownRecoveryConfiguration           pull_down_recovery_cfg;
}
```

```
aligned(8) class PullDownRecoveryConfiguration (bit(24) pull_down_flag =0){
    unsigned int(8)            pull_down_type;
    unsigned int(32)           pull_down_start_transition;
    unsigned int(32)           pull_down_end_transition;
    unsigned int(32)           pull_down_type_transition;
    unsigned int(32)           original_frame_rate;
    unsigned int(1)            original_scan_type;
}
```

FIG. 30

```
aligned(8) class TrackHeaderBox extends FullBox('tkhd', version, flags){
    if (version==1) {
        unsigned int(64)        creation_time;
        unsigned int(64)        modification_time;
        unsigned int(32)        track_ID;
        const unsigned int(32)  reserved = 0;
        unsigned int(64)        duration;
    } else { // version==0
        unsigned int(32)        creation_time;
        unsigned int(32)        modification_time;
        unsigned int(32)        track_ID;
        const unsigned int(32)  reserved = 0;
        unsigned int(32)        duration;
    }
    const unsigned int(32)[2]   reserved = 0;
    template int(16)            layer = 0;
    template int(16)            alternate_group = 0;
    template int(16)            volume = {if track_is_audio 0x0100 else 0};
    const unsigned int(16)      reserved = 0;
    template int(32)[9]         matrix=
        { 0x00010000,0,0,0,0x00010000,0,0,0,0x40000000 };// unity matrix
    unsigned int(32)            width;
    unsigned int(32)            height;
    unsigned int(1)             hfr_flag;
    unsigned int(1)             pull_down_flag;
    unsigned int(6)             reserved=0;
    if(hfr_flag == 1){
        unsigned int(1)         SFR_compatibility;
        unsigned int(1)         HFR_SFR_transistion;
        unsigned int(1)         SFR_HFR_transistion;
        unsigned int(1)         HFR_type_transistion;
    }
    if(pull_down_flag == 1){
        unsigned int(8)         pull_down_type;
        unsigned int(32)        pull_down_start_transition;
        unsigned int(32)        pull_down_end_transition;
        unsigned int(32)        pull_down_type_transition;
        unsigned int(32)        original_frame_rate;
        unsigned int(1)         original_scan_type;
    }
}
```

FIG. 31

```
aligned(8) class TrackHeaderBox extends FullBox('tkhd', version, flags){
    if(version==1) {
        unsigned int(64)        creation_time;
        unsigned int(64)        modification_time;
        unsigned int(32)        track_ID;
        const unsigned int(32)  reserved = 0;
        unsigned int(64)        duration;
    } else { // version==0
        unsigned int(32)        creation_time;
        unsigned int(32)        modification_time;
        unsigned int(32)        track_ID;
        const unsigned int(32)  reserved = 0;
        unsigned int(32)        duration;
    }
        const unsigned int(32)[2]  reserved = 0;
        template int(16)        layer = 0;
        template int(16)        alternate_group = 0;
        template int(16)        volume = {if track_is_audio 0x0100 else 0};
        const unsigned int(16)  reserved = 0;
        template int(32)[9]     matrix=
        { 0x00010000,0,0,0,0x00010000,0,0,0,0x40000000 };// unity matrix
        unsigned int(32)        width;
        unsigned int(32)        height;
        unsigned int(1)         hfr_flag;
        unsigned int(1)         pull_down_flag;
        unsigned int(6)         reserved=0;
        if(hfr_flag ==1)
            HFRConfigurationBox  hfr_cfg;
        if(pull_down_flag ==1)
            PullDownRecoveryConfigurationBox   pull_down_recovery_cfg;
}
```

FIG. 32

```
aligned(8) class VideoMediaHeaderBox extends FullBox('vmhd', version = 0, 1) {
    template unsigned int(16)      graphicsmode = 0;
    // copy, see below
    unsigned int(1)                hfr_flag;
    unsigned int(1)                pull_down_flag;
    unsigned int(6)                reserved=0;
    if(hfr_flag == 1){
        unsigned int(1)            SFR_compatibility;
        unsigned int(1)            HFR_SFR_transistion;
        unsigned int(1)            SFR_HFR_transistion;
        unsigned int(1)            HFR_type_transistion;
    {
    if(pull_down_flag == 1){
        unsigned int(8)            pull_down_type;
        unsigned int(32)           pull_down_start_transition;
        unsigned int(32)           pull_down_end_transition;
        unsigned int(32)           pull_down_type_transition;
        unsigned int(32)           original_frame_rate;
        unsigned int(1)            original_scan_type;
    }
}
```

```
aligned(8) class VideoMediaHeaderBox extends FullBox('vmhd', version = 0, 1) {
template unsigned int(16)      graphicsmode = 0;
// copy, see below
    template unsigned int(16)[3]   opcolor = {0, 0, 0};
    unsigned int(1)                hfr_flag;
    unsigned int(1)                pull_down_flag;
    unsigned int(6)                reserved=0;
    if(hfr_flag ==1)
        HFRConfigurationBox        hfr_cfg;
    if(pull_down_flag ==1)
        PullDownRecoveryConfigurationBox    pull_down_recovery_cfg;
}
```

FIG. 33

```
aligned(8) class VideoMediaHeaderBox extends FullBox('vmhd', version = 0, 1) {
    unsigned int(32)            track_ID;
    unsigned int(32)            default_sample_description_index;
    unsigned int(32)            default_sample_duration;
    unsigned int(32)            default_sample_size;
    unsigned int(32)            default_sample_flags;
    unsigned int(1)             default_hfr_flag;
    unsigned int(1)             default_sample_hfr_flag;
    unsigned int(1)             default_pull_down_flag;
    unsigned int(1)             default_sample_pull_down_flag;
    unsigned int(4)             reserved=0;
    if(default_hfr_flag==1)
        HFRConfiguration        default_hfr_cfg;
    if(default_sample_hfr_flag==1)
        HFRConfiguration        default_sample_hfr_cfg;
    if(default_pull_down_flag==1)
        PullDownRecoveryConfigurationBox        default_pull_down_recovery_cfg;
    if(default_sample_pull_down_flag==1)
        PullDownRecoveryConfigurationBox        default_sample_pull_down_recovery_cfg; }
}
```

FIG. 34

```
aligned(8) class TrackFragmentHeaderBoxextends FullBox('tfhd', 0, tf_flags){
    unsigned int(32)            track_ID;
    unsigned int(1)             hfr_flag;
    unsigned int(1)             pull_down_flag;
    unsigned int(6)             reserved=0;
    if(hfr_flag== 1){
        unsigned int(1)         SFR_compatibility;
        unsigned int(1)         HFR_SFR_transistion;
        unsigned int(1)         SFR_HFR_transistion;
        unsigned int(1)         HFR_type_transistion;
    }
    if(pull_down_flag== 1){
        unsigned int(8)pull_down_type;
        unsigned int(32)pull_down_start_transition;
        unsigned int(32)pull_down_end_transition;
        unsigned int(32)pull_down_type_transition;
        unsigned int(32)original_frame_rate;
        unsigned int(1) original_scan_type;
    }
    // all the following are optional fields
    unsigned int(64)base_data_offset;
    unsigned int(32)sample_description_index;
    unsigned int(32)default_sample_duration;
    unsigned int(32)default_sample_size;
    unsigned int(32)default_sample_flags;
}
```

```
aligned(8) class TrackFragmentHeaderBoxextends FullBox('tfhd', 0, tf_flags){
    unsigned int(32)            track_ID;
    unsigned int(1)             hfr_flag;
    unsigned int(1)             pull_down_flag;
    unsigned int(6)             reserved=0;
    if(hfr_flag==1)
        HFRConfiguration        hfr_cfg;
    if(pull_down_flag==1)
        PullDownRecoveryConfigurationBox      pull_down_recovery_cfg;
    // all the following are optional fields
    unsigned int(64)            base_data_offset;
    unsigned int(32)            sample_description_index;
    unsigned int(32)            default_sample_duration;
    unsigned int(32)            default_sample_size;
    unsigned int(32)            default_sample_flags;
}
```

FIG. 35

```
aligned(8) class TrackFragmentHeaderBoxextends FullBox('tfhd', 0,tf_flags){
    unsigned int(32)           track_ID;
    // all the following are optional fields
    unsigned int(64)           base_data_offset;
    unsigned int(32)           sample_description_index;
    unsigned int(32)           default_sample_duration;
    unsigned int(32)           default_sample_size;
    unsigned int(32)           default_sample_flags;
    HFRConfigurationBox        default_sample_hfr_cfg;
}
```

```
aligned(8) class TrackFragmentHeaderBoxextends FullBox('tfhd', 0,tf_flags){
    unsigned int(32)           track_ID;
    // all the following are optional fields
    unsigned int(64)           base_data_offset;
    unsigned int(32)           sample_description_index;
    unsigned int(32)           default_sample_duration;
    unsigned int(32)           default_sample_size;
    unsigned int(32)           default_sample_flags;
    PullDownRecoveryConfigurationBox   default_sample_pull_down_recovery_cfg;
}
```

The following flags are defined in the tf_flags:
s0x000001    base-data-offset-present;
0x000002    sample-description-index-present;
0x000008    default-sample-duration-present
0x000010    default-sample-size-present
0x000020    default-sample-flags-present
0x010000    duration-is-empty .
0x020000    default-base-is-moof;
0x100000    default-sample-hfr-configuration-present;
0x200000    default-sample-pull-down-recovery-configuration-present;

FIG. 36

```
aligned(8) class TrackRunBox extends FullBox('trun', version, tr_flags) {
    unsigned int(32)    sample_count;
    unsigned int(1)     hfr_flag;
    unsigned int(1)     pull_down_flag;
    unsigned int(6)     reserved=0;
    if(hfr_flag == 1){
        unsigned int(1)     SFR_compatibility;
        unsigned int(1)     HFR_SFR_transition;
        unsigned int(1)     SFR_HFR_transition;
        unsigned int(1)     HFR_type_transition;
    }
    if(pull_down_flag == 1){
        unsigned int(8)     pull_down_type;
        unsigned int(32)    pull_down_start_transition;
        unsigned int(32)    pull_down_end_transition;
        unsigned int(32)    pull_down_type_transition;
        unsigned int(32)    original_frame_rate;
        unsigned int(1)     original_scan_type;
    }
    // the following are optional fields
    signed int(32)      data_offset;
    unsigned int(32)    first_sample_flags;
    // all fields in the following array are optional
    {
        unsigned int(32)    sample_duration;
        unsigned int(32)    sample_size;
        unsigned int(32)    sample_flags;
        if(version == 0)
        {
            unsigned int(32)    sample_composition_time_offset;
        }else {
            signed int(32)      sample_composition_time_offset;
        }
    }[ sample_count ]
}
```

```
aligned(8) class TrackRunBox extends FullBox('trun', version, tr_flags) {
    unsigned int(32)    sample_count;
    unsigned int(1)     hfr_flag;
    unsigned int(1)     pull_down_flag;
    unsigned int(6)     reserved=0;
    if(hfr_flag == 1){
        HFRConfigurationBox     hfr_cfg;
    }
    if(pull_down_flag == 1)
        PullDownRecoveryConfigurationBox    pull_down_recovery_cfg;
    // the following are optional fields
    signed int(32)      data_offset;
    unsigned int(32)    first_sample_flags;
    // all fields in the following array are optional
    {
        unsigned int(32)    sample_duration;
        unsigned int(32)    sample_size;
        unsigned int(32)    sample_flags;
        if(version == 0)
        {
            unsigned int(32)    sample_composition_time_offset;
        }else {
            signed int(32)      sample_composition_time_offset;
        }
    }[ sample_count ]
}
```

FIG. 37

```
The following flags are defined in the tr_flags:
0x000001    data-offset-present.
0x000004    first-sample-flags-present;
0x000100    sample-duration-present:
0x000200    sample-size-present;
0x000400    sample-flags-present;
0x000800    sample-composition-time-offsets-present;
0x001000    sample-hfr-configuration-present;
0x002000    hfr-configuration-present;
0x004000    sample-pull-down-recovery-configuration-present;
0x008000    pull-down-recovery-configuration-present;
```

```
aligned(8) class TrackFragmentHeaderBox extends FullBox('trun', version, tr_flags) {
    unsigned int(32)    sample_count;
    // the following are optional fields
    signed int(32)      data_offset;
    unsigned int(32)    first_sample_flags;
    HFRConfigurationBox hfr_cfg;
    // all fields in the following array are optional
    {
        unsigned int(32)    sample_duration;
        unsigned int(32)    sample_size;
        unsigned int(32)    sample_flags;
        if (version == 0)
        {
            unsigned int(32) sample_composition_time_offset;
        } else {
            signed int(32)   sample_composition_time_offset;
        }
    }[ sample_count ]
}
```

```
aligned(8) class TrackFragmentHeaderBox extends FullBox('trun', version, tr_flags) {
    unsigned int(32)    sample_count;
    // the following are optional fields
    signed int(32)      data_offset;
    unsigned int(32)    first_sample_flags;
    // all fields in the following array are optional
    {
        unsigned int(32)    sample_duration;
        unsigned int(32)    sample_size;
        unsigned int(32)    sample_flags;
        if (version == 0)
        {
            unsigned int(32) sample_composition_time_offset;
        } else {
            signed int(32)   sample_composition_time_offset;
        }
        HFRConfigurationBox  sample_hfr_cfg;
    }[ sample_count ]
}
```

FIG. 38

```
aligned(8) class TrackFragmentHeaderBox extends FullBox('trun', version, tr_flags) {
    unsigned int(32)     sample_count;
    // the following are optional fields
    signed int(32)       data_offset;
      unsigned int(32)     first_sample_flags;
      PullDownRecoveryConfigurationBoxpull_down_recovery_cfg;
    // all fields in the following array are optional
    {
      unsigned int(32)    sample_duration;
      unsigned int(32)    sample_size;
      unsigned int(32)    sample_flags;
      if (version == 0)
      {
        unsigned int(32)  sample_composition_time_offset;
      }else {
        signed int(32)    sample_composition_time_offset;
      }
    }[ sample_count ]
}
```

```
aligned(8) class TrackFragmentHeaderBox extends FullBox('trun', version, tr_flags) {
    unsigned int(32)     sample_count;
    // the following are optional fields
    signed int(32)       data_offset;
    unsigned int(32)     first_sample_flags;
    // all fields in the following array are optional
    {
      unsigned int(32)    sample_duration;
      unsigned int(32)    sample_size;
      unsigned int(32)    sample_flags;
      if (version == 0)
      {
        unsigned int(32)  sample_composition_time_offset;
      }else {
        signed int(32)    sample_composition_time_offset;
      }
      PullDownReocoveryConfigurationBox    sample_pull_down_recovery_cfg;
    }[ sample_count ]
}
```

FIG. 39

```
unsigned int(1)  hfr_flag;
unsigned int(1)  SFR_compatibility_flag;
unsigned int(1)  pull_down_flag;
unsigned int(1)  pull_down_transition_flag;
unsigned int(2)  is_leading;
unsigned int(2)  sample_depends_on;
unsigned int(2)  sample_is_depended_on;
unsigned int(2)  sample_has_redundancy;
bit(3)           sample_padding_value;
bit(1)           sample_is_non_sync_sample;
unsigned int(16) sample_degradation_priority;
```

```
unsigned int(1)  class VisualSampleGroupEntry (unsigned int(32) grouping_type) extends SampleGroupEntry (grouping_type)
    unsigned int(1)     hfr_flag;
    unsigned int(1)     pull_down_flag;
    unsigned int(6)     reserved=0;
    if(hfr_flag == 1){
        unsigned int(1)     SFR_compatibility;
        unsigned int(1)     HFR_SFR_transition;
        unsigned int(1)     SFR_HFR_transition;
        unsigned int(1)     HFR_type_transition;
    }
    if(pull_down_flag == 1){
        unsigned int(8)     pull_down_type;
        unsigned int(32)    pull_down_start_transition;
        unsigned int(32)    pull_down_end_transition;
        unsigned int(32)    pull_down_type_transition;
        unsigned int(32)    original_frame_rate;
        unsigned int(1)     original_scan_type;
    }
}
```

```
class VisualSampleGroupEntry (unsigned int(32) grouping_type) extends SampleGroupEntry (grouping_type)
    unsigned int(1)     hfr_flag;
    unsigned int(1)     pull_down_flag;
    unsigned int(6)     reserved=0;
    if(hfr_flag ==1)
        HFRConfigurationBox     hfr_cfg;
    if(pull_down_flag ==1)
        PullDownRecoveryConfigurationBox    pull_down_recovery_cfg;
}
```

FIG. 40

```
class VisualSampleEntry(codingname) extends SampleEntry(codingname){
    unsigned int(16) pre_defined = 0;
    const unsigned int(16) reserved = 0;
    unsigned int(32)[3]       pre_defined = 0;
    unsigned int(16)          width;
    unsigned int(16)          height;
    template unsigned int(32) horizresolution = 0x00480000; // 72 dpi
    template unsigned int(32) vertresolution = 0x00480000;  // 72 dpi
    const unsigned int(32) reserved = 0;
    template unsigned int(16) frame_count = 1;
    string[32]    compressorname;
    template unsigned int(16) depth = 0x0018;
    int(16)       pre_defined = -1;
    // other boxes from derived specifications
    CleanApertureBox          clap;// optional
    PixelAspectRatioBox       pasp;// optional
    unsigned int(1)           hfr_flag;
    unsigned int(1)           pull_down_flag;
    unsigned int(6)           reserved=0;
    if(hfr_flag == 1){
        unsigned int(1)       SFR_compatibility;
        unsigned int(1)       HFR_SFR_transition;
        unsigned int(1)       SFR_HFR_transition;
        unsigned int(1)       HFR_type_transition;
    }
    if(pull_down_flag == 1){
        unsigned int(8)       pull_down_type;
        unsigned int(32)      pull_down_start_transition;
        unsigned int(32)      pull_down_end_transition;
        unsigned int(32)      pull_down_type_transition;
        unsigned int(32)      original_frame_rate;
        unsigned int(1)       original_scan_type;
    }
}
```

```
class VisualSampleEntry(codingname) extends SampleEntry (codingname){
    unsigned int(16) pre_defined = 0;
    const unsigned int(16) reserved = 0;
    unsigned int(32)[3]       pre_defined = 0;
    unsigned int(16)          width;
    unsigned int(16)          height;
    template unsigned int(32) horizresolution = 0x00480000; // 72 dpi
    template unsigned int(32) vertresolution = 0x00480000;  // 72 dpi
    const unsigned int(32) reserved = 0;
    template unsigned int(16) frame_count = 1;
    string[32]    compressorname;
    template unsigned int(16) depth = 0x0018;
    int(16)       pre_defined = -1;
    // other boxes from derived specifications
    CleanApertureBox          clap;// optional
    PixelAspectRatioBox       pasp;// optional
    unsigned int(1)           hfr_flag;
    unsigned int(1)           pull_down_flag;
    unsigned int(6)           reserved=0;
    if(hfr_flag == 1){
        HFRConfigurationBox   hfr_cfg;
    }
    if(pull_down_flag ==1){
        PullDownRecoveryConfigurationBox    pull_down_recovery_cfg;
    }
}
```

FIG. 41

```
class HEVCSampleEntry() extends VisualSampleEntry ('hvc1' or 'hev1'){
    HEVCConfigurationBox config;
    HFRConfigurationBox hfr_cfg;//optional
    PullDownRecoveryConfigurationBox pull_down_recovery_cfg;//optional
    MPEG4BitRateBox (); // optional
    MPEG4ExtensionDescriptorsBox (); // optional
    extra_boxes boxes; // optional
}
```

```
class HEVCConfigurationBox extends Box('hvcC') {
    HEVCDecoderConfigurationRecord() HEVCConfig;
    HFRConfigurationBox hfr_cfg;//optional
    PullDownRecoveryConfigurationBox    pull_down_recovery_cfg;//optional
}
```

```
aligned(8) class HEVCDecoderConfigurationRecord {
    unsigned int(8) configurationVersion = 1;
    unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc;
    bit(2) reserved = '11'b;
    bit(1)       hfr_flag;
    bit(1)       pull_down_flag;
    unsigned int(12) min_spatial_segmentation_idc;
    bit(6) reserved = '111111'b;
    unsigned int(2) parallelismType;
    bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(2) constantFrameRate;
    bit(3) numTemporalLayers;
    bit(1) temporalIdNested;
    unsigned int(2) lengthSizeMinusOne;
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
    if(hfr_flag ==1){
        HFRConfigurationBox     hfr_cfg;
    }
    if(pull_down_flag ==1){
        PullDownRecoveryConfigurationBox    pull_down_recovery_cfg;
    }
}
```

FIG. 42

```
class HFRInformationSEIBox extends Box('hisb', size)
{
    unsigned int(8*size-64)      hfrinfosei;
}
```
~D42010

```
class PullDownRecoveryInfoSEIBox extends Box('pdri', size)
{
    unsigned int(8*size-64)      pdrinfosei;
}
```
~D42020

```
class VisualSampleEntry(codingname) extends SampleEntry (codingname){
    unsigned int(16) pre_defined = 0;
    const unsigned int(16) reserved = 0;
    unsigned int(32)[3]          pre_defined = 0;
    unsigned int(16)             width;
    unsigned int(16)             height;
    template unsigned int(32)    horizresolution = 0x00480000;   // 72 dpi
    template unsigned int(32)    vertresolution  = 0x00480000;   // 72 dpi
    const unsigned int(32) reserved = 0;
    template unsigned int(16)    frame_count = 1;
    string[32]     compressorname;
    template unsigned int(16)    depth = 0x0018;
    int(16)        pre_defined = -1;
    // other boxes from derived specifications
    CleanApertureBox             clap;// optional
    PixelAspectRatioBox          pasp;// optional
    HFRInformationSEIBox         hfr_sei; // optional
    PullDownRecoveryInfoSEIBox   pull_down_recovery_sei; // optional
}
```
~D42030

```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    extra_boxes boxes; // optional
} class HEVCConfigurationBox extends Box('hvcC') {
    HEVCDecoderConfigurationRecord() HEVCConfig;
    HFRInformationSEIBox         hfr_sei; // optional
    PullDownRecoveryInfoSEIBox   pull_down_recovery_sei; // optional
}
```
~D42040

```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
        HFRInformationSEIBox       hfr_sei; // optional
        PullDownRecoveryInfoSEIBox pull_down_recovery_sei; // optional
        extra_boxes boxes; // optional
}
```
~D42050

BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

This application is a National Stage Application of International Application No. PCT/KR2016/006309 filed on Jun. 14, 2016, and claims priority to U.S. Provisional Application No. 62/180,056 filed on Jun. 16, 2015, and U.S. Provisional Application No. 62/186,382 filed on Jun. 30, 2015, all of which are hereby incorporated by reference in their entireties as if fully set forth herein.

TECHNICAL FIELD

The present invention relates to a broadcast signal transmission device, a broadcast signal reception device, and a broadcast signal transceiving method.

BACKGROUND ART

A moving video called a moving photo may be categorized into two types of TV video and theater screening video in shooting and production. First of all, in case of the theater screening video taken using a film, typical still photos are taken continuously and then displayed in accordance with a time sequence. In this case, it is easily noted that each cut of the video becomes a still video. However, since the video broadcasted through TV includes two fields not a whole photo of one cut, these fields should be combined with each other to allow a user to see a whole photo. In this case, various reasons may exist. Since TV transmission technique and performance of the cathode ray tube are not good in the early stage, a very short time for emitting light by stimulating a fluorescent material through a cathode ray is big reason. In case of NTSC scheme, since 30 sheets of frames (29.97 fps) are required for 1 second, the video should remain on the cathode ray tube for at least ⅟₃₀ seconds or more until next frame is displayed after one frame is displayed. However, since the cathode ray tube of the early stage does not support this technique, an expedient method for splitting one frame into two fields and interlacing them is used. In this way, the video could be transmitted by a cathode ray tube and transmission scheme of low performance. However, a drawback occurs in that movement of fast scene or complex video cannot be displayed in detail. This interlace scan scheme has been applied to most of TVs up to now, and most of all videos have been shot, edited and broadcasted in accordance with the interlace scan scheme. Meanwhile, the theater screening video shot by a film is displayed by 24 sheets of images (24 fps) per second progressive in due order, wherein the 24 frames indicate a sheet of photo which is not split. Therefore, the theater screening video has advantages in that a clearer image may be displayed and details are not lost even in case of fast movement.

There are a progressive scan scheme and an interlace scan scheme. A main example of the progressive scan scheme may include computer monitor or digital TV such as PDP or LCD. This progressive scan scheme displays all horizontal lines of video in one frame at one time. On the other hand, TV currently used by most of people displays only half of a horizontal line in one image frame when displaying one image regardless of NTSC scheme or PAL scheme. This scheme will be referred to as the interlace scan scheme. That is, the interlace scan scheme displays an image on a screen by splitting one frame into two fields (top/bottom, upper/lower/odd/even, etc.) and alternately displaying the fields in due order.

One of those most closely related to a 3:2 pulldown progressive scan scheme is a movie produced by a film. This is because that an original source of most of all DVD movie titles recently released is a movie produced by a film. Unlike NTSC TV, a movie is produced by 24 frames per second. DVD may be produced directly by original image of 24 frames in the same manner as original movie. However, since most of display equipments such as TV currently used are interlace type equipments, DVD should practically be produced by the interlace scan scheme in accordance with such an interface. At this time, a task for switching a film of 24 frames to a video of 60 fields will be referred to as 3:3 pulldown or telecine. This may be summarized in such a manner that five video frames are produced by four films by adding one field per two film frames. 3:2 pulldown means that three fields are made by a first frame and two fields are made by a second frame.

Recently, in accordance with the development of display technology, a progressive type display device has appeared and, accordingly, studies of a method for restoring 3:2 pulled-down video are required. In addition, a frame rate may be changed in a service and, thus, studies of signaling information therefor are also required.

DISCLOSURE

Technical Problem

A digital broadcast system may provide an ultra high definition (UHD) image, multi channel audio, and various additional services. However, for digital broadcast, network flexibility in consideration of transmission efficiency of a large amount of data, robustness of a transceiving network, and a mobile reception device needs to be enhanced.

An object of the present invention devised to solve the problem lies in a method of restoring a pull-downed signal.

An object of the present invention devised to solve the problem lies in a method of signaling a pull-downed signal.

An object of the present invention devised to solve the problem lies in a method of restoring a frame rate change-encoded signal.

An object of the present invention devised to solve the problem lies in a method of signaling a frame rate change-encoded signal.

An object of the present invention devised to solve the problem lies in a method of transmitting signaling information of a high frame rate and pulled-down broadcast signal.

Technical Solution

The object of the present invention can be achieved by providing a method of transmitting a broadcast signal, the method including changing a frame rate of video data and encoding the video data, encoding signaling information for the video data with the changed frame rate, generating a broadcast signal including the encoded video data and the encoded signaling information, and transmitting the generated broadcast signal.

The changing of the frame rate of the video data may include repeating or interpolating frames included in the video data.

The signaling information may include information indicating whether the duplicated frames included in the video data with the changed frame rate are repeated or interpolated.

The signaling information may include information indicating a frame matched with a frame included in the video data prior to change in a frame rate among frames included in the video data with the changed frame rate.

The signaling information may include frame rate information and the frame rate information may be included in the encoded video data and may be transmitted.

The signaling information may include frame rate information, the frame rate information may include information on an original frame rate prior to change in the frame rate, and the signaling information may be transmitted as separate signaling data of the video data.

The signaling information may be included in as an SEI message of the encoded video data and may be transmitted therewith.

In another aspect of the present invention, provided herein is a method of receiving a broadcast signal, the method including receiving a broadcast signal including video data with a changed frame rate compared with original video data and signaling information for the video data with the changed frame rate, extracting the video data with the changed frame rate and the signaling information from the received broadcast signal, and decoding the video data with the changed frame rate using the extracted signaling information.

The decoding of the extracted video data with the changed frame rate may include selecting frames matched with frames included in the original video data among frames included in the video data.

The signaling information may include information indicating whether duplicated frames included in the video data with the changed frame rate are generated via repetition or interpolation.

The signaling information may include information indicating whether a frame matched with a frame included in the original video data among frames included in the video data with the changed frame rate.

The signaling information may include frame rate information, the frame rate information is included in the encoded video data and is received, and the method may further include converting the video data with the changed frame rate into a frame rate of the original video data.

The signaling information may include frame rate information, the frame rate information may include information on an original frame rate prior to change in the frame rate, and the signaling information may be received as separate signaling data of the video data.

The video data may be encoded as ISOBMFF, the signaling information may be included in the video data encoded as the ISOBMFF and may be transmitted therewith, and the signaling information may further include information on conversion of the frame rate and information of compatibility of the frame rate.

In another aspect of the present invention, provided herein is a broadcast signal transmission device including a video encoder configured to change a frame rate of video data and to encode the video data, a signaling encoder configured to encode signaling information for the video data with the changed frame rate, and a transmitter configured to transmit a broadcast signal including the encoded video data and the encoded signaling information.

In another aspect of the present invention, provided herein is a broadcast signal reception device including a receiver configured to receive a broadcast signal including video data with a changed frame rate compared with original video data and signaling information for the video data with the changed frame rate, an extractor configured to extract the video data with the changed frame rate and the signaling information from the received broadcast signal, and a decoder configured to decode the video data with the changed frame rate using the extracted signaling information.

Advantageous Effects

The present invention may provide a method of restoring a frame rate change-encoded signal.

The present invention may provide a signaling method of restoring a frame rate change-encoded signal.

The present invention may provide a method of defining and storing high frame rate (HRF) and pulled-down information in a media file and transmitting the information.

The method according to the present invention may effectively store and transmit high frame rate (HRF) and pulled-down information. The present invention may propose an effective signaling method when high frame rate (HRF) and pulled-down information of a video sample is changed in a video sample or track fragment unit.

The method according to the present invention may effectively signal high frame rate (HRF) and pulled-down information for each level. The method according to the present invention may provide excellent compatibility in various storage and transmission systems using a corresponding media file format.

DESCRIPTION OF DRAWINGS

The accompanying drawings, which are included to provide a further understanding of the invention, illustrate embodiments of the invention and together with the description serve to explain the principle of the invention.

In the drawings:

FIG. 3 is a diagram showing a low level signaling (LLS) table and a service list table (SLT) according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 9 is a writing operation of a time interleaver according to an embodiment of the present invention;

FIG. 17 is a diagram illustrating a configuration of pull_down_info according to one embodiment of the present invention;

FIG. 25 is a diagram showing frame marking information according to an embodiment of the present invention;

FIG. 29 is a diagram showing a configuration box for providing a frame rate related parameter according to an embodiment of the present invention;

FIG. 30 is a diagram showing a method of defining frame rate information in a tkhd box according to an embodiment of the present invention;

FIG. 31 is a diagram showing a method of adding a HFR configuration box and a pull down recovery configuration box including frame rate related information to a track header box according to an embodiment of the present invention;

FIG. 32 is a diagram showing a method of defining frame rate related information in a video media header (vmhd) box according to an embodiment of the present invention;

FIG. 33 is a diagram showing a method of defining frame rate information in a trex box according to an embodiment of the present invention;

FIG. 34 is a diagram showing a method of defining frame rate information in a track fragment header (tfhd) box according to an embodiment of the present invention;

FIG. 35 is a diagram showing a method of defining frame rate information in a (track fragment header (tfhd) box according to an embodiment of the present invention;

FIG. 36 is a diagram showing a method of defining frame rate information in a track run (trun) box according to an embodiment of the present invention;

FIGS. 37 and 38 are diagrams showing a method of defining frame rate information in a track run (trun) box according to another embodiment of the present invention;

FIG. 39 is a diagram showing a method of defining frame rate information in various flags or sample group entries according to an embodiment of the present invention;

FIG. 40 is a diagram showing a method of defining frame rate information in a visual sample entry according to an embodiment of the present invention;

FIG. 41 is a diagram showing a method of defining frame rate information in an HEVC sample entry, an HEVC configuration box, or an HEVC decoder configuration record according to an embodiment of the present invention;

FIG. 42 is a diagram illustrating a method of defining a frame rate information SEI box and storing/transmitting frame rate information according to an embodiment of the present invention;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
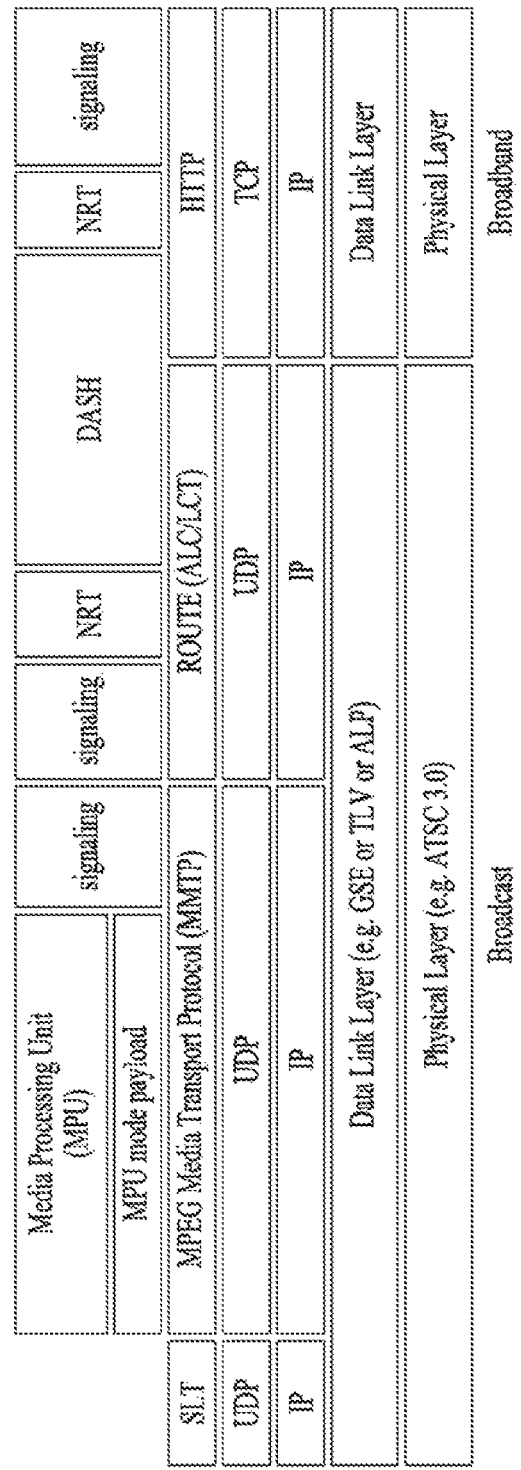
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
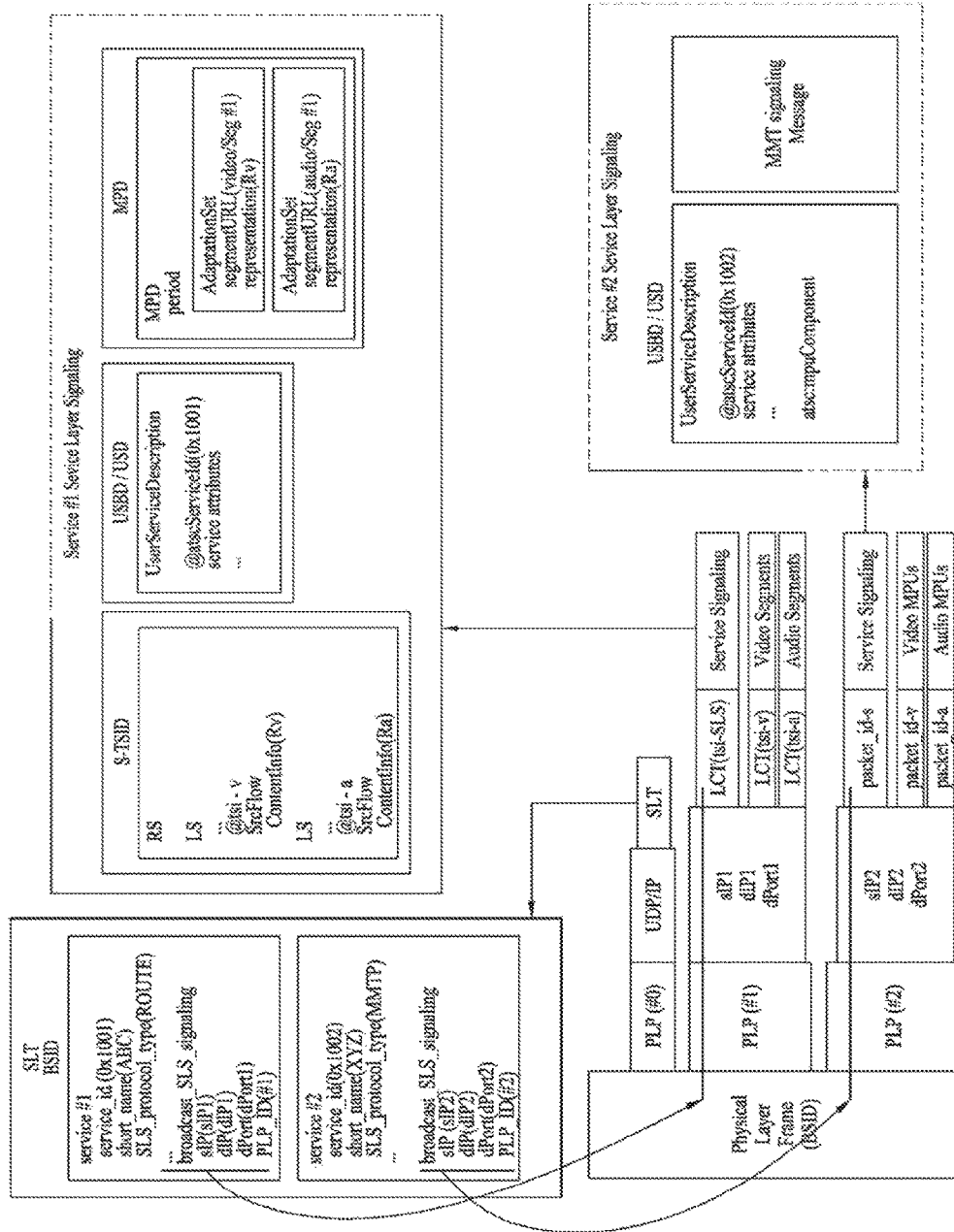
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minozChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

Figure 4:
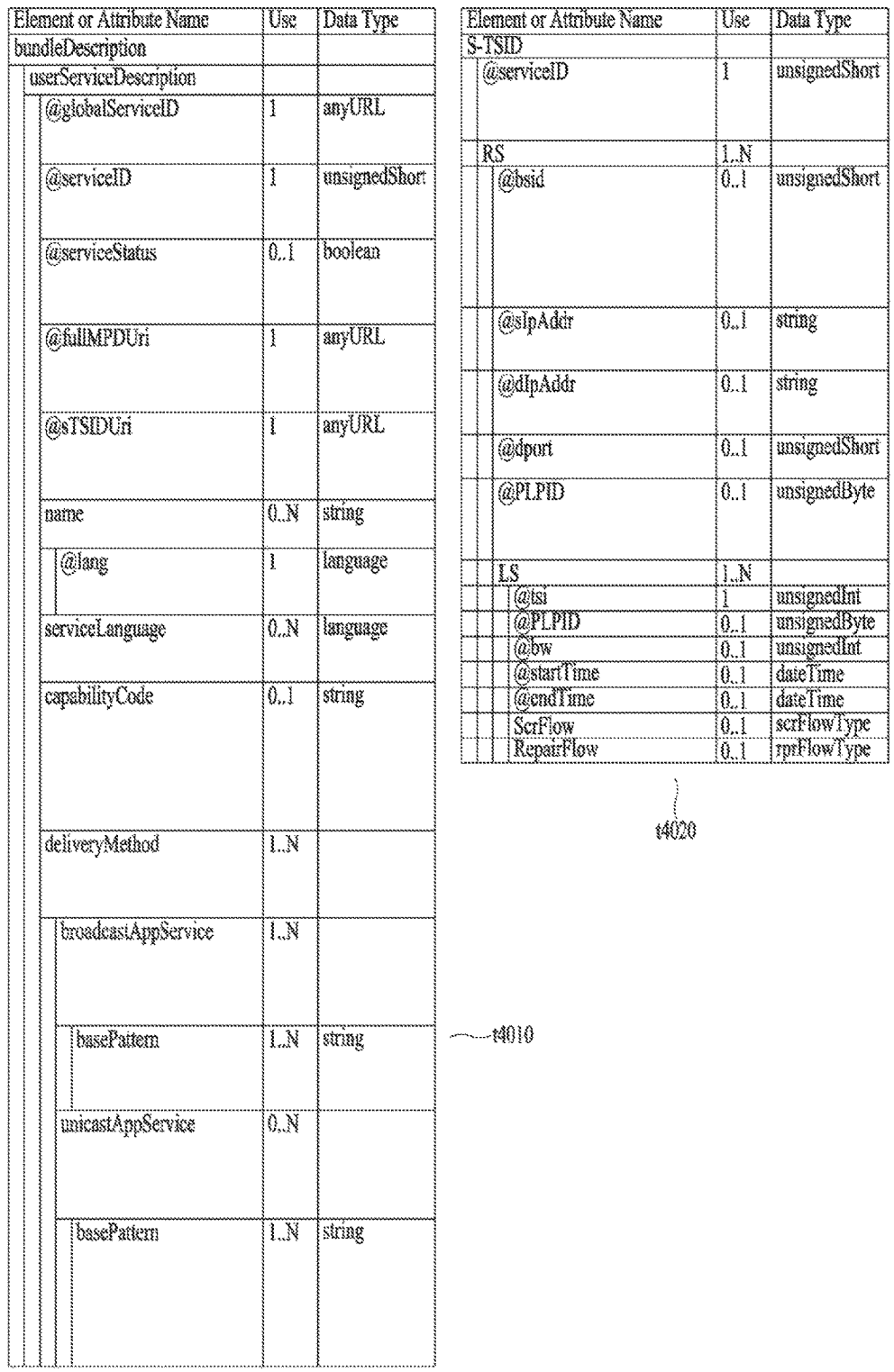
FIG. 4 is a diagram showing a USBD and an S-TSID delivered through ROUTE according to one embodiment of the present invention.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquring the signaling information, the receiver may combine the information to acquire mapping of service—IP information—context information—PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted together using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
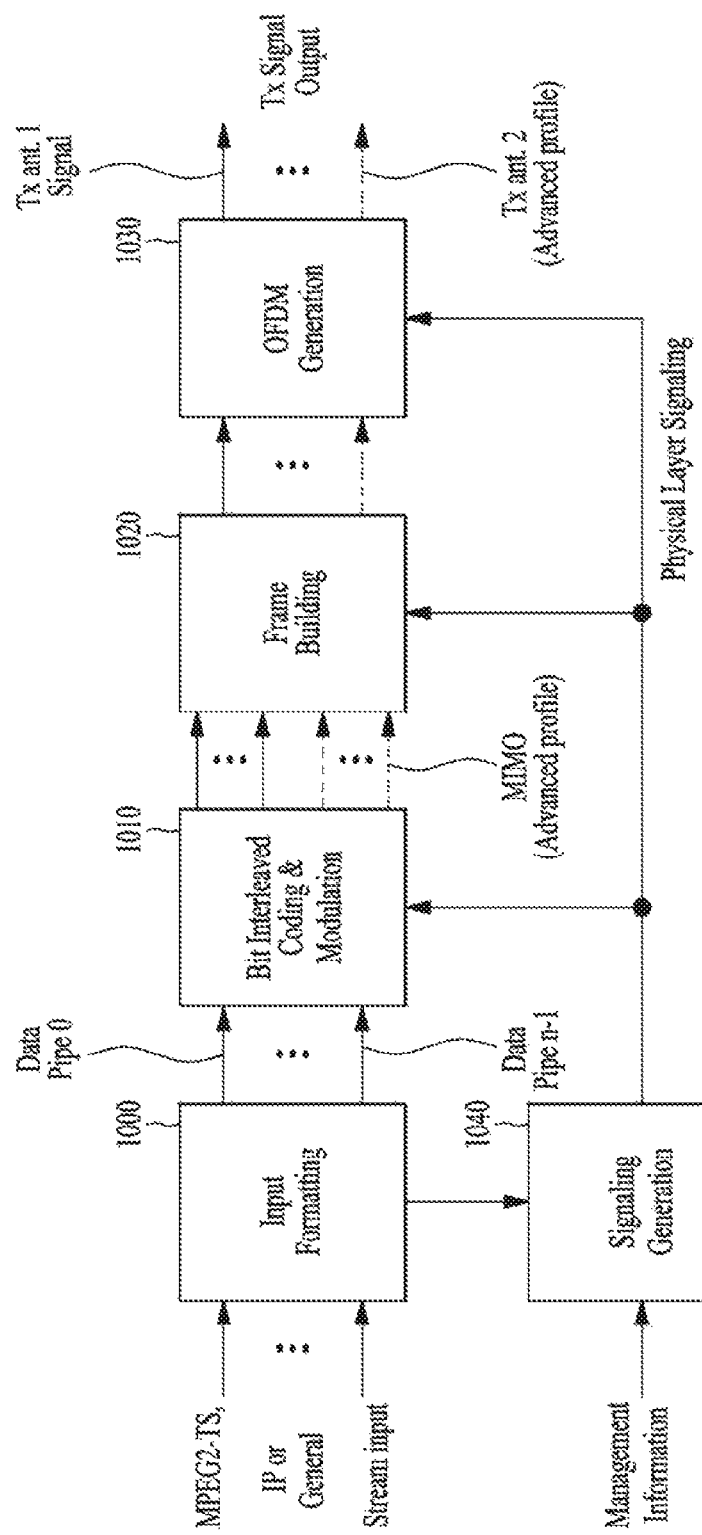
FIG. 8 is a diagram showing a structure of a broadcast signal transmission device of a next-generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM block to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC). The external coding (BCH) may be a selective coding method. The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUQ has an arbitrary type but QAM-16 and NUQ have a square shape. All of the NUQ and the NUC may be particularly defined with respect to each code rate and signaled by parameter DP_MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interlever according to the present invention may selectively use a convolution interleaver (CI) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (CI). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs, NUQ $e_{1,i}$ and $e_{2,i}$ is input to a MIMO encoder, a pair of MIMO encoder outputs, g1,i and g2,i may be transmitted by the same carrier k and OFDM symbol 1 of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data. The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS1 data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC_FLAG information. A fast information channel (FIC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FIC may be provided in the current frame. When a value of the corresponding field is set to 0, the FIC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS1 data and PLS2 data, and the constellation mapper may map the bit-interleaved PLS1 data and PLS2 data to constellation.

A broadcast signal reception device of a next-generation broadcast service according to an embodiment of the present invention may perform a reverse operation of the broadcast signal transmission device of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into bit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_1$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
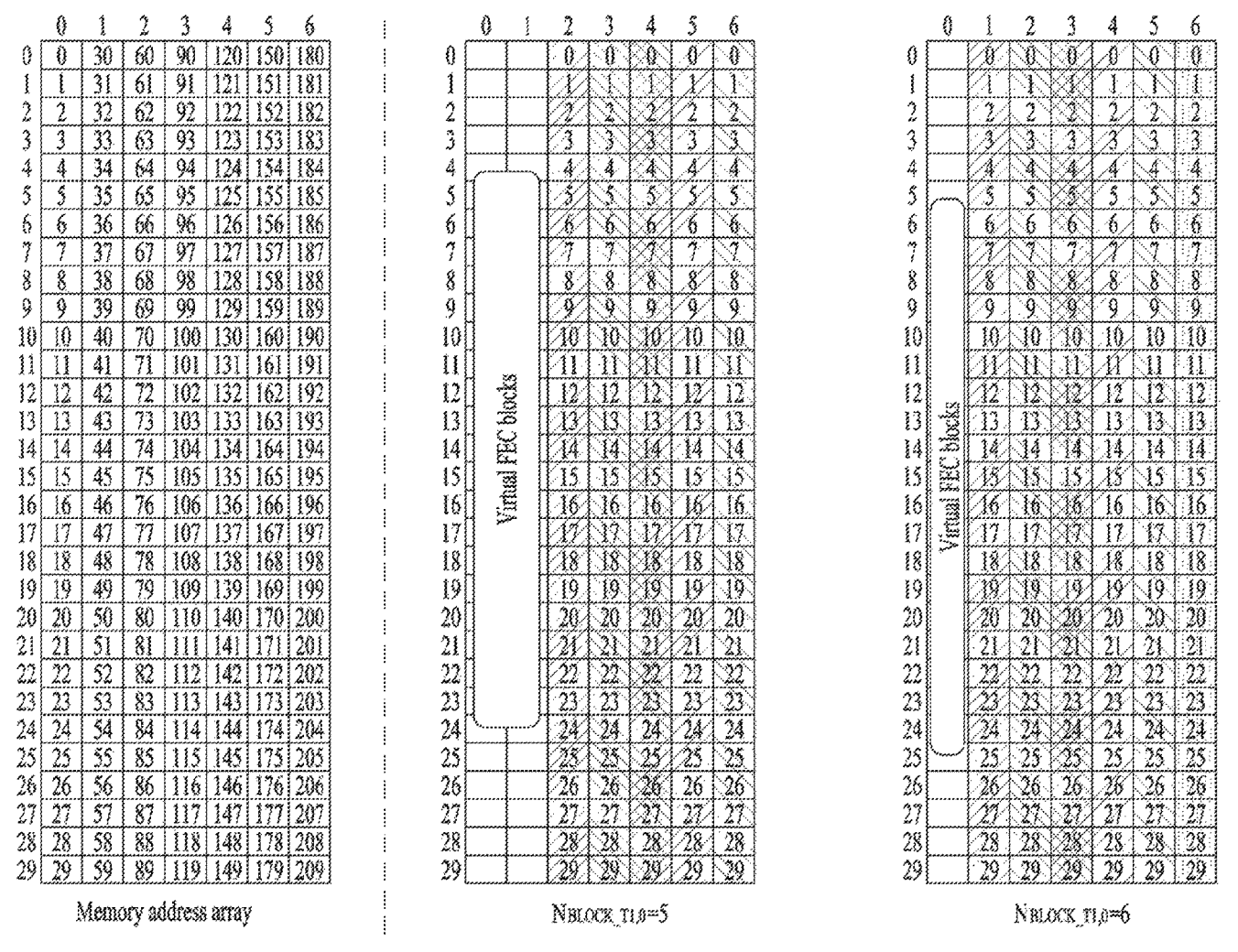

FIG. 9 is a writing operation of a time interleaver according to an embodiment of the present invention.

A block shown in a left portion of the drawing shows a TI memory address array and a block shown in a right portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
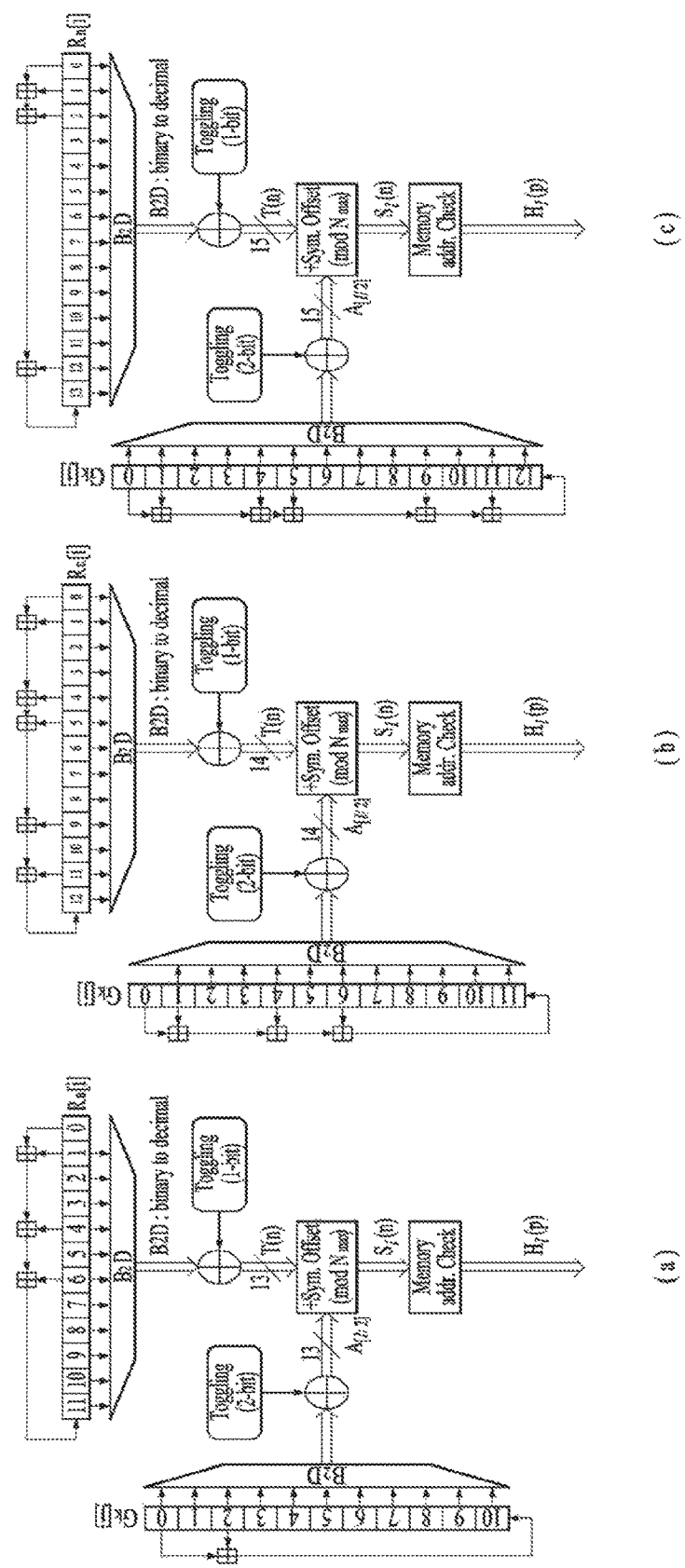
FIG. 10 is a block diagram of an interleaving address generator including a main-PRBS generator and a sub-PRBS generator according to each FFT mode, included in the frequency interleaver, according to an embodiment of the present invention.

FIG. 10 is a block diagram of an interleaving address generator including a main-PRBS generator and a sub-PRBS generator according to each FFT mode, included in the frequency interleaver, according to an embodiment of the present invention.

(a) is a block diagram of an interleaving address generator with respect to a 8K FFT mode, (b) is a block diagram of an interleaving address generator with respect to a 16K FFT mode, and (c) is a block diagram of an interleaving address generator with respect to a 32K FFT mode.

An interleaving procedure with respect to an OFDM symbol pair may use one interleaving sequence and will be described below. First, an available data cell (output cell from a cell mapper) to be interleaved in one OFDM symbol $O_{m,1}$ may be defined as $O_{m,1}=[x_{m,1,0}, \ldots, x_{m,1,p}, \ldots, x_{m,1,Ndata-1}]$ with respect to l=0, ..., $N_{sym}-1$. In this case, $x_{m,1,p}$ may be a $p^{th}$ cell of $l^{th}$ OFDM symbol in a $m^{th}$ frame and $N_{data}$ may be the number of data cells. In the case of a frame signaling symbol, $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,1}=[v_{m,1,0}, \ldots, v_{m,1,Ndata-1}]$ with respect to l= 0, ..., $N_{sym}-1$.

With respect to an OFDM symbol pair, an interleaved OFDM symbol pair may be given according to $v_{m,1,Hi(p)}=x_{m,1,p}$, p=0, ..., $N_{data}-1$ for a first OFDM symbol of each pair and given according to $v_{m,1,p}=x_{m,1,Hi(p)}$, p=0, ..., $N_{data}-1$ for a second OFDM symbol of each pair. In this case, $H_1(p)$ may be an interleaving address generated based on a cyclic shift value (symbol offset) of a PRBS generator and a sub-PRBS generator.

Figure 11:
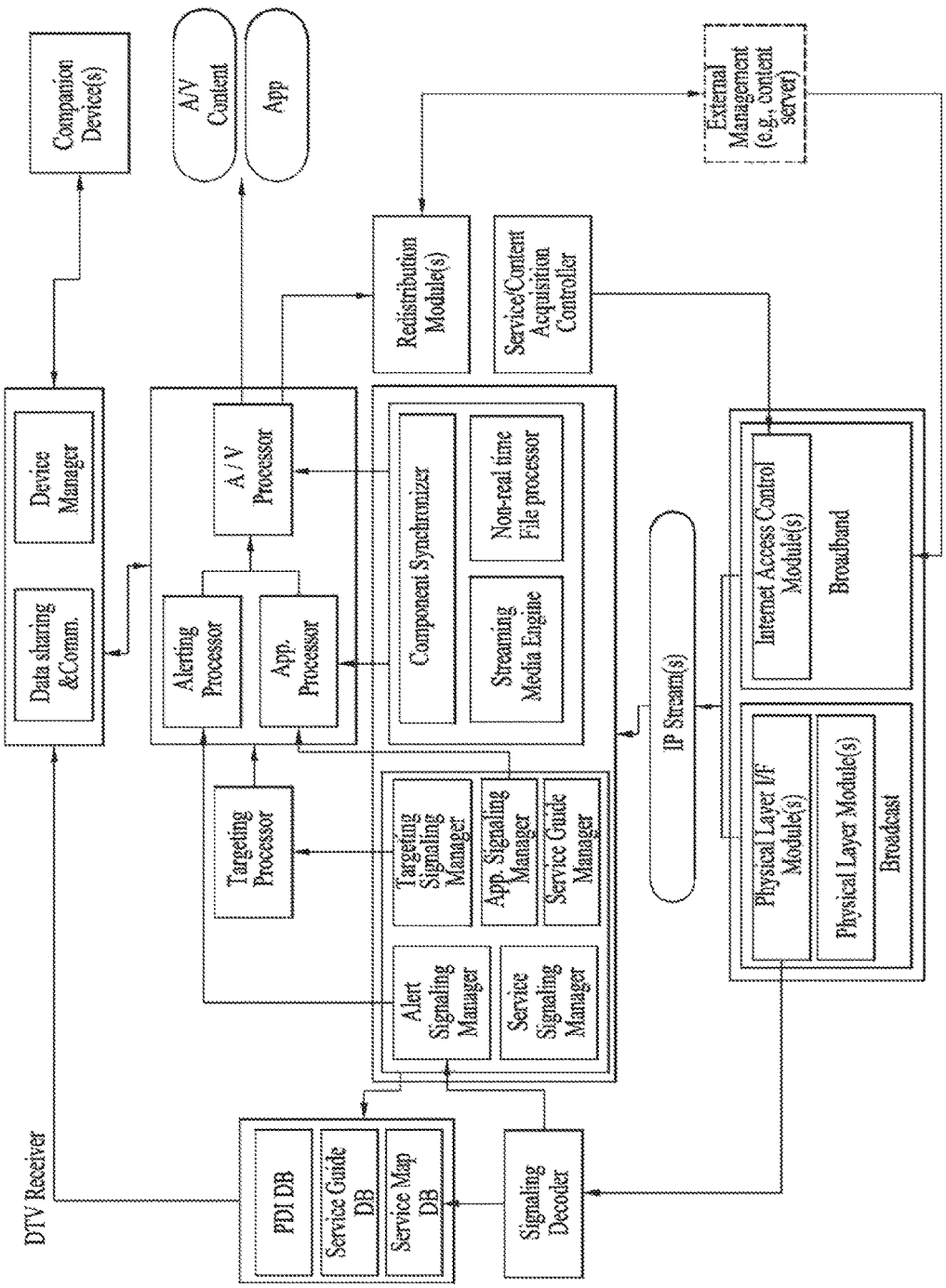
FIG. 11 is a block diagram illustrating a hybrid broadcast reception device according to an embodiment of the present invention.

FIG. 11 is a block diagram illustrating a hybrid broadcast reception device according to an embodiment of the present invention.

A hybrid broadcast system can transmit broadcast signals in connection with terrestrial broadcast networks and the Internet. The hybrid broadcast reception device can receive broadcast signals through terrestrial broadcast networks (broadcast networks) and the Internet (broadband). The hybrid broadcast reception device may include physical layer module(s), physical layer I/F module(s), service/content acquisition controller, Internet access control module(s), a signaling decoder, a service signaling manager, a service guide manager, an application signaling manager, an alert signal manager, an alert signaling parser, a targeting signaling parser, a streaming media engine, a non-real time file processor, a component synchronizer, a targeting processor, an application processor, an A/V processor, a device manager, a data sharing and communication unit, redistribution module(s), companion device(s) and/or an external management module.

The physical layer module(s) can receive a broadcast related signal through a terrestrial broadcast channel, process the received signal, convert the processed signal into an appropriate format and deliver the signal to the physical layer I/F module(s).

The physical layer I/F module(s) can acquire an IP datagram from information obtained from the physical layer module. In addition, the physical layer I/F module can convert the acquired IP datagram into a specific frame (e.g., RS frame. GSE, etc.).

The service/content acquisition controller can perform control operation for acquisition of services, content and signaling data related thereto through broadcast channels and/or broadband channels.

The Internet access control module(s) can control receiver operations for acquiring service, content, etc. through broadband channels.

The signaling decoder can decode signaling information acquired through broadcast channels.

The service signaling manager can extract signaling information related to service scan and/or content from the IP datagram, parse the extracted signaling information and manage the signaling information.

The service guide manager can extract announcement information from the IP datagram, manage a service guide (SG) database and provide a service guide.

The application signaling manager can extract signaling information related to application acquisition from the IP datagram, parse the signaling information and manage the signaling information.

The alert signaling parser can extract signaling information related to alerting from the IP datagram, parse the extracted signaling information and manage the signaling information.

The targeting signaling parser can extract signaling information related to service/content personalization or targeting from the IP datagram, parse the extracted signaling information and manage the signaling information. In addition, the targeting signaling parser can deliver the parsed signaling information to the targeting processor.

The streaming media engine can extract audio/video data for A/V streaming from the IP datagram and decode the audio/video data.

The non-real time file processor can extract NRT data and file type data such as applications, decode and manage the extracted data.

The component synchronizer can synchronize content and services such as streaming audio/video data and NRT data.

The targeting processor can process operations related to service/content personalization on the basis of the targeting signaling data received from the targeting signaling parser.

The application processor can process application related information and downloaded application state and represent parameters.

The A/V processor can perform audio/video rendering related operations on the basis of decoded audio/video data and application data.

The device manager can perform connection and data exchange with external devices. In addition, the device manager can perform operations of managing external devices connectable thereto, such as addition/deletion/update of the external devices.

The data sharing and communication unit can process information related to data transmission and exchange between a hybrid broadcast receiver and external devices. Here, data that can be transmitted and exchanged between the hybrid broadcast receiver and external devices may be signaling data, A/V data and the like.

The redistribution module(s) can acquire information related to future broadcast services and content when the broadcast receiver cannot directly receive terrestrial broadcast signals. In addition, the redistribution module can support acquisition of future broadcast services and content by future broadcast systems when the broadcast receiver cannot directly receive terrestrial broadcast signals.

The companion device(s) can share audio, video or signaling data by being connected to the broadcast receiver according to the present invention. The companion device may be an external device connected to the broadcast receiver.

The external management module can refer to a module for broadcast services/content provision. For example, the external management module can be a future broadcast services/content server. The external management module may be an external device connected to the broadcast receiver.

Figure 12:
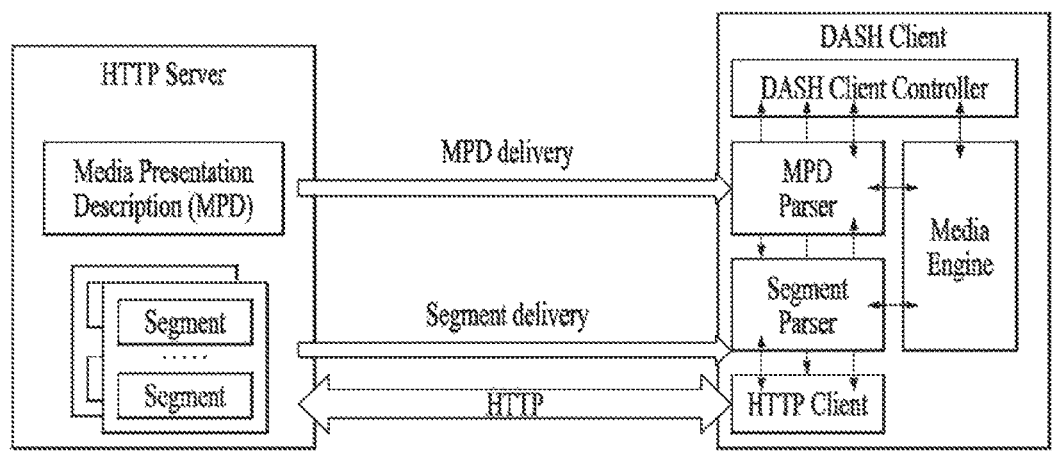
FIG. 12 is a diagram showing an overall operation of a DASH-based adaptive streaming model according to an embodiment of the present invention.

FIG. 12 is a diagram showing an overall operation of a DASH-based adaptive streaming model according to an embodiment of the present invention.

The present invention proposes a next-generation media service providing method for providing HFR content. The present invention proposes related metadata and a method of transmitting the metadata when frame rate information of HFR content for providing smooth movement of an object is provided. Thereby content may be adaptively adjusted and image quality with enhanced content may be provided.

In the case of UHD broadcast, etc., brightness that is not capable of being expressed by existing content, thereby providing sense of high realism. By virtue of introduction of HDR, an expression range of brightness of a content image is increased and, thus, a difference between characteristics for respective scenes of content may be increased compared with a previous case. To effectively express HFR content with HDR on a display, metadata may be defined and transmitted to a receiver. An image of content may be appropriately provided according to intention of a service provider based on the metadata received by the receiver.

The present invention proposes a method of signaling a frame rate parameter related to a video track, a video sample, etc. of content for providing HFR content based on a media file such as ISOBMFF. The present invention proposes a method of storing and signaling a frame rate parameter related to a video track (stream). The present invention proposes a method of storing and signaling a frame rate parameter related to a video sample, a video sample group, or a video sample entry. The present invention proposes a method of storing and signaling a SEI NAL unit containing frame rate related information of HFR content.

The method of storing/transmitting the frame rate information of the HFR content according to the present invention may be used to generate content for supporting HFR. That is, when a media file of content for supporting HFR is generated, a DASH segment operating in MPEG DASH is generated, or MPU operating in MPEG MMT is generated, the method according to the present invention may be used. A receiver (which includes a DASH client, an MMT client, or the like) may acquire frame rate information (flag, parameter, box, etc.) from a decoder and so on and may effectively provide corresponding content based on the information.

The below-described frame rate configuration box or frame rate related flag information may be simultaneously present in a plurality of boxes in a media file, a DASH segment, or MMT MPU. In this case, the frame rate information defined in a higher box may be overridden by frame rate information defined in a lower box. For example, when frame rate information is simultaneously included in a tkhd box and a vmhd box, the frame rate information of the tkhd box may be overridden by the frame rate information of the vmhd.

The DASH-based adaptive streaming model according to the illustrated embodiment may write an operation between an HTTP server and a DASH client. Here, a dynamic adaptive streaming over HTTP (DASH) may be a protocol for supporting HTTP-based adaptive streaming and may dynamically support streaming according to a network situation. Accordingly, AV content reproduction may be seamlessly provided.

First, the DASH client may acquire MPD. The MPD may be transmitted from a service provider such as a HTTP server. The MPD may be transmitted according to delivery according to the aforementioned embodiment. The DASH client may request a server of corresponding segments using access information to a segment described in the MPD. Here, the request may reflect a network state and may be performed.

The DASH client may acquire a corresponding segment and, then, process the segment in a media engine and, then, display the segment on a screen. The DASH client may reflect a reproduction time and/or a network situation in real time and make a request for and acquire a required segment (Adaptive Streaming). Thereby, content may be seamlessly reproduced.

The media presentation description (MPD) may be represented in the form of XML as a file containing detailed information for permitting the DASH client to dynamically acquire a segment. In some embodiments, the MPD may be the same as the aforementioned MPD.

A DASH client controller may reflect a network situation to generate a command for making a request for MPD and/or a segment. The controller may control the acquired information to be used in an internal block such as a media engine.

A MPD parser may parse the acquired MPD in real time. Thereby, the DASH client controller may generate a command for acquiring a required segment.

A segment parser may parse the acquired segment in real time. Internal blocks such as a media engine may perform a specific operation according to information included in a segment.

A HTTP client may make a request for required MPD and/or segment to a HTTP server. The HTTP client may transmit the MPD and/or segments acquired from the server to the MPD parser or the segment parser.

The media engine may display content on a screen using media data included in a segment. In this case, information of the MPD may be used.

Figure 13:
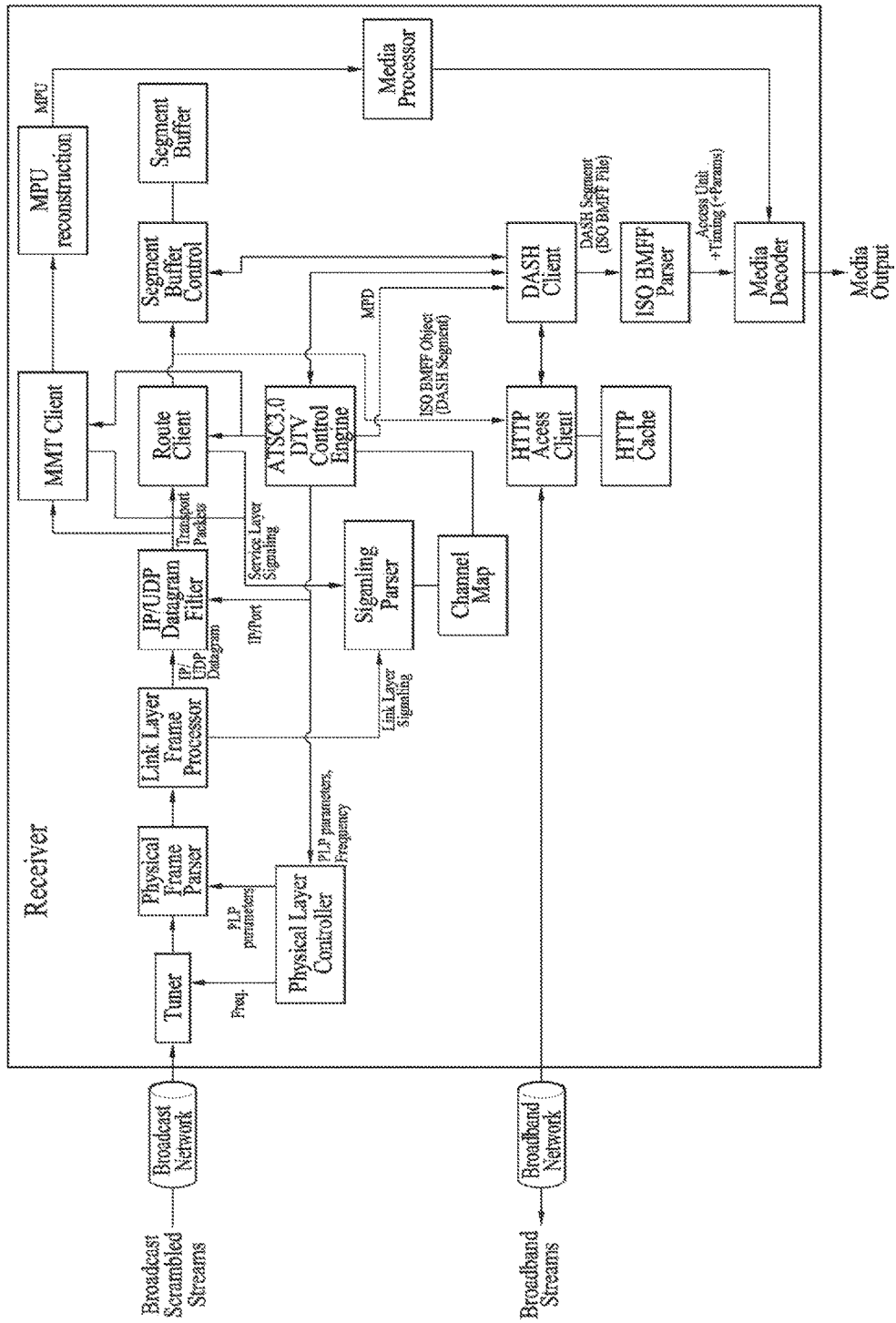
FIG. 13 is a block diagram of a receiver according to an embodiment of the present invention.

FIG. 13 is a block diagram of a receiver according to an embodiment of the present invention.

The receiver according to the illustrated embodiment may include a tuner, a physical layer controller, a physical frame parser, a link layer frame processor, an IP/UDP datagram filter, a DTV control engine, a route client, a segment buffer control, an MMT client, an MPU reconstruction, a media processor, a signaling parser, a DASH client, an ISO BMFF parser, a media decoder, and/or an HTTP access client. Each detailed block of the receiver may be a hardware processor.

The tuner may receive and process a broadcast signal through a terrestrial broadcast channel to tune the broadcast signal in a proper form (physical frame, etc.). The physical layer controller may control operations of the tuner, the physical frame parser, etc. using RF information, etc. of a broadcast channel as a reception target. The physical frame parser may parse the received physical frame and acquire a link layer frame, etc. via processing related to the physical frame.

The link layer frame processor may acquire link layer signaling, etc. from the link layer frame or may acquire IP/UDP datagram and may perform related calculation. The IP/UDP datagram filter may filter specific IP/UDP datagram from the received IP/UDP datagram. The DTV control engine may mange an interface between components and control each operation via transmission of a parameter, etc.

The route client may process a real-time object delivery over unidirectional transport (ROUTE) packet for supporting real-time object transmission and collect and process a plurality of packets to generate one or more base media file format (ISOBMFF) objects. The segment buffer control may control a buffer related to segment transmission between the route client and the dash client.

The MMT client may process a MPEG media transport (MMT) transport protocol packet for supporting real-time object transmission and collect and process a plurality of packets. The MPU reconstruction may reconfigure a media processing unit (MPU) from the MMTP packet. The media processor may collect and process the reconfigured MPU.

The signaling parser may acquire and parse DTV broadcast service related signaling (link layer/service layer signaling) and generate and/or manage a channel map, etc. based thereon. This component may process low level signaling and service level signaling.

The DASH client may perform real-time streaming or adaptive streaming related calculation and process the acquired DASH segment, etc. The ISO BMFF parser may extract data of audio/video, a related parameter, and so on from the ISO BMFF object. The media decoder may process decoding and/or presentation of the received audio and video data. The HTTP access client may make a request for specific information to the HTTP server and process response to the request.

Figure 14:
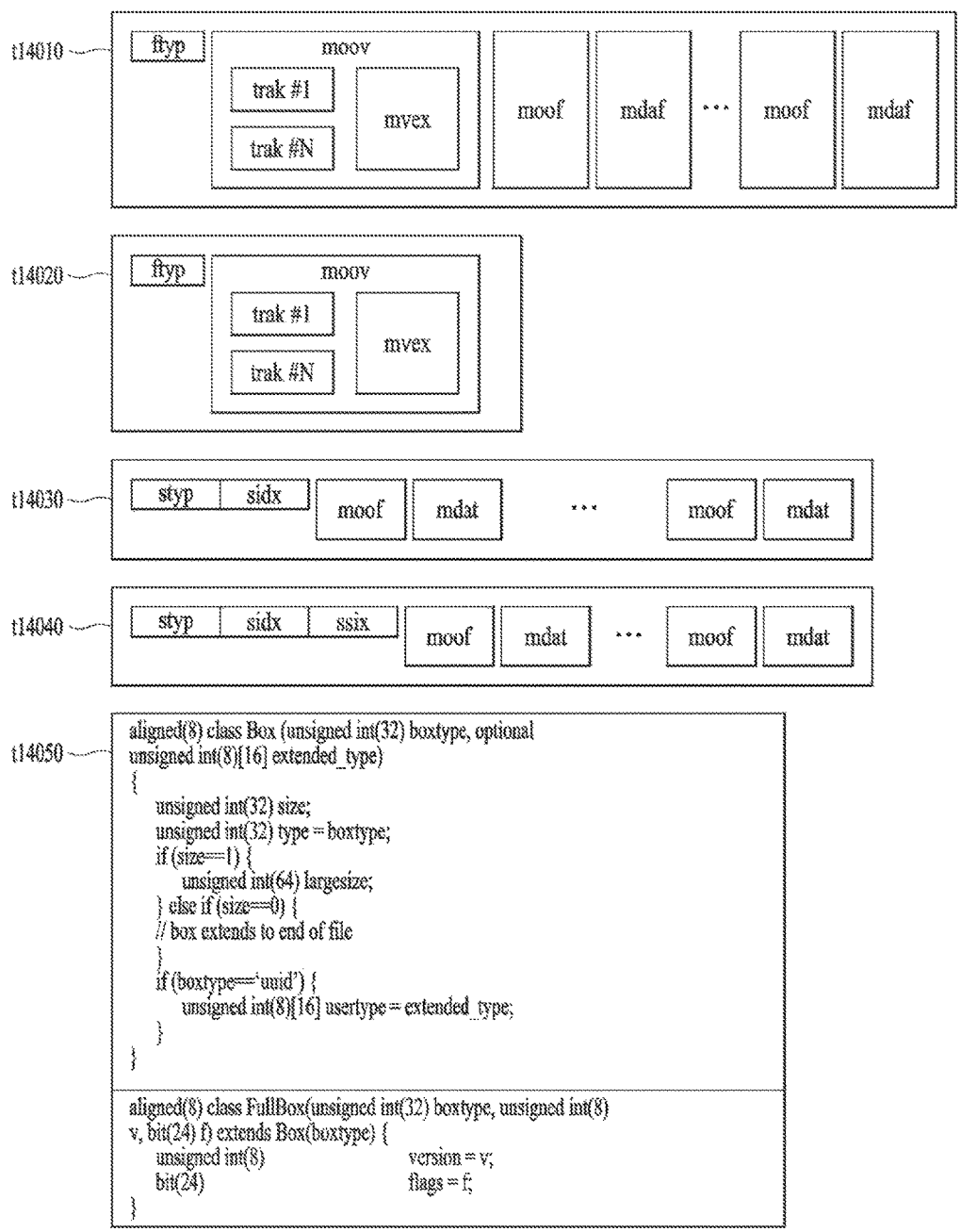
FIG. 14 is a diagram showing a configuration of a media file according to an embodiment of the present invention.

FIG. 14 is a diagram showing a configuration of a media file according to an embodiment of the present invention.

To store and transmit media data such as audio or video, formalized media file format may be defined. In some embodiments, the media file according to the present invention may have a file format based on ISO base media file format (ISO BMFF).

The media file according to the present invention may include at least one box. Here, the box may be a data block or object including media data or metadata related to media data. Boxes may be an inter-hierarchical structure and, thus, media may be classified according to the inter-hierarchical structure such that a media file has a format appropriate to store and/or transmit large-scale media data. The media file may have a structure for easily accessing media information, for example, a structure for permitting a user to move a specific point of media content.

The media file according to the present invention may include a ftyp box, a moov box, and/or a mdat box.

The ftyp box (file-type box) may provide a file type or compatibility related information of a corresponding media file. The ftyp box may include configuration version information of media data of a corresponding media file. A decoder may identify a corresponding media file with reference to the ftyp box.

The moov box (movie box) may be a box including metadata of media data of a corresponding media file. The moov box may function as a container of all metadata. The moov box may be a box of an uppermost layer among metadata related boxes. In some embodiments, only one moov box may be present in a media file.

The mdat box (media data box) may be a box containing actual media data of a corresponding media file. The media data may include an audio sample and/or video samples and the mdat box may function as a container containing the media samples.

In some embodiments, the aforementioned moov box may further include a mvhd box, a trak box, and/or a mvex box as a lower box.

The mvhd box (movie header box) may include media presentation related information of media data included in a corresponding media file. That is, the mvhd box may include information such as media generation time, change time, time interval, period, etc. of corresponding media presentation.

The trak box (track box) may provide information related to a track of corresponding media data. The trak box may include information such as stream related information, presentation related information, and access related information of an audio track or a video track. A plurality of trak boxes may be present according to the number of tracks.

In some embodiments, the trak box may further include a tkhd box (track header box) as a lower box. The tkhd box may include information on a corresponding track indicated by the trak box. The tkhd box may include information such as generation time, change time, and track identifier of a corresponding track.

The mvex box (movie extend box) may indicate that the below-described moof box is present in a corresponding media file. To know all media samples of a specific track, moof boxes need to be scanned.

In some embodiments, the media file according to the present invention may be divided into a plurality of fragments (t14010). Thereby, the media file may be segmented and stored or transmitted. Media data (mdat box) of the media file may be segmented into a plurality of fragments and each fragment may include a moof box and the segmented mdat box. In some embodiments, to use fragments, information of the ftyp box and/or the moov box may be required.

The moof box (movie fragment box) may provide metadata of media data of a corresponding fragment. The moof box may be a box of an uppermost layer among metadata related boxes of a corresponding fragment.

The mdat box (media data box) may include actual media data as described above. The mdat box may include media samples of media data corresponding to each corresponding fragment.

In some embodiments, the aforementioned moof box may include a mfhd box and/or a traf box as a lower box.

The mthd box (movie fragment header box) may include information related to a relationship of a plurality of fragmented fragments. The mfhd box may include a sequence number and may indicate a sequence of data obtained by segmenting media data of a corresponding fragment. Whether segmented data is omitted may be checked using the mfhd box.

The traf box (track fragment box) may include information on a corresponding track fragment. The traf box may provide metadata of a segmented track fragment included in a corresponding fragment. The traf box may provide metadata to decode/reproduce media samples in a corresponding track fragment. A plurality of traf boxes may be present according to the number of track fragments.

In some embodiments, the aforementioned traf box may include a tfhd box and/or a trun box as a lower box.

The tfhd box (track fragment header box) may include header information of a corresponding track fragment. The tfhd box may provide information of a basic sample size, period, offset, and identifier with respect to media samples of a track fragment indicated by the aforementioned traf box.

The trun box (track fragment run box) may include corresponding track fragment related information. The trun box may include information such as a period, size, and reproduction time for each media sample.

The aforementioned media file and fragments of the media file may be processed and transmitted as segments. The segment may include initialization segment and/or media segment.

A file according to the illustrated embodiment t14020 may be a file containing information related to initialization of a media decoder except for media data. The file may correspond to, for example, the aforementioned initialization segment. The initialization segment may include the aforementioned ftyp box and/or moov box.

A file according to the illustrated embodiment t14030 may be a file containing the aforementioned fragment. The file may correspond to, for example, the aforementioned media segment. The media segment may include the aforementioned moof box and/or mdat box. The media segment may further include a styp box and/or a sidx box.

The styp box (segment type box) may provide information for identifying media data of a segmented fragment. The styp box may perform the same function as the aforementioned ftyp box with respect to the segmented fragment. In some embodiments, the styp box may have the same format as the ftyp box.

The sidx box (segment index box) may provide information indicating an index of a segmented fragment. Thereby, the box may indicate a sequence of the corresponding segmented fragment.

In some embodiments (t14040), a ssix box may be further included and the ssix box (sub segment index box) may be further segmented into sub segments and, in this case, may provide information indicating an index of the sub segment. Boxes of a media file may include further extended information based on the box and FullBox form shown in the illustrated embodiment t14050. In this embodiment, a size field and a largesize field may indicate a length of a corresponding box in units of bytes. The version field may indicate a version of a corresponding box format. The type field may indicate a type and identifier of a corresponding box. The flags field may indicate a flag, etc. related to a corresponding box.

Figure 15:
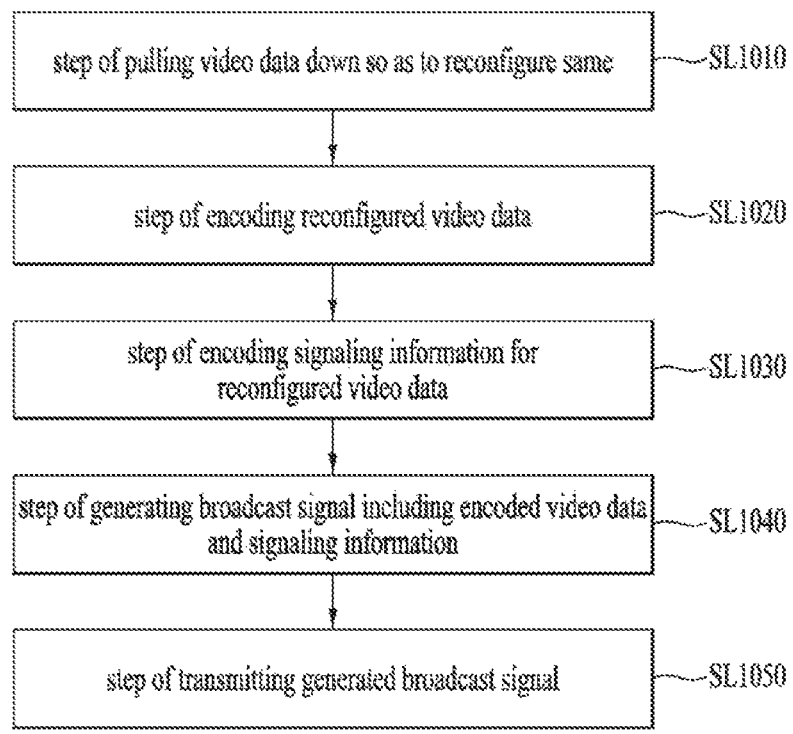
FIG. 15 is a diagram illustrating a method for transmitting a broadcast signal according to one embodiment of the present invention.

FIG. 15 is a diagram illustrating a method for transmitting a broadcast signal according to one embodiment of the present invention.

The method for transmitting a broadcast signal according to one embodiment of the present invention may include the step SL1010 of reconfiguring video data by pulling-down, the step SL1020 of encoding the reconfigured video data, the step SL1030 of encoding signaling information for the reconfigured video data, the step SL1040 of generating a broadcast signal including the encoded video data and the encoded signaling information, and/or the step SL1050 of transmitting the generated broadcast signal.

According to another embodiment of the present invention, the signaling information may include at least one of picture timing information for signaling a configuration of the reconfigured video data, and pull down information for signaling information on pull-down applied to the reconfigured video data. In this case, the picture timing information may indicate information included in a picture timing SEI message. The pull down information may indicate information included in a pull down info SEI message. Details of the pull down information will be described later with reference to FIGS. 17 and 18.

According to another embodiment of the present invention, the picture timing information may include at least one of source scan type information indicating a scan type of a picture, picture configuration information indicating configuration information of the picture, and duplicate flag information indicating duplication or not of the picture. In this case, the source scan type information may indicate information indicated by a source_scan_type element, the picture configuration information may indicate information indicated by a pic_struct element, and the duplicate flag information may indicate information indicated by a duplicate_flag element. Details of the above information will be described with reference to FIGS. 18 and 19.

According to another embodiment of the present invention, the pull down information may include at least one of pull down type information indicating a pull-down type applied to the reconfigured video data, cadence size information indicating a size of a cadence indicating a set of pictures to which the same type of pull-down is applied, cadence start information indicating a first picture of the cadence, paring mismatch information indicating whether pairing of a picture is matched with pairing before the video data is reconfigured, and duplicate flag information indicating duplication or not of the picture. In this case, the pull down type information may indicate information indicated by a pull_down_type element, the cadence size information may indicate information indicated by a size_of_cadence element, the cadence start information may indicate information indicated by a start_of_cadence_flag element, and the pairing mismatch information may indicate information indicated by a pairing_mismatch_flag element. Details of the above information will be described with reference to FIG. 17.

According to another embodiment of the present invention, the picture timing information and the pull down information may be transmitted by being included in a supplemental enhancement information (SEI) message. Details of these kinds of information will be described with reference to FIGS. 17 and 18.

Figure 16:
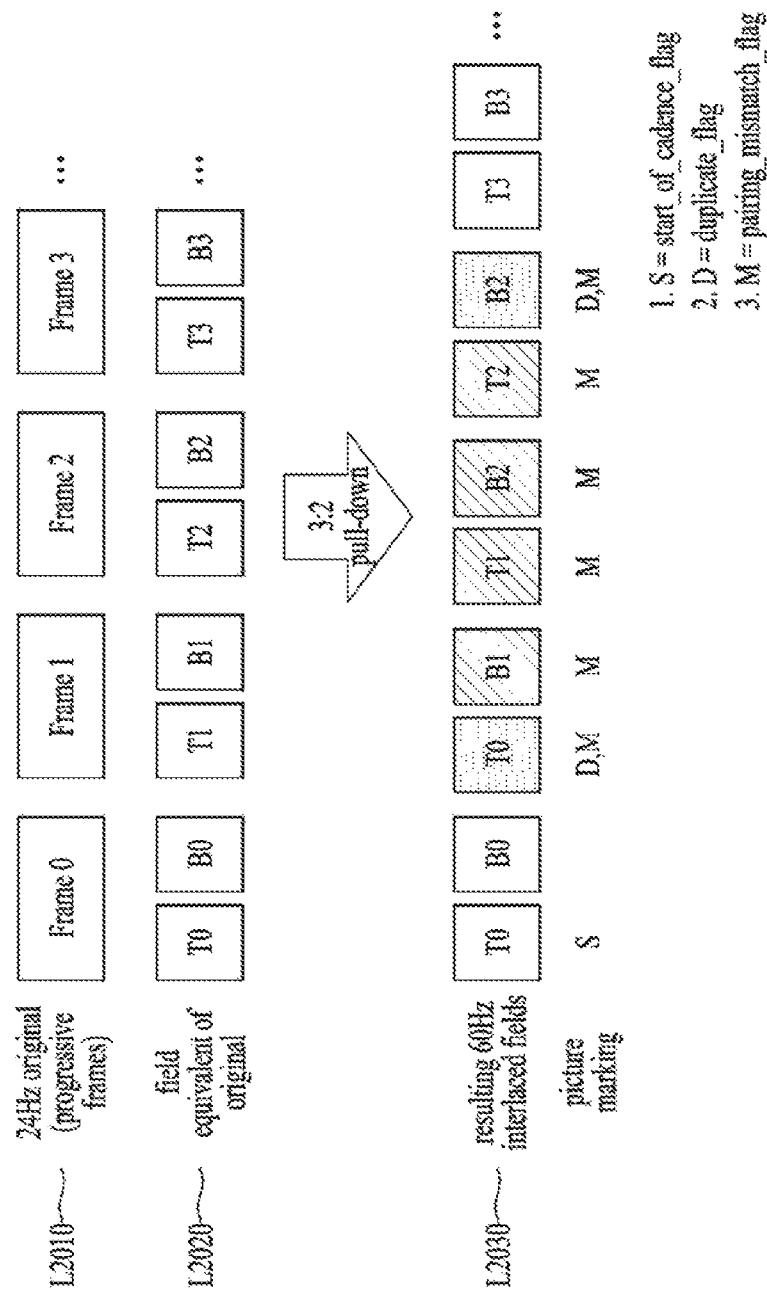
FIG. 16 is a diagram illustrating a procedure of generating 60i video by 3:2 pull-down of 24p video in accordance with one embodiment of the present invention.

FIG. 16 is a diagram illustrating a procedure of generating 60i video by 3:2 pull-down of 24p video in accordance with one embodiment of the present invention.

A transmitter according to one embodiment of the present invention may convert a progressive type video having 24 frame per second (24p) of 24 Hz into an interlace type video having 60 field per second (60i) of 60 Hz. According to one embodiment of the present invention, this procedure may be referred to as a 3:2 pull-down procedure.

L2010 of this drawing indicates a progressive type original video having 24 frames per second (24p) of 24 Hz. The transmitter according to one embodiment of the present invention may generate two fields by splitting one frame into an odd line and an even line. According to one embodiment of the present invention, the split odd line may be referred to as a top field (T), and the split even line may be referred to as a bottom field (B). In this drawing, Frame 0 indicates the $0^{th}$ frame, Frame 1 the first frame, Frame 2 the second frame, and Frame 3 the third frame.

L2020 of this drawing indicates a video obtained by splitting each frame constituting a progressive type original video having 24 frames per second (24p) of 24 Hz into a top field and a bottom field. The transmitter according to one embodiment of the present invention may reconfigure the fields by duplicating at least one split field and interlacing the order of the split fields. In this drawing, T0 and B0 indicate the top field and the bottom field split from the $0^{th}$ frame, T1 and B1 indicate the top field and the bottom field split from the first frame, T2 and B2 indicate the top field and the bottom field split from the second frame, and T3 and B3 indicate the top field and the bottom field split from the third frame.

L2030 of this drawing indicates an interlace type video having 60 fields per second (60i) of 60 Hz reconfigured by 3:2 pull-down procedure. According to one embodiment of the present invention, 10 fields reconfigured by the pull-down procedure may configure one set. In this case, the set may be referred to as a cadence. In this drawing, the field T0 indicates a first field constituting this set. In this drawing, the fields T0 and B2 have been duplicated (duplicate, D), and the fields T0, B1, T1, B2, T2 and B2 have been reconfigured in their order (mismatch, M). The transmitter according to one embodiment of the present invention may signal whether each of the reconfigured fields is the first field of the reconfigured set (start_of_cadence_flag), has been duplicated (duplicate_flag), and interlaced in their order (pairing_mismatch_flag). Details of the signaling will be described.

Referring to this drawing, the transmitter according to one embodiment of the present invention may generate 10 fields by 3:2 pulling-down of 8 consecutive fields when a value of a pic_struct element is from 9 to 12. In this case, the generated 10 fields may be broadcasted in a 60 interlaced field mode. "S" may be displayed in the first field of the generated 10 fields. "D" may be displayed in the third and eighth fields of the generated 10 fields. "M" may be displayed in the other fields except the first, second, ninth and tenth fields of the generated 10 fields. According to one embodiment of the present invention, a picture marked with "S" indicates a picture that includes a start_of_cadence_flag element, and a picture marked with "D" indicates a picture that includes a duplicate_flag element, and a picture marked with "M" indicates a picture that includes a pairing_mismatch_flag element. In this case, the expression that the corresponding picture includes the corresponding element means that the corresponding element has a value of 1. Alphabet displayed in each field has been described as above.

FIG. 17 is a diagram illustrating a configuration of pull_down_info according to one embodiment of the present invention.

According to one embodiment of the present invention, a prefix SEI (Supplemental Enhancement Information) NAL (Network Abstraction Information) unit or a suffix SEI NAL unit may include a user_data_registered_itu_t_t35( ) SEI message. The user_data_registered_itu_t_t35( ) SEI message may include a pull down info SEI message. According to one embodiment of the present invention, a pull down info SEI message may include pull_down_info.

According to one embodiment of the present invention, pull_down_info may be included in every picture.

The pull_down_info according to one embodiment of the present invention may include a pull_down_type element, a size_of_cadence element, a start_of_cadence_flag element, a pairing_mismatch_flag element, a duplicate_flag element and/or a reserved element.

The pull_down_type element indicates a type of a pull-down applied to encoded video stream. For example, this element indicates whether the pull-down corresponds to 3:2, 2:3 or another type. 3:2 pull-down is applied to one embodiment of the present invention of the previous drawing. In this case, the element indicates a 3:2 pull-down type.

The size_of_cadence element indicates the number of pictures included in a sequence of one pull-down pattern. According to one embodiment of the present invention, the sequence of one pull-down pattern may be referred to as one cadence or a set of fields. This element indicates the number of pictures from a picture marked with "S" to a previous picture of a picture marked with next "S" in view of an encoding order. In one embodiment of the present invention of the previous drawing, this element value indicates 10.

The start_of_cadence_flag element indicates whether a current picture is a start point of a pull-down pattern. An encoder according to one embodiment of the present invention may set a value of this element to 1 with respect to the first picture of one pull-down sequence.

The pairing_mismatch_flag element indicates whether a pair of a current top field and bottom field within an encoded stream is matched with a pair of a top field and bottom field within an original sequence. If this element has a value of 1, the current field indicates that the current field is matched with a field of another parity not a field matched with the current field in an original video source. That is, the value 1 of this element indicates that currently paired fields are those which do not belong to the same frame. In one embodiment of the present invention of the previous drawing, "M" is displayed in all pictures within one pull-down sequence except first two pictures and last two pictures, and the value of the pairing_mismatch_flag element for the pictures marked with "M" indicates 1.

The duplicate_flag element indicates whether the current picture is generated as a result of pull-down, and thus is repeated for the existing picture or duplicated version. The encoder according to one embodiment of the present invention may set the value of this element to 1 with respect to the repeated or duplicated picture. According to one embodiment of the present invention, the value of this element may be the same as the value of the duplicate_flag element within the picture timing SEI message.

The reserved element indicates an element for containing another information later.

Figure 18:
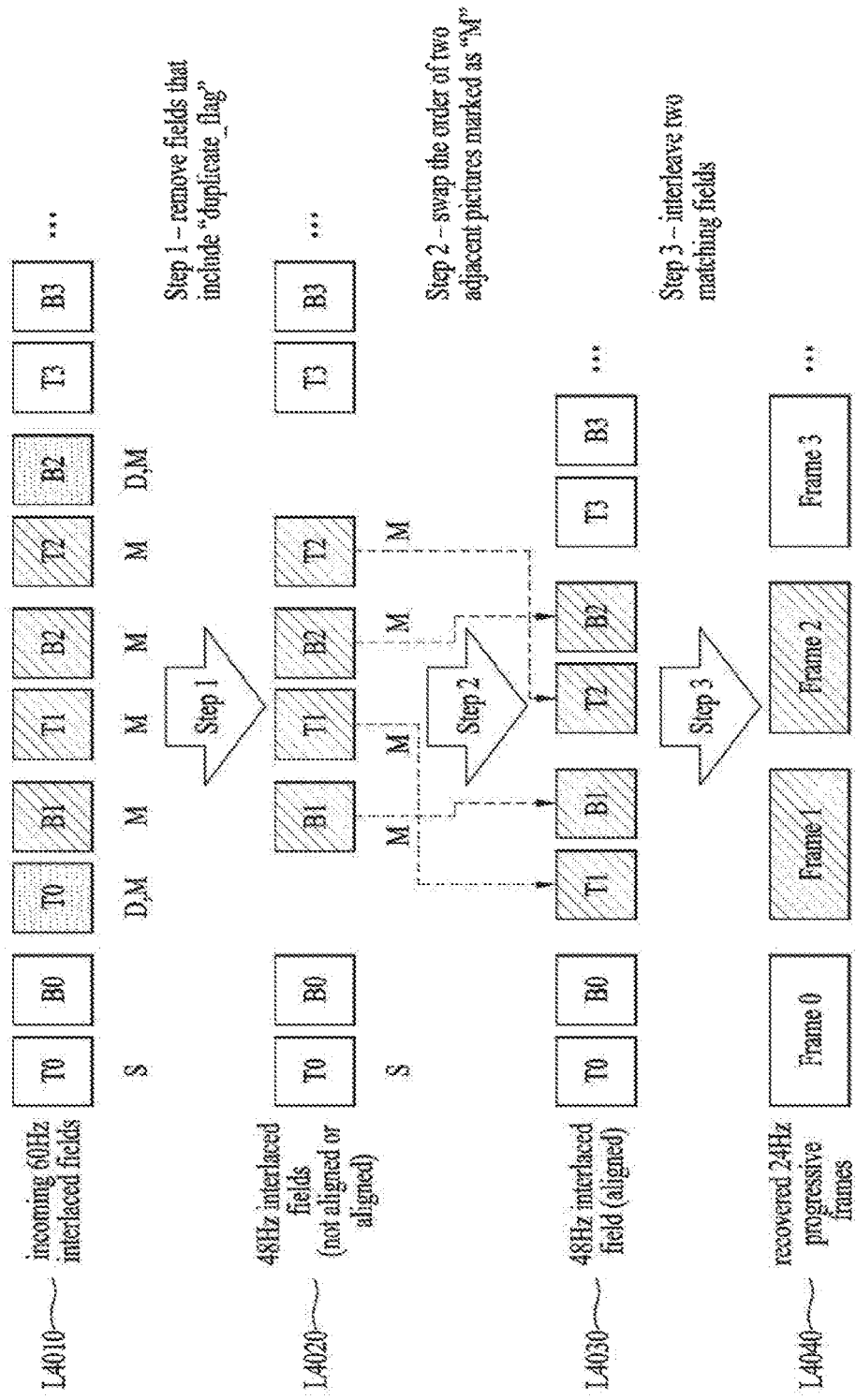
FIG. 18 is a diagram illustrating a procedure of restoring 24p video from 3:2 pulled-down 60i video in accordance with one embodiment of the present invention.

FIG. 18 is a diagram illustrating a procedure of restoring 24p video from 3:2 pulled-down 60i video in accordance with one embodiment of the present invention.

A receiver according to one embodiment of the present invention may receive a 3:2 pulled-down 60i video. L4010 of this drawing may correspond to a signal having fields per second of 60 Hz. In this case, a field marked with "S" indicates a field that includes a start_of_cadence_flag element, a field marked with "D" indicates a field that includes a duplicate_flag element, and a field marked with "M" indicates a field that includes a pairing_mismatch_flag element.

The receiver according to one embodiment of the present invention may remove the field that includes the duplicate_flag element from the received 3:2 pulled-down 60i video. (Step 1) L4010 of this drawing indicates a video from which the field that includes the duplicate_flag element is removed from the 3:2 pulled-down 60i video received by the receiver. This video may correspond to a signal having fields per second of 24 Hz, restored or not in the order prior to encoding. In this case, a field marked with "S" indicates a field that includes a start_of_cadence_flag element, and a field marked with "M" indicates a field that includes a pairing_mismatch_flag element.

The receiver according to one embodiment of the present invention may reverse the order of two adjacent fields that include the pairing_mismatch_flag element in the video from which the field that includes the duplicate_flag element is removed. (Step 2) L4030 of this drawing indicates a video in which the order of two adjacent fields that include the pairing_mismatch_flag element is reversed in the video from which the field that includes a duplicate_flag element is removed. This video may correspond to a signal having fields per second of 24 Hz, restored in the order prior to encoding.

The receiver according to one embodiment of the present invention may restore (a pair of) two fields constituting one frame to one frame by interleaving the two fields in the video in which the order of two adjacent fields that include the pairing_mismatch_flag element is reversed. (Step 3) L4040 of this drawing indicates a video in which (a pair of) two fields constituting one frame is restored into one frame. This video may correspond to a progressive type video having 24 frames per second (24p) of 24 Hz.

Figure 19:
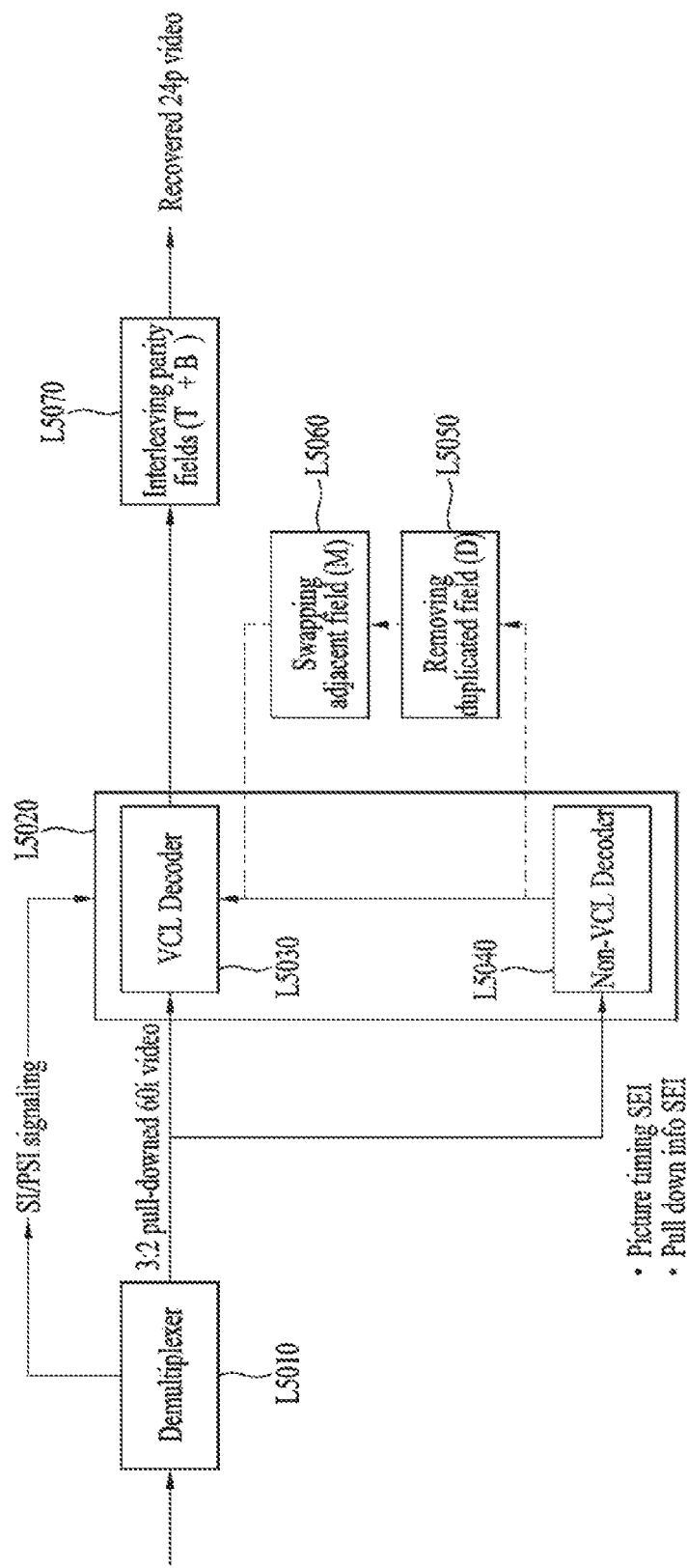
FIG. 19 is a diagram illustrating a configuration of a device for receiving a broadcast signal in accordance with one embodiment of the present invention.

FIG. 19 is a diagram illustrating a configuration of a device for receiving a broadcast signal in accordance with one embodiment of the present invention.

A video stream according to one embodiment of the present invention may include a picture timing SEI message and/or a pull down info SEI message. The picture timing SEI message may include a frame_field_info_present_flag element, a pic_struct element, a source_scan_type element and/or a duplicate_flag element. The pull down info SEI message may include the aforementioned elements.

A reception device according to one embodiment of the present invention may use information indicated by the source_scan_type element and/or the duplicate_flag element when the frame_field_info_present_flag included in the picture timing SEI message has a value of 1. According to one embodiment of the present invention, the value of the pic_struct element from 9 to 12 may be used to restore 24p video from the 3:2 pulled-down 60i video. Since the pic_struct element having a value of 1 and 2 does not transmit field related information, these values may not be used for a bit stream. Since the pic_struct element having values from 3 to 6 may not be used for the bit stream because all fields having the values from 3 to 6 of the pic_struct element are included in one AU (access unit).

The reception device according to one embodiment of the present invention may restore the pulled-down video by using the pull down info SEI message. The reception device may read information related to a picture (field (or picture) marked with "S" in the previous drawing) that includes the start_of_cadence_flag element, from the received pulled-down video. The reception device may identify a restoring process by using a pull_down_type element and/or a size_of_cadence element. The reception device may remove the field (field marked with "D" in the previous drawing) duplicated using the duplicate_flag element. The reception device may reverse the order of two adjacent pictures by using the pairing_mismatch_flag element and/or the pic_struct element included in the picture timing SEI message. In this case, since the pic_struct element may include order information of the fields, the pairing_mismatch_flag element should be signaled, whereby the reception device may restore the pulled-down video.

The reception device according to one embodiment of the present invention may include a demultiplexer L5010, a decoder L5020, a swapping adjacent field processor L5060, a removing duplicated field processor L5050 and/or an interleaving parity fields processor L5070. The decoder L5020 may include a VCL (Video Coding Layer) Decoder L5030 and/or a Non-VCL Decoder L5040.

According to one embodiment of the present invention, the removing duplicated field processor L5050 and/or the swapping adjacent field processor L5060 may be included in the reception device before the video stream is decoded by the VCL decoder, thereby deleting the corresponding field and reversing the order. Alternatively, the removing duplicated field processor L5050 and/or the swapping adjacent field processor L5060 may be included in the reception device after the video stream is decoded by the VCL decoder, thereby deleting the corresponding field and reversing the order.

The demultiplexer L5010 may receive a broadcast signal, parse SI/PSI signaling information from the received broadcast signal and output the parsed result to the decoder. Moreover, the demultiplexer may parse the 3:2 pulled-down 60i video from the broadcast signal and output the parsed result to the VCL decoder, and may parse the picture timing SEI message and/or the pull down info SEI message from the broadcast signal and output the parsed result to the Non-VCL Decoder.

The decoder L5020 may decode the input SI/PSI signaling information, 3:2 pulled-down 60i video stream, the picture timing SEI message and/or the pull down info SEI message.

The VCL (video coding layer) decoder L5030 may decode the 3:2 pulled-down 60i video stream.

The Non-VCL decoder L5040 may decode the input picture timing SEI message and/or the pull down info SEI message.

The removing duplicated field processor L5050 may delete a field duplicated in the corresponding pull-down sequence by using the duplicate_flag element included in the picture timing SEI message and/or the pull down info SEI message.

The swapping adjacent field processor L5060 may reverse the order of two adjacent pictures by using the pairing_mismatch_flag element included in the pull down info SEI message and/or the pic_struct element included in the picture timing SEI message.

The interleaving parity fields processor L5070 may restore (a pair of) two fields constituting one frame in one sequence, in which the duplicated field is deleted and the order of two adjacent pictures is normally aligned, to one frame by interleaving. The video output from this processor may correspond to a progressive type video having 24 frames per second (24p) of 24 Hz.

When the transmitter generates 60i video by 3:2 pulling down a video shot by 24p and transmits the generated 60i video, the device for receiving a broadcast signal according to one embodiment of the present invention may receive the 3:2 pulled-down 60i video and restore the received video to the original video.

The reception device according to one embodiment of the present invention may receive a first NAL unit that includes an access unit delimiter NAL (Network Abstraction Layer) unit, and may receive NAL units in the order of a VPS (Video Parameter Sets) NAL unit, SPS (Sequence Parameter Sets) NAL unit, a PPS (Picture Parameter Sets) NAL unit, and a prefix SEI NAL unit (NAL unit of which nal_unit_type is 39).

The reception device according to one embodiment of the present invention may receive a picture timing SEI message of which palyloadType of the prefix SEI NAL unit is 1, and may identify whether the current picture is an interlaced type or a progressive type through the source_scan_type element included in the picture timing SEI message when the frame_field_info_present_flag element included in the picture timing SEI message has a value of 1. Moreover, the reception device may identify whether the current picture is a top field, bottom field, or frame, a next or previous field is top field or bottom field and/or how its order is configured, through the pic_struct element included in the picture timing SEI message. Furthermore, the reception device may identify information as to whether the corresponding field is the same as the previous field, through the duplicate_flag element included in the picture timing SEI message, and may delete the repeated picture through the removing duplicated field processor.

For example, a picture having source_scan_type=0, pic_struct=9-12, and duplicate flag=1 is deleted by the removing duplicated field processor, and the deleted field is not output to next processor. For another example, a picture having source_scan_type=0, pic_struct=9-12, and duplicate flag !=1 is not deleted by the removing duplicated field processor and may be output to next processor as it is.

The reception device according to one embodiment of the present invention may additionally receive a pull down info SEI message of a user_data_registered_itu_t_t35 SEI message of which payloadType is 4, from the prefix SEI NALU (or, suffix SEI NALU of which nal_unit_type is 40) in addition the picture timing SEI message. As a result, the reception device may identify a cadence structure, and may restore 3:2 pulled-down interlaced video stream to the original progressive video prior to encoding at the transmitter.

The reception device according to one embodiment of the present invention may identify a start field and/or size of the corresponding cadence through the start_flag_of_cadence element and/or the size_of_cadence element included in the pulled-down info SEI message. In this case, the cadence may indicate one sequence set pulled-down by the same pattern. Moreover, the reception device may identify a pull-down type of the video stream reconfigured and received through the pull_down_type element included in the pull down info SEI message. That is, the reception device may identify a frame rate (fps) of the original video and a frame rate of the received video through the pull_down_type element. According to another embodiment of the present invention, instead of the pull_down_type element, the frame rate of the original video and the frame rate of the pulled-down video may be signaled. Moreover, the reception device may identify how many fields have been repeated using the pull_down_type element, the start_flag_of_cadence element and/or the size_of_cadence element included in the pull down info SEI message and/or which field(s) has(have) been repeated to be deleted, and may identify whether how many fields are mismatched and/or which field(s) is(are) mismatched.

The removing duplicated field processor may delete the picture of which duplicate_flag element value within the corresponding cadence is 1, and may output only the other pictures to the next processor.

When the current picture is pairing_mismatch_flag=1, on the basis of a value of the pic_struct element included in the picture timing SEI message, the swapping adjacent field processor may recombine the fields by disconnecting the existing pairing of the current picture (field) and newly pairing a field opposite to the field paired based on the current picture with the current picture, and may display the recombined fields.

For example, if the value of the pic_struct element of the picture timing SEI message is from 9 to 12, the reception device according to one embodiment of the present invention may additionally receive the pull down info SEI message. In case of start_flag_of_cadence=1, size_of_cadence field=10, pull_down_type=3:2 pull-down type the reception device may identify that 2 of 10 consecutive fields should be disregarded and 4 frames should be configured through 8 fields. The reception device may determine a field to be deleted in case of duplicate_flag=1 of the corresponding field, and may delete the corresponding field. The reception device may output the corresponding field to next processor in case of duplicate_flag=0 of the corresponding field. In case of paring_mismatch_flag=1, the reception device may disconnect the existing pairing of the current picture (field) on the basis of the value of the pic_struct element included in the picture timing SEI message and newly pairing a field opposite to the field paired based on the current picture with the current picture. For example, in case of pic_struct=9 (top field paired with previous bottom field in output order), the reception device may pair the current field with a bottom field next to the current field. In case of pic_struct=10 (top field paired with previous top field in output order), the reception device may pair the current field with a top field next to the current field. In case of pic_struct=11 (top field paired with next bottom field in output order), the reception device may pair the current field with a bottom field prior the current field. In case of pic_struct=10 (top field paired with next top field in output order), the reception device may pair the current field with a top field prior to the current field.

Figure 20:
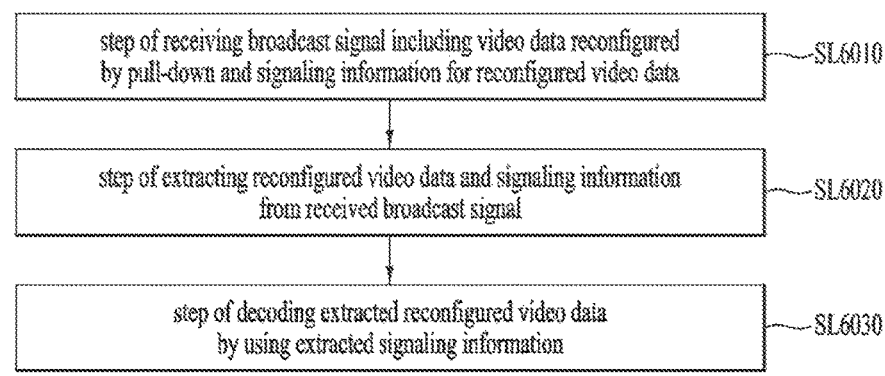
FIG. 20 is a diagram illustrating a method for receiving a broadcast signal in accordance with one embodiment of the present invention.

FIG. 20 is a diagram illustrating a method for receiving a broadcast signal in accordance with one embodiment of the present invention.

The method for receiving a broadcast signal according to one embodiment of the present invention may include the step SL6010 of receiving a broadcast signal including video data reconfigured by pull-down and signaling information for the reconfigured video data, the step SL6020 of extracting the reconfigured video data and the signaling information from the received broadcast signal and/or the step SL6030 of decoding the extracted reconfigured video data by using the extracted signaling information. Its detailed description has been made with reference to FIG. 19.

According to another embodiment of the present invention, the signaling information may include at least one of picture timing information for signaling a configuration of the reconfigured video data and pull down information for signaling information on pull-down applied to the reconfigured video data. In this case, the picture timing information may indicate information included in the picture timing SEI message. The pull down information may indicate information included in the pull down info SEI message. Details of the pull down information have been described with reference to FIG. 18.

According to another embodiment of the present invention, the picture timing information may include at least one of source scan type information indicating a scan type of a picture, picture configuration information indicating configuration information of the picture, and duplicate flag information indicating duplication or not of the picture. In this case, the source scan type information may indicate information indicated by the source_scan_type element, the picture configuration information may indicate information indicated by the pic_struct element, and the duplicate flag information may indicate information indicated by the duplicate_flag element. Details of the above information have been described with reference to FIGS. 18 and 19.

According to another embodiment of the present invention, the pull down information may include at least one of pull down type information indicating a pull-down type to the reconfigured video data, cadence size information indicating a size of a cadence indicating a set of pictures to which the same type of pull-down is applied, cadence start information indicating a first picture of the cadence, paring mismatch information indicating whether pairing of a picture is matched with pairing before the video data is reconfigured, and duplicate flag information indicating duplication or not of the picture. In this case, the pull down type information may indicate information indicated by the pull_down_type element, the cadence size information may indicate information indicated by the size_of_cadence element, the cadence start information may indicate information indicated by the start_of_cadence_flag element, and the pairing mismatch information may indicate information indicated by the pairing_mismatch_flag element. Details of the above information have been described with reference to FIG. 17.

According to another embodiment of the present invention, the picture timing information and the pull down information may be transmitted by being included in the supplemental enhancement information (SEI) message. Details of these kinds of information have been with reference to FIGS. 17 and 18.

According to another embodiment of the present invention, the restoring step may include the step of deleting the duplicated picture from the reconfigured video data by using at least one of the duplicate flag information included in the picture timing information and the duplicate flag information included in the pull down information, the step of controlling pairing of the pictures included in the video data from which the duplicated picture is deleted, by using the picture configuration information and the pairing mismatch information and realigning the order of the pictures, and/or the step of restoring the paired pictures included in the realigned video data to one frame. The details of the restoring step have been described with reference to FIG. 19.

According to another embodiment of the present invention, at least one of the step of deleting the duplicated picture and the step of realigning the order of the pictures may be performed prior to the decoding step. This detailed description has been made with reference to FIG. 19.

Figure 21:
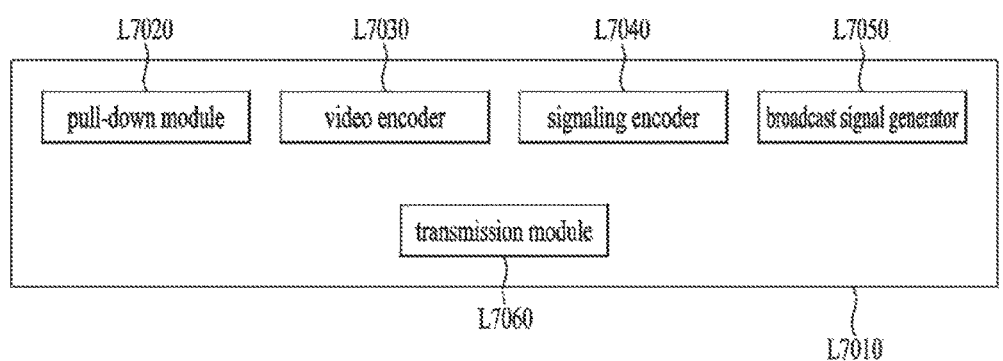
FIG. 21 is a diagram illustrating a configuration of a device for transmitting a broadcast signal in accordance with one embodiment of the present invention.

FIG. 21 is a diagram illustrating a configuration of a device for transmitting a broadcast signal in accordance with one embodiment of the present invention.

The device L7010 for transmitting a broadcast signal according to one embodiment of the present invention may include a pull-down module L7020 for pulling down and reconfiguring video data, a video encoder L7030 for encoding the reconfigured video data, a signaling encoder L7040 for encoding signaling information for the reconfigured video data, a broadcast signal generator L7050 for generating a broadcast signal including the encoded video data and the encoded signaling information, and/or a transmission module L7060 for transmitting the generated broadcast signal. The detailed description of functions performed by the respective modules has been described with reference to the drawing illustrating the method for transmitting a broadcast signal according to one embodiment of the present invention.

Figure 22:
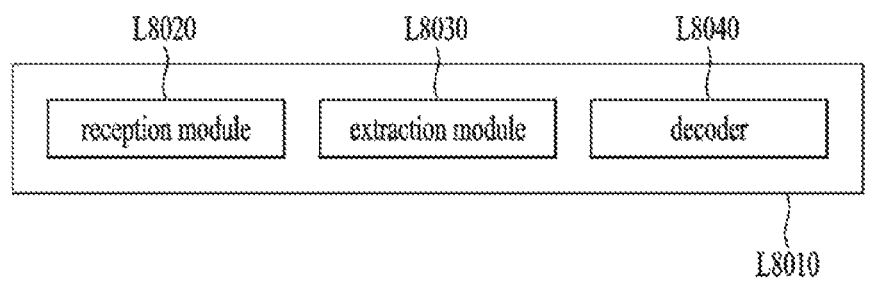
FIG. 22 is a diagram illustrating a configuration of a device for receiving a broadcast signal in accordance with one embodiment of the present invention.

FIG. 22 is a diagram illustrating a configuration of a device for receiving a broadcast signal in accordance with one embodiment of the present invention.

The device L8010 for receiving a broadcast signal according to one embodiment of the present invention may include a reception module L8020 for receiving a broadcast signal including video data reconfigured by pull-down and signaling information for the reconfigured video data, an extraction module L8030 for extracting the reconfigured video data and the signaling information from the received broadcast signal, and/or a decoder L8040 for decoding the extracted reconfigured video data by using the extracted signaling information. The detailed description of functions performed by the respective modules has been described with reference to the drawing illustrating the method for receiving a broadcast signal according to one embodiment of the present invention. In this case, the reception module and/or the extraction module may indicate the aforementioned demultiplexer. The decoder may indicate the aforementioned video decoder.

Figure 23:
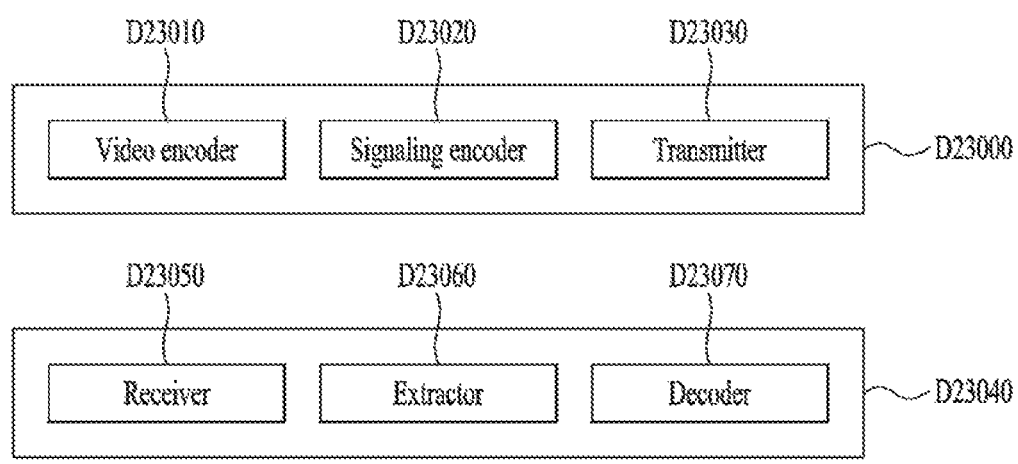
FIG. 23 is a diagram showing a diagram showing a transmission device for transmitting a frame rate change-encoded video source and a reception device the video source according to an embodiment of the present invention.

FIG. 23 is a diagram showing a diagram showing a transmission device for transmitting a frame rate change-encoded video source and a reception device the video source according to an embodiment of the present invention. A transmission device D23000 may include a video encoder D23010, a signaling encoder D23020, and/or a transmitter D23030. The video encoder may increase a frame rate of an original video source and may generate a frame rate change-encoded video source, which will be described below in detail with reference to FIG. 24. The signaling encoder may generate signaling information on the frame rate change-encoded video and may generate doubling information, duplicate information, original frame information, and/or frame rate change start/end frame information, etc., which will be described below, which will be described below in detail with reference to FIG. 25. In addition, the transmitter may transmit the generated frame rate change-encoded video source and signaling information. A reception device D23040 may include a receiver D23050, an extractor D23060, and/or a decoder D23070. The receiver may receive a broadcast signal including the frame rate-changed video data and signaling data thereof. The extractor may extract the video data and signaling data included in the broadcast signal and may transmit a video sample to the decoder. The decoder may decode a video sample and may restore the video sample to an original frame rate using the signaling data extracted during this procedure, which will be described below with reference to FIG. 26.

Figure 24:
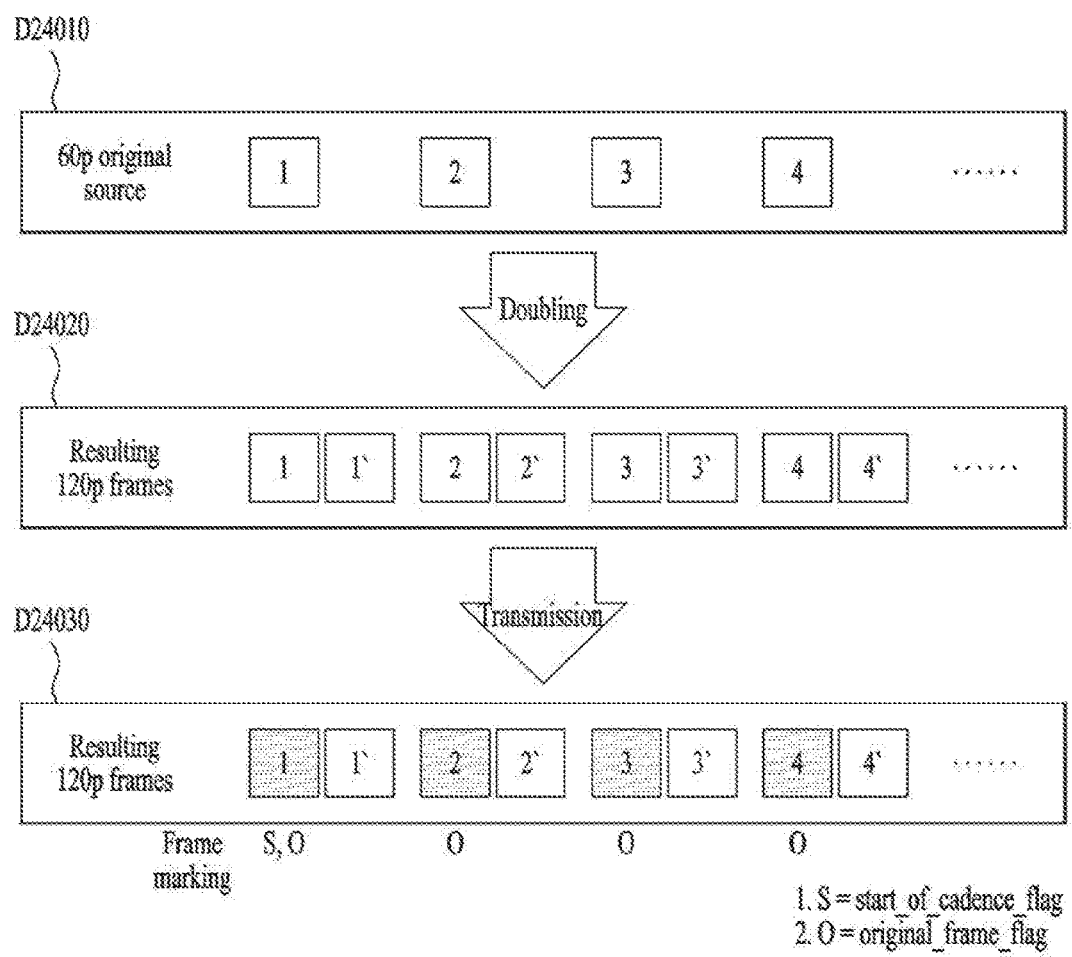
FIG. 24 is a diagram showing a procedure of doubling 60p video to generate 120p video according to an embodiment of the present invention.

FIG. 24 is a diagram showing a procedure of doubling 60p video to generate 120p video according to an embodiment of the present invention. According to an embodiment of the present invention, a transmission end may convert video of a progressive method with a frame per second of 60 Hz (60 frame per second, 60p) into video of a progressive method with a frame per second of 120 Hz (12 frame per second, 120p). According to an embodiment of the present invention, this procedure may be referred to as doubling of an original video source. In the present embodiment, although doubling of each frame included in the original video source has been described, the feature of the present invention may also be applied in the same way to tripling, quadrupling, quintupling, and sextupling of each frame included in the original video source.

D24010 of the drawing may indicate an original video source of a progressive method with a frame per second of 60 Hz (60 frame per second, 60p). As shown, the original video source may include frame 1, frame 2, frame 3, frame 4, . . . . A transmission end according to an embodiment of the present invention may double and duplicate frames included in an original video source to generate 120p frames like D24020. That is, as shown, 120p frames as a doubling result may include frame 1, frame 1', frame 2, frame 2', frame 3, frame 3', frame 4, frame 4', . . . . That is, it may be seen that D24020 includes doubled frames compared with D24010. Here, each of the frames may be duplicated in the same way as an original frame or may be duplicated by applying an interpolation result. When each frame is duplicated in the same way as an original frame, frame 1 and frame 1' may have the same data. When each frame is duplicated by applying an interpolation result, frame 1 and frame 1' may have data that are similar but are not the same. Here, interpolation may be performed using values of a current original frame and a next original frame. That is, frame 1' may be a result generated by interpolating frame 1 and frame 2. The transmission end according to an embodiment of the present invention may transmit frame marking information with the duplicated and generated frames. The transmission end according to an embodiment of the present invention may set frame marking information on each frame and may transmit the frame marking information on each frame with a corresponding frame. The frame marking information may include information (start_of_cadence_flag) indicating whether a corresponding frame is a first frame of a combination of doubled frames and information (original_frame_flag) indicating whether a corresponding frame is an original frame.

As shown, frame 1 may be an original frame and may also be a first frame among the doubled frames and, thus, may include frame marking information S and O. In addition, frames 2, 3, and 4 may include frame marking information O indicating that a corresponding frame is an original frame. The duplicated frames 1', 2', 3', and 4' may not correspond thereto and, thus, frame marking information may not be assigned to the duplicated frames. As such, the transmission end according to an embodiment of the present invention may add the frame marking information to a video source encoded using a method of duplicating a frame to provide signaling information required to restore an original video source. The frame marking information may also be referred to as original frame information in this specification.

In the above embodiment, information indicating a first frame with a frame rate changed being applied to frame marking information and information indicating an original frame are described briefly and detailed signaling information will be described below with reference to the drawings.

FIG. 25 is a diagram showing frame marking information according to an embodiment of the present invention. The aforementioned frame marking information may include information required to restore an original video source from a video source that is encoded and received by a transmission end. Information on an original frame may be transmitted to a reception end via SI/PSI signaling. As described above, for example, a transmission end encodes an original video source of 60p to an encoded video of 120p, 180p, 240p, 300p, 360p, etc. and transmits the encoded video. Here, the original frame rate may be 60p and the encoded video frame rate may be 120p, 180p, 240p, 300p, or 360p. According to another embodiment of the present invention, information on an original frame may be generated based on a frame rate of a film and may be transmitted to the reception end via SI/PSI signaling. The transmission end may encode an original video source with a frame rate of 25p to an encoded video source of 50p, 75p, 100p, 125p, 150p, etc. and transmit the encoded video source. Here, an original video frame rate may be 25p and an encoded video frame rate may be 50p, 75p, 100p, 125p, or 150p. According to another embodiment of the present invention, for example, the transmission end encodes an original video source with a frame rate of 24p to an encoded video source of 48p, 72p, 96p, 120p, 144p, etc. and transmits the video source. Here, an original video frame rate may be 25p and the encoded video frame rate may be 48p, 72p, 96p, 120p, or 144p. In this case, the received frame may be formed by doubling, tripling, quadrupling, quintupling, or sextupling the original frame and, in some embodiments, a duplicate method using repetition or interpolation may be used. Accordingly, the frame marking information may indicate that each frame is generated using a frame-specific doubling method and is a repeated frame or an interpolated frame. As described above, among doubled frames, a first frame may be marked with S (start) and a last frame may be marked with E (end). In some embodiments, frame marking S may be represented using a random access point. A frame matched with a frame in an original video source may be marked with O (original). The reception end may restore original video to transmit artistic intent included in the original video to a viewer without change. The reception end may restore original video frame video encoded by the transmission end and may generate video with image quality that is highly improved using a frame rate controller (FRC) owned by the reception end, using original video.

D25010 of an upper part of FIG. 25 is a first embodiment showing syntax of frame marking information. According to an embodiment of the present invention, a prefix supplemental enhancement information (SEI) network abstraction information (NAL) unit or a suffix SEI NAL unit may include a user_data_registered_itu_t_t35( ) SEI message. The user_data_registered_itu_t_t35( ) SEI message may include an original frame info SEI message. According to an embodiment of the present invention, the original frame info SEI message may be represented as original_frame_info. According to an embodiment of the present invention, original_frame_info may be included every picture.

According to an embodiment of the present invention, the original_frame_info may include a frame_type element, a duplicate_frame_flag element, a start_of_cadence_flag element, an end_of_cadence_flag element, an original_frame_flag element, and/or a reserved element. The frame_type element may indicate a type of frame rate change. That is, the transmission end may include information on a frame doubling method used when encoded video data is generated using original video data. As described above, the frame doubling method may use frame doubling, frame tripling, frame quadrupling, frame quintupling, or frame sextupling and the frame_type element may include multiple information on a multiplied number of a multiple used in doubling. A value of the frame_type element may be the same as a value of a pic_struct element included in the picture timing SEI message. In some embodiments, the original_frame_info may signal a frame rate of an original video source and a frame rate of an encoded video source instead of the frame_type element. That is, the original_frame_info may include information on each frame rate using an original frame rate element and an encoding frame rate element instead of doubling information.

The duplicate_frame_flag element may indicate a method of generating a current frame. In the above embodiment, a duplicated frame may be repeated or may be duplicated via interpolation. When the duplicate_frame_flag element is set to 1, this may indicate that a current frame is a repeated frame of a previous frame in an output sequence. A value of the duplicate_frame_flag element included in the original_frame_info may be the same as a value of the duplicate_flag included in the picture timing SEI message. When the duplicate_frame_flag element is set to 0, this may indicate that a current frame is an interpolated frame generated via interpolation between a previous frame and a next frame in an output sequence. The start_of_cadence_flag element may indicate whether a current frame is a start point of a pattern related to frame rate change. That is, this may indicate that the current frame is a first frame among frames to which frame rate change is applied. An encoder of the transmission end needs to set a value of the start_of_cadence_flag element to 1 with respect to a first frame of a video sequence encoded via frame rate change. The end_of_cadence_flag element may indicate whether a current frame is an end point of a pattern related to frame rate change. That is, this may indicate that the current frame is a last frame among frames to which frame rate change is applied. An encoder of the transmission end needs to set a value of the end_of_cadence_flag element to 1 with respect to a last frame of a video sequence encoded via frame rate change. The original_frame_flag element may indicate whether a current frame is a frame matched with a frame of an original video source. The original_frame_flag element may indicate that a set frame is not a repeated frame or an interpolated frame. The reserved element may indicate an element for reserving other information in the future.

An intermediate end D25020 of FIG. 25 shows a second embodiment of syntax of frame marking information. The second embodiment will be described in terms of a difference from the first embodiment. The description of the first embodiment except for the following difference may be applied to the second embodiment without changes. In D25020, the original_frame_info element may include information of the duplicate_frame_flag element described in the first embodiment in the frame_type element. That is, in the second embodiment, the frame_type element may indicate a type of frame rate change applied to an encoded video stream. Here, the frame_type element may also include multiple information on a multiplied number applied to frame rate change and duplicate information indicating a method of duplicating a frame. The duplicate information may include information indicating whether a frame is repeated or interpolated for doubling. D25030 of a lower part of FIG. 25 shows an example of the frame_type element used in the second embodiment. That is, when the frame_type element is set to 0, this may indicate that a frame is doubled via simple duplication. When the frame_type element is set to 1, this may indicate that a frame is doubled via interpolation, when the element is set to 2, the frame is tripled via simple duplication, and when the element is set to 3, the frame is tripled via interpolation. As such, the frame_type element includes doubling information and duplicate information to transmit information on a frame rate change method to the reception device and the reception device may restore a video source with an original frame rate through corresponding information. The aforementioned information of the original frame rate may also be transmitted to the reception end via SI/PSI signaling.

Figure 26:
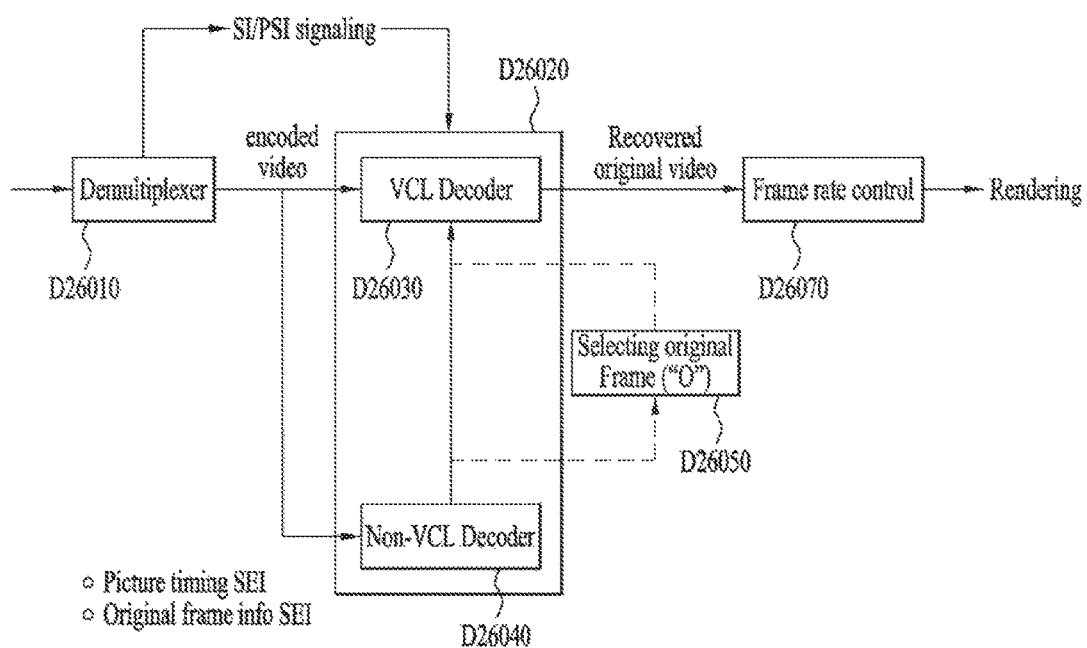
FIG. 26 is a diagram showing a configuration of a device for receiving a broadcast signal in accordance with one embodiment of the present invention.

FIG. 26 is a diagram showing a configuration of a device for receiving a broadcast signal in accordance with one embodiment of the present invention. According to an embodiment of the present invention, a video stream may include a picture timing SEI message and/or an original_frame_info SEI message. The picture timing SEI message may include a frame_field_info_present_flag element, a pic_struct element, and/or a duplicate_flag element. The original_frame_info SEI message may include the aforementioned elements. In some embodiments, the pic_struct element may be extended for including additional information and, in this case, may include an extension code. That is, when the extension code is signaled, the reception end may check the extended pic_struct element of a new SEI message to acquire information.

When the frame_field_info_present_flag included in the picture timing SEI message is set to 1, the reception end may use signaling of the pic_struct element and duplicate_flag element included in the picture timing SEI message. When a value of the pic_struct element is set to 0, 7, or 8, the reception end may restore an original frame. When the original frame is restorable, the reception end may restore the original frame with reference to the original_frame_info SEI message. The reception end may read information related to the aforementioned frame marked with S and may recognize a recovery process to be applied using the frame_type element and the duplicate_frame_flag element. To recognize a matching frame included in the original video source, frame marked 'O' signaling may be used.

The reception device according to an embodiment of the present invention may include a demultiplexer D26010, a decoder D26020, a selecting original frame processor D26050, and/or a frame rate control processor D26070. The decoder D26020 may include a video coding layer (VCL) decoder D26030 and/or a non-VCL decoder D26040.

The demultiplexer D26010 may receive a broadcast signal and demultiplex SI/PSI signaling information from the received broadcast signal to output the information to the decoder. Here, the SI/PSI signaling information may include information on an original frame rate. In addition, the demultiplexer may demultiplex frame rate change-encoded video from the broadcast signal to output the video to the VCL decoder and may demultiplex a picture timing SEI message and/or an original_frame_info SEI message from the broadcast signal to output the message to the non-VCL decoder.

The decoder D26020 may decode the input SI/PSI signaling information, frame rate change-encoded video stream, picture timing SEI message, and/or original_frame_info SEI message. The video coding layer (VCL) decoder D26030 may decode the frame rate change-encoded video stream. The non-VCL decoder D26040 may decode the input picture timing SEI message and/or original_frame_info SEI message.

The selecting original frame processor D26050 may select an original frame based on the picture timing SEI message and/or original_frame_info SEI message decoded by the non-VCL decoder D26040. That is, among frame rate change-encoded frames decoded by the VCL decoder D26030, frames matched with a frame included in the original video source may be selectively extracted. That is, the aforementioned frame marked with 'O', in other words, a frame set with the original_frame_flag element may be selectively extracted to restore an original frame rate. As a result, an output of the selecting original frame processor D26050 may be recovered original video. In some embodiments, the selecting original frame processor D26050 may be included in the aforementioned decoder D26020 and may be operated.

The frame rate control processor D26070 may control a frame rate of a recovered original video. That is, the reception end may provide video with image quality enhanced compared with received encoded video using the frame rate control processor D26070 that is included in the reception device. During this procedure, a frame doubling method may be used and video with a frame rate being changed by the reception device may be provided via rendering. In some embodiments, the frame rate control processor D26070 may be omitted from the configuration of the reception device and, in this case, the reception device may provide original video with an original frame rate without change in a separate frame rate.

Figure 27:
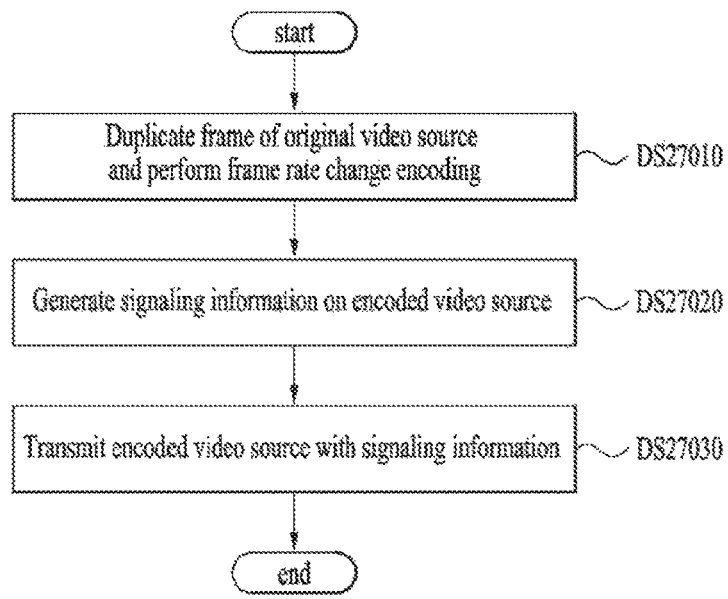
FIG. 27 is a diagram showing a method of transmitting a frame rate change-encoded video source according to an embodiment of the present invention.

FIG. 27 is a diagram showing a method of transmitting a frame rate change-encoded video source according to an embodiment of the present invention. A transmission device according to an embodiment of the present invention may duplicate a frame included in an original video source and may perform frame rate change encoding (DS27010). In this procedure, the frame doubling method described with reference to FIG. 24 may be used and, in some embodiments, the original frame rate may be doubled, tripled, quadrupled, quintupled, and sextupled. In the procedure of increasing a frame rate, the transmission device may simply duplicate or interpolate frames included in a video source, which will be described below with reference to FIG. 24. The transmission device according to an embodiment of the present invention may generate signaling information on an encoded video source after frame rate change encoding (DS27020), which is the same as in the above detailed description of FIG. 25. The transmission device may generate information indicating a doubling method and duplicate method used in frame rate change, and first and/or last frames to which the frame rate change is applied. The transmission device may also generate information indicating whether a frame in the frame rate change-encoded video source is matched with an original frame. The transmission device may transmit the frame rate change-encoded video source with the generated signaling information (DS27030).

Figure 28:
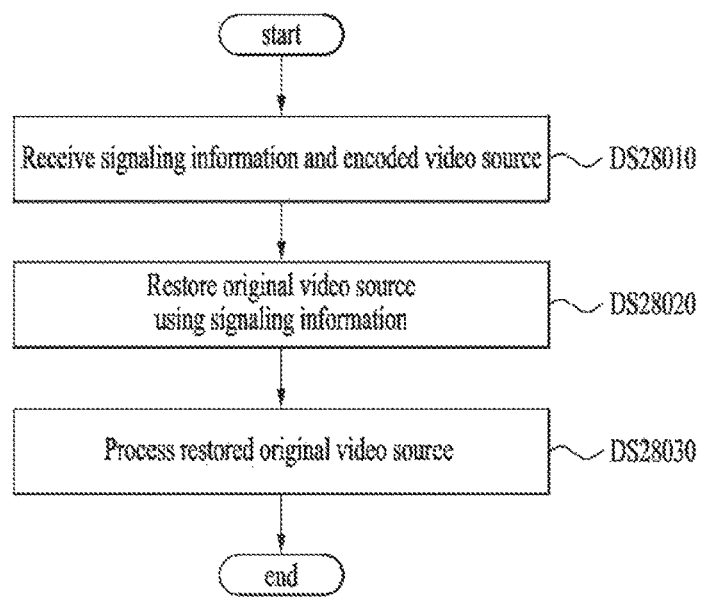
FIG. 28 is a diagram showing a method of receiving and transmitting a frame rate change-encoded video source according to an embodiment of the present invention.

FIG. 28 is a diagram showing a method of receiving and transmitting a frame rate change-encoded video source according to an embodiment of the present invention. A reception device according to an embodiment of the present invention may receive signaling information and a frame rate change-encoded that are related to the original video source (DS28010). The reception device may restore the original video source using signaling information (DS28020). That is, the reception device may check whether a frame among frames in the video source encoded from the signaling information is matched with a frame in the original video source and may select the frame, which is the same as in the above description of FIG. 26. The reception device may process the restored original video source (DS28030). The reception device may perform frame rate change encoding on the restored original video source using the aforementioned frame rate controller and may display the processed video source. In some embodiments, the reception device may not change a frame rate of the restored original video source and may output the original video source.

As described above, the transmission device according to an embodiment of the present invention may change and transmit a frame rate of the original video source and the reception device may restore a video source with the changed frame rate to the original video source. Thereby, the reception device may provide a video source with an original frame rate to a user or may provide a video source with image quality enhanced using the frame rate controller included in the reception device to a user.

FIG. 29 is a diagram showing a configuration box for providing a frame rate related parameter according to an embodiment of the present invention. That is, the drawing shows a HFR configuration box for providing a high frame rate (HFR) and a pull-down recovery related parameter and a pull-down recovery box. The present invention proposes a method of storing an HFR related parameter associated with a video track (stream), sample, or the like and signaling the parameter when an ISO base media file format (hereinafter, ISOBMFF)-based file, and so on are generated. The HFR parameter associated with the sample, the video track, or the like included in ISOBMFF may be represented in the form of a box, as shown in an upper part of the drawing. To provide a video track in a media file and HFR information related to video samples, the HFR configuration box may be defined. The HFR configuration box may be positioned in a media file. In some embodiments, the HFR configuration box may be included in a moov box, a moof box, or a third box. The HFR configuration box may also be referred to as a hfrc box.

The HFR configuration box may include a SFR_compatibility element, a HFR_SFR_transition element, a SFR_HFR_transition element, and/or a HFR_type_transition element. The SFR_compatibility element may be a flag indicating whether a corresponding video track, sample, or the like is compatible with a standard frame rate (SFR) or a legacy frame rate. The HFR_SFR_transition element may be a flag indicating whether transmission to SFR (or legacy frame rate) from HFR occurs in a corresponding video track, sample, or the like. In some cases, the element may be a flag indicating whether transition to HFR from SFR (or legacy frame rate) occurs in a next video track, sample, etc. subsequent to a corresponding video track, sample, etc. The SFR_HFR_transition element may be a flag indicating whether transition to HFR from SFR (or legacy frame rate) occurs in a corresponding video track, sample, etc. In some cases, the element may be a flag indicating whether transition to HFR from SFR (or legacy frame rate) occurs in a next video track, sample, etc. subsequent to a corresponding video track, sample, etc. The HFR_type_transition element may be a flag indicating whether transition to HFR type 2 from HFR type 1 occurs in a corresponding video track, sample, etc. In some embodiments, the element may be a flag indicating whether transition to HFR type 2 from HFR type 1 occurs in a next video track, sample, etc. subsequent to a corresponding video track, sample, etc. Here, when HFR type 1 is 120p, HFR type 2 may be defined as 240p.

The present proposes a method of storing a pull-down recovery or frame rate recovery related parameter associated with a video track (stream), sample, or the like and signaling the parameter when an ISO base media file format (hereinafter, ISOBMFF)-based format, or the like is generated. The frame rate related parameter related to the video track, sample, or the like included in the ISOBMFF may be represented in the form of a box shown in a lower part of the drawing. To provide recovery information related to video track and video samples in a media file, a PullDownRecovery configuration box may be defined. The PullDownRecovery configuration box may be positioned in a media file. In some embodiments, the HFR configuration box may be included in a moov box, a moof box, or a third box. The PullDownRecovery configuration box may also be referred to as a pdrc box.

The PullDownRecovery configuration box may include a pull_down_type element, a pull_down_start_transition element, a pull_down_end_transition element, a pull_down_type_transition element, an original_frame_rate element, and/or an original_scan_type element. The pull_down_type element may indicate a pull down type used to form an encoded video stream included in a corresponding video track, sample, or the like in an original video stream (captured video). For example, the element may be 3:2, 2:3, or other types. The pull_down_start_transition element may be a flag indicating whether start of pull-downed video is included in a corresponding video track, sample, or the like. The pull_down_end_transition element may be a flag indicating whether end of pull-downed video is included in a corresponding video track, sample, or the like. The pull_down_type_transition element may be a flag indicating whether a changed portion of the pull-downed type is included in a corresponding video track, sample, or the like. In some embodiments, the element may indicate whether transition of the pull down type occurs in a next video track, sample, etc. subsequent to a corresponding video track, sample, etc. The original_frame_rate element may indicate a frame rate of an original video stream (captured video) in a corresponding video track, sample, or the like. That is, the element may indicate a frame rate of an original video stream prior to encoding but not a video stream encoded via pull down. The original_scan_type element may indicate scan type (progressive, interlaced) of an original video stream (captured video) in a corresponding video track, sample, or the like. The element may indicate a scan type of an original video stream prior to encoding but not a video stream encoded via pull down.

FIG. 30 is a diagram showing a method of defining frame rate information in a tkhd box according to an embodiment of the present invention. The frame rate information may be included in the aforementioned media file and may be stored/transmitted. In the present embodiment, frame rate information (parameters) may be added to a TrackHeader (tkhd) box in the aforementioned moov box. The frame rate information that is newly added to the tkhd box is now described. The tkhd box may include at least one of the following information as the frame rate related information.

The SFR_compatibility element may be a flag indicating whether a corresponding video track is compatible with a standard frame rate (SFR) or a legacy frame rate. The HFR_SFR_transition element may be a flag indicating whether transition to SFR (or legacy frame rate) from HFR occurs in a video track. In some cases, the element may be a flag indicating whether transition to SFR (or legacy frame rate) from HFR occurs in a next video track, sample, etc. subsequent to a corresponding video track, sample, etc. The SFR_HFR_transition element may be a flag indicating whether transition to HFR from SFR (or legacy frame rate) occurs in a video track. In some embodiments, the element may be a flag indicating whether transition to HFR from SFR (or legacy frame rate) occurs in a next video track, sample, etc. subsequent to a corresponding video track, sample, etc. The HFR_type_transition element may be a flag indicating whether transition to HFR type 2 from HFR type 1 occurs in a video track. In some cases, the element may be a flag indicating whether transition to HFR type 2 from HFR type 1 occurs in a next video track, sample, etc. subsequent to a corresponding video track, sample, etc. Here, when HFR type 1 is 120p, HFR type 2 may be defined as 240p. The pull_down_type element may indicate a pull down type used to form an encoded video stream included in a corresponding video track in an original video stream (captured video). For example, the element may be 3:2, 2:3, or other types. The pull_down_start_transition element may be a flag indicating whether start of pull-downed video is included in a corresponding video track. The pull_down_end_transition element may be a flag indicating whether end of pull-downed video is included in a corresponding video track. The pull_down_type_transition element may be a flag indicating whether a changed portion of the pull-downed type is included in a corresponding video track. The original_frame_rate element may indicate a frame rate of an original video stream (captured video) in a corresponding video track. As described above, the element may indicate a frame rate of an original video stream but not a video stream that is encoded to change a frame rate. The original_scan_type element may indicate a scan type (progressive, interlaced) of an original video stream (captured video) in a corresponding video track. Similarly, the element may indicate a scan type of an original video stream but not a video stream encoded to change a frame rate.

As described above, each field may be included in a track header box and may signal frame rate information.

FIG. 31 is a diagram showing a method of adding a HFR configuration box and a pull down recovery configuration box including frame rate related information to a track header box according to an embodiment of the present invention. HFRConfigurationBox and PullDownRecovery-ConfigurationBox including detailed information on a frame rate related parameter may be included in a 'tkhd' box included in a moov box of ISOBMFF. The track header box may include flag information indicating whether HFR video is additionally present in existing information, flag information indicating whether pulled-down video is present, a HFR configuration box, and a pull down recovery configuration box. The hfr_flag element may be a flag indicating whether HFR video is included in a video track. When a value of the element is 1, this may indicate that HFR video is included in a video track. In this case, the 'tkhd' box may include HFRConfigurationBox. The pull_down_flag element may be a flag indicating whether pull-down video is included in a video track. When a value of the element is 1, this may indicate that pull-down video is included in a video track and, in this case, the 'tkhd' box may include PullDownRecoveryConfigurationBox. The hfr_cfg may include a detailed parameter related to HFR of HFR video included in a video track as HFRConfigurationBox. The detailed parameter included in the HFRConfigurationBox is now described. The SFR_compatibility element may be a flag indicating whether a corresponding video track is compatible with a standard frame rate (SFR) or a legacy frame rate. The HFR_SFR_transition element may be a flag indicating whether transition to SFR (or legacy frame rate) from HFR occurs in a video track. In some embodiments, the element may be a flag indicating whether transition to SFR (or legacy frame rate) from HFR occurs in a next video track, sample, etc. subsequent to a corresponding video track, sample, etc. The SFR_HFR_transition element may be a flag indicating whether transition to HFR from SFR (or legacy frame rate) occurs in a video track. In some embodiments, the element may indicate whether transition to HFR from SFR (or legacy frame rate) occurs in a next video track, sample, etc. subsequent to a corresponding video track, sample, etc. The HFR_type_transition element may be a flag indicating whether transition to HFR type 2 from HFR type 1 occurs in a video track. In some cases, the element may be a flag indicating whether transition to HFR type 2 from HFR type 1 occurs in a next video track, sample, etc. subsequent to a corresponding video track, sample, etc. Here, when the HFR type 1 is 120p, the HFR type 2 may be defined as 240p.

The pull_down_recovery_cfg may include a pull-down recovery related detailed parameter used to form pull-down video included in a video track as PullDownRecoveryConfigurationBox as an original video source. The detailed parameter included in PullDownRecoveryConfigurationBox is now described. The pull_down_type element may indicate a pull down type used to form an encoded video stream included in a corresponding video track in an original video stream (captured video) (e.g. 3:2, 2:3, or other type). The pull_down_start_transition element may be a flag indicating whether start of pull-downed video is included in a corresponding video track. The pull_down_end_transition element may be a flag indicating whether end of pull-downed video is included in a corresponding video track. The pull_down_type_transition element may be a flag indicating whether a changed portion of the pull-downed type is included in a corresponding video track. The original_frame_rate element may indicate a frame rate of an original video stream (captured video) in a corresponding video track. A frame rate of a corresponding element may not indicate an encoded video stream with a changed frame rate. The original_scan_type element may indicate a scan type (progressive, interlaced) of an original video stream (captured video) in a corresponding video track. A scan type of a corresponding element may not indicate an encoded video stream with a changed frame rate. Definition of these fields (elements) is the same as in the above description but, in some embodiments, the HFR configuration box and the pull down recovery configuration box are present in a track header (tkhd) box and, thus, these fields may describe information on a corresponding video track.

FIG. 32 is a diagram showing a method of defining frame rate related information in a video media header (vmhd) box according to an embodiment of the present invention. As described above, frame rate information may be included in a structure of a media file and may be stored/transmitted. In the present embodiment, frame rate information (parameters) may be added to the aforementioned vmhd box in the trak box. Here, the vmhd box (video media header box) may provide general presentation related information of a corresponding video track as a lower box of the aforementioned trak box.

In an embodiment shown in an upper part of the drawing, the vmhd box may include a hfr_flag and a pull_down_flag element (field). A description of a corresponding field is the same as the above description of previous diagrams. When the hfr_flag field is set to 1, the vmhd box may include a SFR_compatibility element, a HFR_SFR_transition element, a SFR_HFR_transition element, and/or HFR_type_transition element. When the pull_down_flag field is set to 1, the vmhd box may include a pull_down_type element, a pull_down_start_transition element, a pull_down_end_transition element, a pull_down_type_transition element, an original_frame_rate element, and/or an original_scan_type element. Each element is the same as in the above description of the previous drawings.

In the embodiment shown in a lower part of the drawing, the vmhd box may include a hfr_flag and a pull_down_flag element (field). According to a value of the hfr_flag and pull_down_flag element (field), the box may further include hfr_cfg as HFRConfigurationBox and pull_down_recovery_cfg as PullDownRecoveryConfigurationBox. The hfr_flag, the pull_down_flag element, the hfr_cfg, and the pull_down_ recovery_cfg may perform the same function as fields and boxes with the same name in the aforementioned tkhd box. That is, in the shown embodiments, frame rate pieces of information included in the vmhd box may provide frame rate information on video data included in a corresponding video track.

In some embodiments, when frame rate related flags and detailed parameters are simultaneously include in the aforementioned track header (tkhd) box and video media header (vmhd) box, values of elements (fields) of the HFR flags and pull_down_flag defined in the track header box or HFRConfiguration and PullDownRecoveryConfigurationbox may be overridden by a value defined in a video media header. That is, when values defined in the both fields are different, a value in the vmhd box may be used. When frame rate information is not included in the vmhd box, frame rate information in the tkhd box may be used.

FIG. 33 is a diagram showing a method of defining frame rate information in a trex box according to an embodiment of the present invention. As described above, according to an embodiment of the present invention, frame rate information may be included in a structure of a media file and may be stored/transmitted. In the present embodiment, frame rate information (parameters) may be added to a track extends (trex) box in the aforementioned movie extends (mvex) box.

Here, the track extends (trex) box may set up default values used by each movie fragment as a lower box of the aforementioned mvex box. The box may provide a default value to reduce a space and complexity in the traf box.

The trex box may further include a default_hfr_flag element, a default_sample_hfrflag element, a default_pull_down_flag element, and/or a default_sample_pull_down_flag element. When the default_hfr_flag element is set to 1, the trex box may include default_hfr_cfg as an HFRConfiguration box. When the default_sample_hfrflag element is set to 1, the trex box may include default_sample_hfr_cfg as an HFRConfiguration box. When the default_pull_down_flag element is set to 1, the trex box may include default_pull_down_recovery_cfg as PullDownRecoveryConfigurationBox. When the default_sample_pull_down_flag element is set to 1, the trex box may include default_sample_pull_down_recovery_cfg as PullDownRecoveryConfigurationBox.

The default_hfr_flag element may be a flag indicating whether HFR video is included in a video track fragment included in the movie fragment. When a value of the element is 1, this may indicate that HFR video is included as default in a video track of movie fragments and, in this case, the element may include HFRConfigurationBox, etc. including detailed information of a HFR parameter that is commonly applicable to video samples of a corresponding track fragment. The default_sample_hfr_flag element may be a flag indicating whether HFR video samples are included in a video track fragment included in the movie fragment. When a value of the element is 1, this may indicate that HER video samples are included as default in a video track of movie fragments and, in this case, the element may include HFRConfigurationBox, etc. including HFRConfigurationBox, etc. including detailed information of an HFR parameter that is commonly applicable to video samples of a corresponding track fragment. The default_pull_down_flag element may be a flag indicating whether pull-down video is included in a video track fragment included in a movie fragment. When a value of the element is 1, this may indicate that pull-down video is included as default in a video track of movie fragments and, in this case, the element may include PullDownRecoveryConfigurationBox, etc. including detailed information of a pull-down recovery parameter that is commonly applicable to video samples of a corresponding track fragment. The default_sample_pull_down_flag element may be a flag indicating whether pull-down video samples are included in a video track fragment included in a movie fragment. When a value of the element is 1, this may indicate that pull-down video samples are included as default in a video track of movie fragments and, in this case, the element may include PullDownRecoveryConfigurationBox, etc. including detailed information of a pull-down recovery parameter that is commonly applicable to video samples of a corresponding track fragment.

Frame rate related boxes included in the trex box are now described. The default_hfr_cfg may include a HFR related detailed parameter of HFR video included in a track fragment of a movie fragment. In this case, elements in HFRConfiguration included in HFRConfigurationBox may have the same meaning as in the above description.

The default_sample_hfr_cfg may include a HFR related detailed parameter that is commonly applicable to HFR video samples included in a track fragment of a movie fragment. In this case, the elements in the HFRConfiguration included in the HFRConfigurationBox may have the same meaning as in the above description. The default_pull_down_recovery_cfg may include a pull down recovery related detailed parameter of pull-down video included in a track fragment of a movie fragment. In this case, elements in the PullDownRecoeryConfiguration included in the PullDownRecoveryConfigurationBox may indicate the same meaning as in the above proposal. The default_sample_pull_down_recovery_cfg may include a pull down recovery related detailed parameter that is commonly applicable to pull-downvideo samples included in a track fragment of a movie fragment. In this case, the elements in the PullDownRecoveryConfiguration included in the PullDownRecoveryConfigurationBox may have the same meaning as in the above proposal.

FIG. 34 is a diagram showing a method of defining frame rate information in a track fragment header (tfhd) box according to an embodiment of the present invention. As described above, frame rate information may be included in a structure of a media file and may be stored/transmitted. In the embodiment shown in an upper part of the drawing, frame rate information (parameters) may be added to the tfhd box in the aforementioned moof box.

In the embodiment shown in an upper part of the drawing, the tfhd box may include an hfr_flag and a pull_down_flag element (field). A description of a corresponding field is the same as in the above description of the previous drawings but is different in that the description of the corresponding field is given in terms of a track fragment unit. When an hfr_flag field is set to 1, the tfhd box may include a SFR_compatibility element, a HFR_SFR_transition element, a SFR_HFR_transition element, and/or a HFR_type_transition element. When a pull_down_flag field is set to 1, the tfhd box may include a pull_down_type element, a pull_down_start_transition element, a pull_down_end_transition element, a pull_down_type_transition element, an original_frame_rate element, and/or an original_scan_type element. The SFR_compatibility element may be a flag indicating whether a track fragment included in a movie fragment is compatible with a standard frame rate (SFR) or a legacy frame rate. The HFR_SFR_transition element may be a flag indicating whether transition to SFR (or legacy frame rate) from HFR occurs in a track fragment included in a movie fragment. In some cases, the element may be a flag indicating whether transition to SFR (or legacy frame rate) from HFR occurs in a next video track, sample, etc. subsequent to a corresponding video track, sample, etc. The SFR_HFR_transition element may be a flag indicating whether transition to HFR from SFR (or legacy frame rate) occurs in a track fragment included in a movie fragment. In some cases, the element may indicate whether transition to HFR from SFR (or legacy frame rate) occurs in a next video track, sample, etc. subsequent to a corresponding video track, sample, etc. The HFR_type_transition element may be a flag indicating whether transition to HFR type 2 from HFR type 1 occurs in a track fragment included in a movie fragment. In some cases, the element may be a flag indicating whether transition to HFR type 2 from HFR type 1 occurs in a next video track, sample, etc. subsequent to a corresponding video track, sample, etc. Here, when the HFR type 1 is 120p, the HFR type 2 may be defined as 240p. The pull_down_type element may be a flag indicate a pull down type used to form an encoded video stream included in a track fragment included in the movie fragment in an original video stream (captured video) (e.g. 3:2, 2:3, or other type). The pull_down_start_transition element may be a flag indicating whether a start of pull-downed video is included in a track fragment included in a movie fragment. The pull_down_end_transition element may be a flag indicating whether end of pull-downed video is included in a track fragment included in a movie fragment. The pull_down_type_transition element may be a flag indicating whether a changed portion of the pull-downed type is included in a track fragment included in a movie fragment. The original_frame_rate element may indicate a frame rate of an original video stream (captured video) but no an encoded video stream of a track fragment included in a movie fragment. The original_scan_type element may indicate a scan type (progressive, interlaced) of an original video stream (captured video) but not an encoded video stream of a track fragment included in a movie fragment.

In the embodiment shown in a lower part of the drawing, the tfhd box may include an hfr_flag and a pull_down_flag element (field). According to values of an hfr_flag and a pull_down_flag element (field), the box may further include hfr_cfg as HFRConfigurationBox and pull_down_recovery_cfg as PullDownRecoveryConfigurationBox. The hfr_flag, the pull_down_flag element, the hfr_cfg, and the pull_down_recovery_cfg may perform the same function as fields and boxes with the same name in the upper part of the drawing. The hfr_cfg may include a HFR related detailed parameter of HFR video included in a track fragment of a movie fragment. In this case, elements in HFRConfiguration included in HFRConfigurationBox may indicate the same meaning as the above proposal. The pull_down_recovery_cfg may include a pull down recovery related detailed parameter of pull down video included in a track fragment of a movie fragment. In this case, elements in PullDownRecoveryConfiguration included in PullDownRecoveryConfigurationBox may indicate the same meaning as in the above proposal. That is, in the illustrated embodiments, frame rate information in the tfhd box may provide frame rate information of video data included in a corresponding video track fragment.

FIG. 35 is a diagram showing a method of defining frame rate information in a (track fragment header (tfhd) box according to an embodiment of the present invention. As described above, frame rate information may be included in a structure of a media file and may be stored/transmitted. In the embodiment shown in the drawing, the tfhd box may further include frame rate information according to a value of the tf_flags. The tf_flags may indicate flags associated with a corresponding box. For example, when the tf_flags includes a values of 0x000001, this may indicate that base data offset information is included in the tfhd box and, when the tf_flags includes a value of 0x000002, this may indicate that sample description index information is included in the tfhd box.

According to the embodiment shown in an upper part of the drawing, when a value of the tf_flags is 0x100000 (0x100000: default-sample-hfr-configuration-present), this may indicate that a default value of HFR information on video samples included in a track fragment in a corresponding fragment is present. The value of the tf_flags indicating that frame rate information is present may have different values other than 0x100000, in some embodiments. That is, in some embodiments, when the value of the tf_flags is 0x200000 (0x200000: default-sample-pull-down-recovery-configuration-present), this may indicate that a default value of pull-down recovery information on video samples included in a track fragment in a corresponding fragment is present. In other words, when the tf_flags value has a value of 0x100000, the tfhd box may include a default_sample_hfr_cfg box as a HFR configuration box and, when the tf_flags value has a value of 0x200000, the box may include default_sample_pull_down_recovery_cfg box as a pull down recovery configuration box. The default_sample_hfr_cfg box and the default_sample_pull_down_recovery_cfg may default HFR information and pull-down recovery information that are commonly applicable to video samples including frame rate information included in a track fragment of a movie fragment. The default_sample_hfr_cfg box may include a HFR related detailed parameter that is applicable to each HFR video sample included in a track fragment of a movie fragment. In this case, elements in HFRConfiguration included in HFRConfigurationBox may indicate the same meaning as in the above proposal. The default_sample_pull_down_recovery_cfg box may include a pull down recovery related detailed parameter that is applicable to each pull down video sample included in a track fragment of a movie fragment. In this case, elements in PullDownRecoveryConfiguration included in PullDownRecoveryConfigurationBox may have the same meaning as in the above proposal.

FIG. 36 is a diagram showing a method of defining frame rate information in a track run (trun) box according to an embodiment of the present invention. As described above, frame rate information may be included in a structure of a media file and may be stored/transmitted. In the present embodiment, frame rate information (parameters) may be added to the trun box of the aforementioned traf box. When the track run box is present in the track fragment box in the movie fragment, frame rate related elements that are commonly applicable to video samples included in a track fragment may be stored and signaled, as shown in the drawing. The meaning of the information may have the same meaning as in the above proposal with regard to the track fragment header box. In the embodiment shown in a left part of the drawing, the trun box may include hfr_flag and pull_down_flag element (field). A description of a corresponding field is the same as in the above description of the previous drawings and a target indicated by the field is a track fragment unit. When a hfr_flag field is set to 1, the trun box may include a SFR_compatibility element, an HFR_SFR_transition element, an SFR_HFR_transition element, and/or an HFR_type_transition element. When the pull_down_flag field is set to 1, the trun box may include a pull_down_type element, a pull_down_start_transition element, a pull_down_end_transition element, a pull_down_type_transition element, an original_frame_rate element, and/or an original_scan_type element. When a frame rate related flags element and a detailed parameter are simultaneously included in the track fragment header(tfhd) box and the track run (trun) box, values of elements of the HFR flags and pull-down flags defined in the track header box or HFRConfiguration and PullDownRecoveryConfiguration box may be overridden by a value defined in a track run box. That is, when values of the frame rate information defined in the both fields are different, a value in the trun box may be used. When frame rate information is not included in the trun box, frame rate information in the tfhd box may be used.

According to the embodiment shown in a right part of the drawing, the trun box may include an hfr_flag and a pull_down_flag element (field) and, according to values of the hfr_flag and the pull_down_flag element, the box may further include hfr_cfg as HFRConfigurationBox and a pull_down_recovery_cfg box as PullDownRecoveryConfigurationBox, as a frame rate configuration box. The box may include frame rate information that is commonly applicable to video samples in a corresponding track fragment. Fields in the box may have the same meaning as fields or elements with same meaning of the frame rate configuration box in the aforementioned tfhd box.

FIGS. 37 and 38 are diagrams showing a method of defining frame rate information in a track run (trun) box according to another embodiment of the present invention. The present embodiment may be an embodiment in which a track run box is present in a track fragment box in a movie fragment.

In the embodiment shown in an upper part of FIG. 37, the trun box may further include frame rate information according to a value of the tr_flags. The tr_flags may indicate flags associated with a corresponding box. When a track run box is present in a track fragment box in a movie fragment, if a value of the following tr_flag is 0x002000, this may indicate that information on an HFR parameter that is commonly applicable to video samples included in a track fragment is present. When a value of the tr_flags is 0x001000, this may indicate that whether information on an HFR parameter that is applicable to each video sample in a track fragment is present. Like the HFR parameter, pull-down recovery may also be defined. That is, when a value of the tr_flag is 0x008000, this may indicate whether information on a pull-down recovery parameter that is commonly applicable to video samples included in a track fragment is present. When a value of the tr_flags is 0x004000, this may indicate that information on a pull-down recovery parameter that is commonly applicable to each video sample in a track fragment is present. The meaning of the frame rate related information corresponding to the aforementioned tr_flag is merely an embodiment and, thus, may be combined in different ways, in some embodiments.

When the tr_flags includes 0x002000, the trun box includes hfr_cfg as HFRConfigurationBox, as shown in an intermediate part of FIG. 37. In this case, attributes of the included HFRConfigurationBox may have the same meaning as elements of the proposed HFRConfigurationBox in the aforementioned track fragment header. When the tr_flags includes 0x001000, an HFR parameter corresponding to each sample may be signaled, as shown in a lower part of FIG. 37. In this case, elements of the sample_hfr_cfg as HFRConfigurationBox may have the same meaning as elements of the above proposed HFRConfigurationBox in the track fragment header. When the tr_flags includes 0x008000, the trun box may include pull_down_recovery_cfg as PullDownRecoveryConfigurationBox, as shown in an upper part of FIG. 38. In this case, the elements of the included PullDownRecoveryConfigurationBox may have the same meaning as elements of the above proposed PullDownRecoveryConfigurationBox in the track fragment header. When the tr_flags includes 0x004000, a pull down recovery parameter corresponding to each sample may be signaled, as shown in a lower part of FIG. 38. In this case, elements of sample_pull_down_recovery_cfg as PullDownRecoveryConfigurationBox☜ sample_pull_down_recovery_cfg may have the same meaning of the above proposed PullDownRecoveryConfigurationBox in the track fragment header.

FIG. 39 is a diagram showing a method of defining frame rate information in various flags or sample group entries according to an embodiment of the present invention.

In the embodiment shown in an upper part of the drawing, the illustrated frame rate related flags may be added on default_sample_flags in a trex box, default_sample_flags in a tfhd box, sample_flags in a trun box, and/or first_sample_flags in a trun box. In this case, a total of four bits of flags may be added. The above flags may refer to a combination of flags and may include a plurality of flag pieces of information.

The hfr_flag element may be a flag indicating whether a sample is a sample for HFR video. When a value of the element is 1, this may indicate that a corresponding sample is a sample of HFR video. The SFR_compatibility_flag element may be a flag indicating whether a current HFR video sample is compatible with a decoder/display for supporting SFR. When a value of the element is 1, this may indicate that a corresponding HFR video sample is compatible with SFR. In this case, in the case of a decoder/display for supporting only SFR, whether a current HFR video sample is decoded/displayed may be determined via a corresponding flag. The pull_down_flag element may be a flag indicating whether a sample is a sample of pull-down video. When a value of the element is 1, this may indicate that a corresponding sample is a sample of HFR video. The pull_down_transition_flag element may indicate that a current sample is a start point or an end point of pull-down video, or a changed point of a pull-down type. Alternatively, the pull_down_transition_flag element may indicate that a next sample after a current sample is a start point or an end point of pull-down video or a changed point of a pull-down type.

In the embodiment shown in an intermediate part of the drawing, frame rate information may be included in a visual sample group entry. When the same frame rate related flag is applied to one or more video samples present in one media file or movie fragment, frame rate flags shown in the illustrated embodiment may be further included in a visual sample group entry.

The illustrated frame rate related flags may have the same meaning as the aforementioned flags with the same name but may be described with respect to a corresponding sample group. The SFR_compatibility element may be a flag indicating whether a sample group is compatible with a standard frame rate (SFR) or a legacy frame rate.

The HFR_SFR_transition element may be a flag indicating whether transition to SFR (or legacy frame rate) from HFR occurs in a video sample group. In some cases, the element may be a flag indicating whether transition to SFR (or legacy frame rate) from HFR occurs in a next video track, sample, etc. subsequent to a corresponding video track, sample, etc. The SFR_HFR_transition element may be a flag indicating whether transition to HFR from SFR (or legacy frame rate) occurs in a video sample group. In some cases, the element may be a flag indicating whether transition to HFR from SFR (or legacy frame rate) occurs in a next video track, sample, etc. subsequent to a corresponding video track, sample, etc. The HFR_type_transition element may be a flag indicating whether transition to HFR type 2 from HFR type 1 occurs in a video sample group. In some cases, the element may be a flag indicating whether transition to HFR type 2 from HFR type 1 occurs in a next video track, sample, etc. subsequent to a corresponding video track, sample, etc. Here, when the HFR type 1 is 120p, the HFR type 2 may be defined as 240p. The pull_down_type element may be a flag indicating a pull down type used to form an encoded video stream included in a video sample group in an original video stream (captured video) (e.g. 3:2, 2:3, or other type). The pull_down_start_transition element may be a flag indicating whether start of pull-downed video is included in a video sample group. The pull_down_end_transition element may be a flag indicating whether end of pull-downed video is included in a video sample group. The pull_down_type_transition element may be a flag indicating whether a changed portion of the pull-downed type is included in a video sample group. The original_frame_rate element may indicate a frame rate of an original video stream (captured video) in a video sample group. The element is information on an original video stream but not an encoded video stream with a changed frame rate. The original_scan_type element may indicate a scan type (progressive, interlaced) of an original video stream (captured video) in a video group. The element may be information on an original video stream but not an encoded video stream with a changed frame rate.

In the embodiment shown in a lower part of the drawing, when the same HFR and pull down recovery parameter are applied to one or more samples present in one file or movie fragment, the following information may be added to HFR Configuration Box, Pull Down Recovery Configuration box, etc. of the visual sample group entry, etc. The hfr_flag element may be a flag indicting whether a sample group includes HFR video. When a value of the element is 1, this may indicate that HFR video is included in a sample group and, in this case, HFRConfigurationBox may be included in the 'tkhd' box. The pull_down_flag element may be a flag indicating whether pull-down video is included in a sample group. When a value of the element is 1, this may indicate that pull-down video is included in a sample group and, in this case, PullDownRecoveryConfigurationBox may be included in the 'tkhd' box. The hfr_cfg element may indicate that a sample group includes an HFR detailed parameter. Each element in HFRConfiguration included in HFRConfigurationBox may have the same meaning as the above proposal. The pull_down_recovery_cfg element may include a pull-down recovery related detailed parameter used to form pull-down video included in a sample group as an original video source. Elements of PullDownRecoveryConfiguration included in PullDownRecoveryConfigurationBox may have the same meaning as elements of the above proposed PullDownRecoveryConfigurationBox in the track fragment header.

FIG. 40 is a diagram showing a method of defining frame rate information in a visual sample entry according to an embodiment of the present invention. As shown in a left part of the drawing, as initialization information required to decode each of samples present in one media file or movie fragment, frame rate information associated with each sample, etc. may be further included in visual sample entry( ). The visual sample entry( ) may include a hfr_flag and a pull_down_flag element (field). When the hfr_flag field is set to 1, the visual sample entry may include a SFR_compatibility element, a HFR_SFR_transition element, a SFR_HFR_transition element, and/or a HFR_type_transition element. When the pull_down_flag field is set to 1, the visual sample entry may include a pull_down_type element, a pull_down_start_transition element, a pull_down_end_transition element, a pull_down_type_transition element, an original_frame_rate element, and/or an original_scan_type element. The SFR_compatibility element may be a flag indicating whether an associated video track/sample, etc. are compatible with a standard frame rate (SFR) or a legacy frame rate.

The HFR_SFR_transition element may be a flag indicating whether transition to SFR (or legacy frame rate) from HFR occurs in an associated video track/sample, etc. In some embodiments, the element may indicate a flag indicating whether transition to SFR (or legacy frame rate) from HFR occurs in a next video track, sample, etc. subsequent to a corresponding video track, sample, etc. The SFR_HFR_transition element may be a flag indicating whether transition to HFR from SFR (or legacy frame rate) occurs in an associated video track/sample, etc. In some cases, the element may be a flag indicating whether transition to HFR from SFR (or legacy frame rate) occurs in a next video track, sample, etc. subsequent to a corresponding video track, sample, etc. The HFR_type_transition element may be a flag indicating whether transition to HFR type 2 from HFR type 1 occurs in an associated video track/sample, etc. In some cases, the element may be a flag indicating whether transition to HFR type 2 from HFR type 1 occurs in a next video track, sample, etc. subsequent to a corresponding video track, sample, etc. Here, when the HFR type 1 is 120p, the HFR type 2 may be defined as 240p. The pull_down_type element may be a flag indicating a pull down type used to form an encoded video stream included in an associated video track/sample, etc. in an original video stream (captured video) (e.g. 3:2, 2:3, or other type). The pull_down_start_transition element may be a flag indicating whether start of pull-downed video is included in an associated track/sample, etc. The pull_down_end_transition element may be a flag indicating whether end of pull-downed video is included in an associated video track/sample, etc. The pull_down_type_transition element may be a flag indicating whether an associated video track/sample, etc. are includes a changed portion of the pull-downed type. The original_frame_rate element may be a frame rate of an original video stream (captured video) of an associated video track/sample, etc. The element may be information on an original video stream but not an encoded video stream with a changed frame rate. The original_scan_type element may indicate a scan type (progressive, interlaced) of an original video stream (captured video) of an associated video track/sample, etc. This may be information on an original video stream but not an encoded video stream with a changed frame rate.

In the embodiment shown in a right part of the drawing, when the HFR and pull down recovery parameter associated with each sample, etc., are applied as initialization information required to decode each of samples present in one file or movie fragment, the following information, e.g., HFR Configuration Box and Pull Down Recovery Configuration box, may be added to an visual sample entry. The hfr_flag element may be a flag indicating whether HFR video is included in an associated video/sample, etc. When a value of the element is 1, this may indicate that HFR video is included in an associated video track/sample, etc. and, in this case, HFRConfigurationBox may be included in the 'tkhd' box. The pull_down_flag element may be a flag indicating whether pull-down video is included in an associated video track/sample, etc. When a value of the element is 1, this may indicate that pull-down video is included in a sample group and, in this case, PullDownRecoveryConfigurationBox may be included in the 'tkhd' box. The hfr_cfg element may include an HFR detailed parameter associated with an associated video track/sample, etc. Attributes in HFRConfiguration included in HFRConfigurationBox may have the same meaning as in the above proposal. The pull_down_recovery_cfg element may include a pull-down recovery related detailed parameter used to form a pull-down video included in an associated video tram/sample, etc. as an original video source. The elements of PullDownRecoveryConfiguration included in PullDownRecoveryConfigurationBox may have the same meaning as elements of the above proposed PullDownRecoveryConfigurationBox in the track fragment header.

FIG. 41 is a diagram showing a method of defining frame rate information in an HEVC sample entry, an HEVC configuration box, or an HEVC decoder configuration record according to an embodiment of the present invention.

In the embodiment shown in an upper part of the drawing, frame rate information may be included in HEVCSampleEntry. The information may be initialization information required for decoding each of HEVC samples present in a media file or a movie fragment and, in this regard, frame rate information related to each HEVC sample, etc. may be added as shown in the drawing. The added frame rate information may be added in the form of the aforementioned HFRConfigurationBox and/or PullDownRecoveryConfigurationBox in some embodiments. In some embodiments, the frame rate information may be added to HEVCLHVCSampleEntry, LHEVCSampleEntry, HEVCTileSampleEntry, LHEVCTileSampleEntry, AVCSampleEntry, AVC2SampleEntry, SVCSampleEntry, MVCSampleEntry, and so on in the same way.

In the embodiment shown in an intermediate part of the drawing, the frame rate information may be include in HEVCConfigurationBox. The information may be initialization information required for decoding each of HEVC samples present in a media file or a movie fragment and, in this regard, the frame rate information related to each HEVC sample, etc. may be added as shown in the drawing. The added frame rate information may be added in the form of the aforementioned HFRConfigurationBox and/or PullDownRecoveryConfigurationBox, in some embodiments. In some embodiments, the frame rate information may be included in HEVCLHVCSampleEntry, LHEVCSampleEntry, HEVCTileSampleEntry, LHEVCTileSampleEntry, AVCSampleEntry, AVC2SampleEntry, SVCSampleEntry, and/or MVCSampleEntry, etc. in the same way.

In the embodiment shown in a lower part of the drawing, frame rate information may be included in HEVCDecoderConfigurationRecord. The information may be initialization information required for decoding each of HEVC samples present in a media file or a movie fragment and, in this regard, the frame rate information related to each HEVC sample, etc. may be added, as shown in the drawing. The added frame rate information may be added in the form of the aforementioned HFRConfigurationBox and/or PullDownRecoveryConfigurationBox, in some embodiments. In this case, whether FRConfigurationBox and/or PullDownRecoveryConfigurationBox are added may be signaled by an hfr_flag and/or a pull_down_flag element. In some embodiments, the frame rate information may be added to HEVCLHVCSampleEntry, LHEVCSampleEntry, HEVCTileSampleEntry, LHEVCTileSampleEntry, AVCecoderConfigurationRecord, SVCecoderConfigurationRecord, and/or MVCecoderConfigurationRecord, etc. in the same way.

FIG. 42 is a diagram illustrating a method of defining a frame rate information SEI box and storing/transmitting frame rate information according to an embodiment of the present invention. As shown in an upper part of the drawing, as the frame rate information SEI box, HFRInformationSEIBox (hisb) D42010 and PullDownRecoveryInfoSEIBox (pdri) D42020 may be defined. The box may include an SEI NAL unit and the SEI NAL unit may have an SEI message including frame rate related information. Hisb and pdri as the frame rate information SEI box may include hfrinfosei and pdrinfosei, respectively. The hfrinfosei may include a SEI NAL including a HFR information SEI message. The pdrinfosei may include an SEI NAL unit including the pull down recovery information SEI message.

In the embodiment shown in the intermediate and lower parts of the drawing, hisb and pdri as a frame rate information SEI box may be included in a visual sample entry D42030, an HEVC configuration box D42040, and/or an HEVC sample entry D42050. In some embodiments, hisb and pdri may be included in an AVC sample entry, an MVC sample entry, an SVC sample entry, HEVCLHVCSampleEntry, LHEVCSampleEntry, HEVCTileSampleEntry, and/or LHEVCTileSampleEntry.

The method proposed by the present invention may be applied when HFR is supported and a file of pull down content is generated based on ISOBMFF or an MPU operable on a DASH segment or MPEG MMT operable on MPEG DASH is generated. In this regard, a decoder, etc. of a reception device (which includes a DASH client, a MMT client, etc.) may effectively decode/display corresponding content based on HFR related metadata (a flag, a parameter, etc.).

HFRConfigurationBox and PullDownRecoveryConfiguration including a parameter for the above proposed HFR and pull down related flag or HFR and pull down recovery may be simultaneously included in one ISOBMFF file or DASH segment, and in boxes in MMT MPU. In this case, a HFR related flag and pull down related flag defined in a higher box or HFR parameter values and pull down recovery parameter values may be overridden by values defined n a lower box. For example, when HFR related flags and a detailed parameter are simultaneously included in a track header (tkhd) box and a video media header (vmhd) box, values of elements of HFR flags defined in a track header box or HFRConfiguration box may be overridden by a value defined in a video media header.

Figure 43:
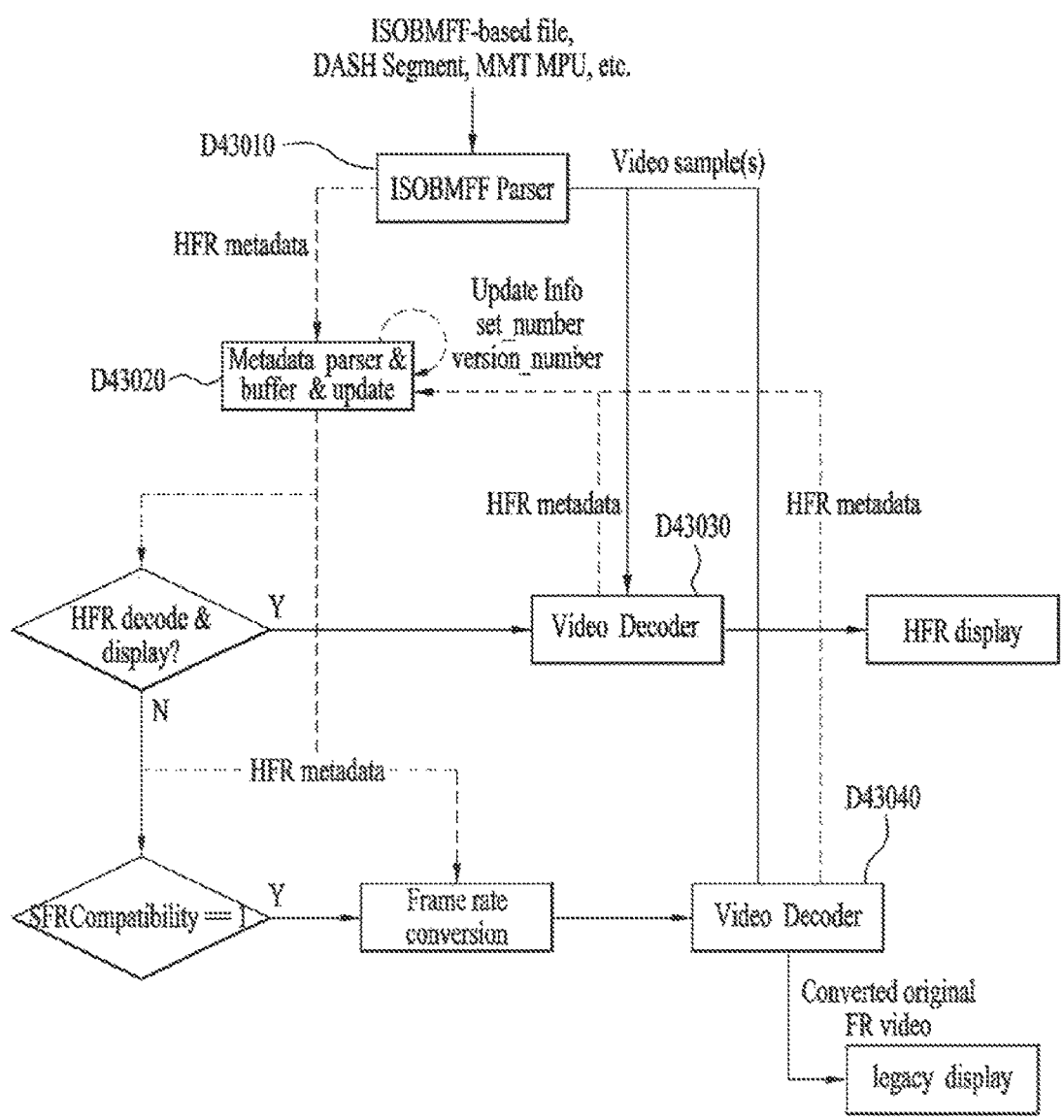
FIG. 43 is a diagram showing a media engine operation of a reception device based on HFR information processing capability according to an embodiment of the present invention.

FIG. 43 is a diagram showing a media engine operation of a reception device based on HFR information processing capability according to an embodiment of the present invention. A parser (ISOBMFF parser) D43010 of the reception device may parse an ISOBMFF-based media file, a DASH segment, and/or an MMT MPU, etc. According to a parsing result, video samples may be transmitted to video decoders D43030 and D43040 and frame rate information (high frame rate (HFR) and metadata) may be transmitted to a metadata parser D43020. The ISOBMFF parser may be a hardware block and may be referred to as a parsing processor or a parsing circuit. Here, a first video decoder D43030 and a second video decoder D43040 may be decoders included in different reception devices and, in some embodiments, may be simultaneously included in one reception device.

The video decoder may decode video samples to acquire HFR video data. When HFR information acquired in this procedure is present, the information may be transmitted to the metadata parser. The metadata parser may parse the received HFR metadata. Here, control information, etc. required in the video decoder may be transmitted to the video decoder or may be used to convert a frame rate prior to decoding using the acquired HFR metadata. The metadata parser may function as a buffer or may update metadata. The update may be performed using set_number, version_number, etc. The video decoder and the metadata parser may be a hardware block and may be referred to as a decoding processor and a metadata parsing processor or a decoding circuit and a metadata parsing circuit, respectively.

Subsequent operations may be changed according to decoding capability of HFR video of the reception device. A reception device that is capable of performing HFR decode and display may decode HFR video transmitted from the ISOBMFF parser using the video decoder D43030 and may display HFR video content using an HFR display. A reception device that is not capable of performing HFR decode and display may determine whether corresponding HFR video data has standard frame rate (SFR) capability. When the data has SFR compatibility, the reception device may perform frame rate conversion using the HFR metadata received from the metadata parser. The reception device may decode frame rate-converted video data with SFR using the video decoder D43040 and may display the converted original frame rate video data.

As such, the frame rate information according to the present invention may be used to transmit HFR related information to the reception device and, thus HFR video data may be adaptively decoded and displayed according to performance of the reception device.

Figure 44:
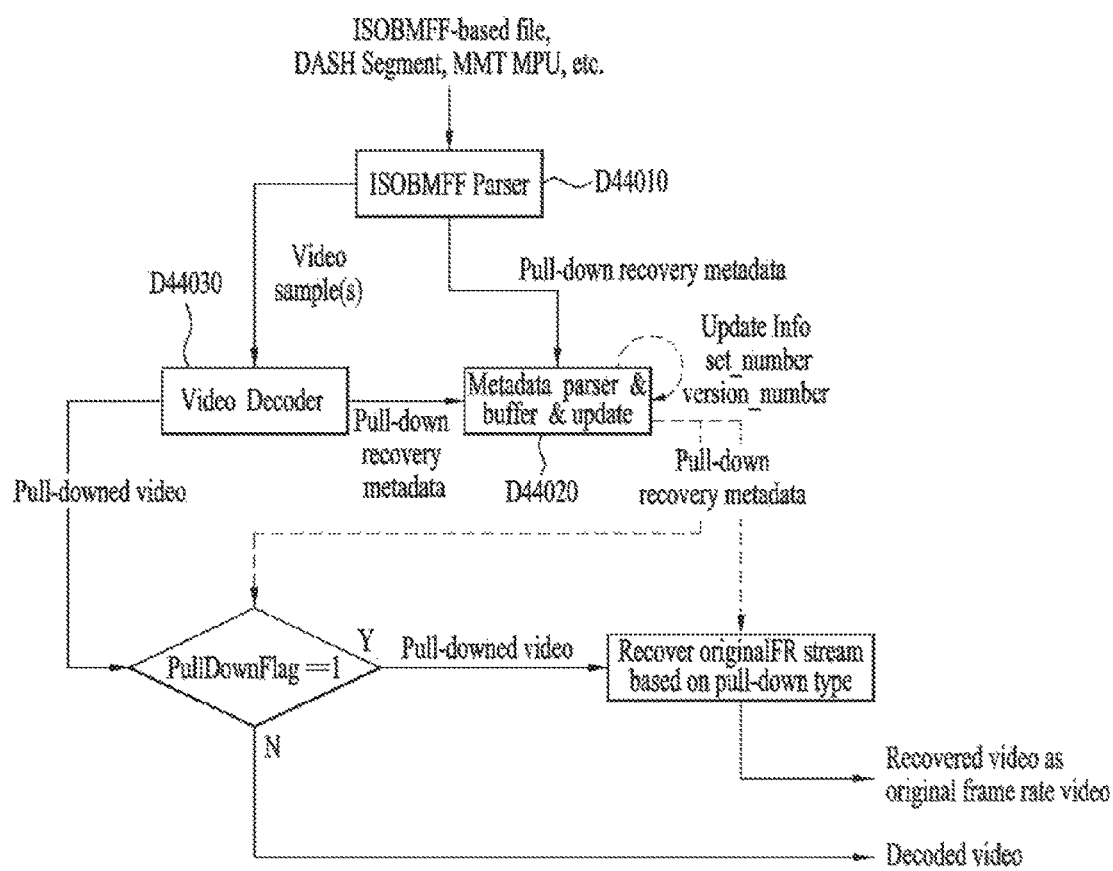
FIG. 44 is a diagram showing a media engine operation of a reception device based on pull down recovery information according to an embodiment of the present invention.

FIG. 44 is a diagram showing a media engine operation of a reception device based on pull down recovery information according to an embodiment of the present invention. A parser (ISOBMFF parse) D44010 of the reception device may parser an ISOBMFF-based media file, a DASH segment, and/or a MMT MPU, etc. According to a parsing result, video samples may be transmitted to the video decoder D43030 and pull down recovery information (pull-down recovery metadata) may be transmitted to the metadata parser D44020. The ISOBMFF parser may be a hardware parser and may be referred to as a parsing processor or a parsing circuit. The video decoder may decode video samples to acquire pull-downed video data. When pull-down recovery information acquired in this procedure is present, the information may be transmitted to the metadata parser. The metadata parser may parse the received pull-down recovery metadata. The reception device may perform an original frame rate recover operation using the acquired pull-down recovery metadata. The metadata parser may function as a buffer and may update metadata. The update may be performed using set_number, version_number, etc. The video decoder and the metadata parser may be a hardware block and may be referred to as a decoding processor and a metadata parsing processor or a decoding circuit and a metadata parsing circuit, respectively.

Subsequent operations may be changed according to whether decoded video data is pull-downed video data. When pulldownflag information indicating whether the above acquired pull-down recovery metadata is pull-downed video data is set to 1, that is, when the decoded video data is pull-downed video data, the reception device may restore an original frame rate. The reception device may restore pull-downed video data to original frame rate data based on pull-down type information included in pull-down recovery metadata. The reception device may display the restored video as video content of the original frame rate. When pulldownflag information indicating whether the above acquired pull-down recovery metadata is pull-downed video data is set to 0, that is, when the decoded video data is not pull-downed video data, the reception device may display the decoded video data without changes. As described above, the pull-down recovery metadata according to an embodiment of the present invention may be used to transmit information on the pull-downed video data to the reception device and, thus, the reception device may restore the pull-downed video data to an original frame rate and display the data.

Figure 45:
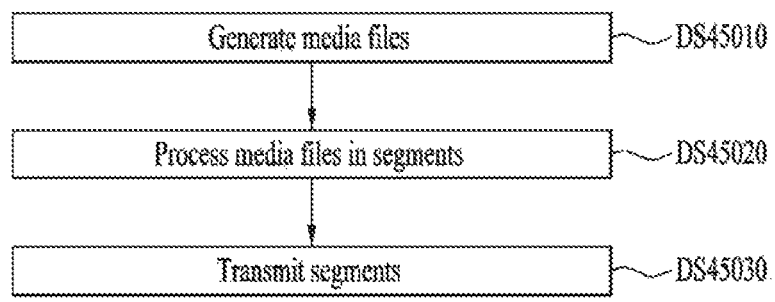
FIG. 45 is a diagram showing a method of receiving a broadcast signal according to an embodiment of the present invention.

FIG. 45 is a diagram showing a method of receiving a broadcast signal according to an embodiment of the present invention. The broadcast signal transmitting method according to an embodiment of the present invention may include generating media files (DS45010), processing media files in segments (DS45020), and transmitting the segments (DS45030).

In the generating of the media files, video components may be generated as the aforementioned ISOBMFF media file. In this operation, the aforementioned frame rate information may be included in an ISOBMFF media file and may be signaled. The frame rate information may be included and transmitted in a specific box in a media file and may be included and transmitted in an SEI box, as described above with reference to FIGS. 29 to 42. In the processing of the media files in the segments, the aforementioned ISOBMFF media file may be segmented to generate a plurality of segments. In the transmitting of the segments, the generated segments may be transmitted to a reception end via broadcast or broadband. Here, the frame rate information may be signaled via a box in ISOBMFF divided into segments.

Figure 46:
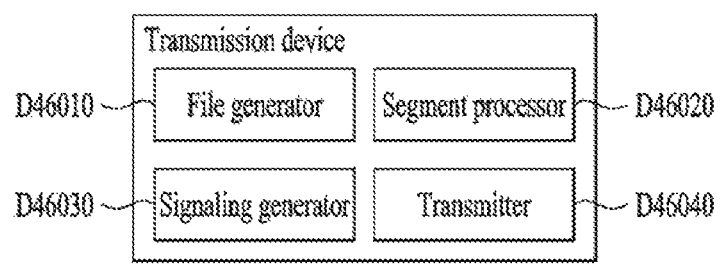
FIG. 46 is a diagram showing a broadcast signal transmission device according to an embodiment of the present invention.

FIG. 46 is a diagram showing a broadcast signal transmission device according to an embodiment of the present invention. The broadcast signal transmission device according to an embodiment of the present invention may include a media file generator D46010, a segment processor D46020, a signaling generator D46030, and/or a transmitter D46040.

The media file generator may generate a video content component as the aforementioned ISOBMFF media file. The media file generator may include the aforementioned frame rate information in the ISOBMFF media file. The frame rate information may be included in a specific box in the media file or an SEI box, as described above with reference to FIGS. 29 to 42.

The segment processor for processing media files in segments may segment the aforementioned ISOBMFF media file to generate a plurality of segments. The transmitter may transmit the generated segment and MPD to the reception end via broadcast or broadband. Here, the frame rate information may be signaled through a box in ISOBMFF divided into segments.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

MODE FOR CARRYING OUT THE PRESENT INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method of processing by a device for transmitting a broadcast signal, the method comprising:
    generating additional frames for increasing a frame rate of video data;
    encoding the video data with the additional frames by repeating or interpolating original frames included in the video date and
    signaling information for the video data with the increased frame rate, the signaling information including a flag indicating that a frame in the video data with the increased frame rate is an additional frame;
    generating a broadcast signal comprising the encoded video data and the encoded signaling information; and
    transmitting the generated broadcast signal.

2. The method according to claim 1, wherein when the frame in the video data with the increased frame rate is the additional frame, a value of the flag is set to 1.

3. The method according to claim 2,
    wherein the additional frame is a frame generated by repeating the original frame.

4. The method according to claim 1, wherein the signaling information comprises information indicating the original frame matched with a frame included in the video data prior to increase in a frame rate among frames included in the video data with the increased frame rate.

5. The method according to claim 1, wherein the signaling information comprises frame rate information, the frame rate information comprises information on an original frame rate prior to increase in the frame rate, and the signaling information is transmitted as separate signaling data of the video data.

6. The method according to claim 1, wherein the video data is encoded as International Organization for Standardization base media file format (ISOBMFF), the signaling information is included in the video data encoded as the ISOBMFF and is transmitted therewith, and the signaling information further comprises information on conversion of the frame rate and information of compatibility of the frame rate.

7. The method according to claim 1, wherein the signaling information is a Supplemental Enhancement Information (SEI) message of the encoded video data and is transmitted with the encoded video data.

8. A method of processing by a device for receiving a broadcast signal, the method comprising:

receiving a broadcast signal comprising video data with an increased frame rate compared with original video data and signaling information for the video data with the increased frame rate;

extracting the video data with the increased frame rate and the signaling information from the received broadcast signal, the signaling information including a flag indicating that a frame in the video data with the increased frame rate is an additional frame; and decoding the video data with the increased frame rate using the extracted signaling information, the decoding comprising:

selecting frames matched with frames included original video data among frames included in the video data.

9. The method according to claim 8, wherein when the frame in the video data with the increased frame rate is the additional frame, a value of the flag is set to 1.

10. The method according to claim 9, wherein the additional frame is a frame generated by repeating the original frame.

11. The method according to claim 8, wherein the additional frame corresponds to a duplicated frame included in the video data with the increased frame rate are generated via repetition or interpolation.

12. The method according to claim 8, wherein the signaling information comprises frame rate information, the frame rate information is included in the encoded video data and is received, and the method further comprises converting the video data with the increased frame rate into a frame rate of the original video data.

13. The method according to claim 8, wherein the signaling information is a Supplemental Enhancement Information (SEI) message of the encoded video data and is transmitted with the encoded video data.

14. A broadcast signal transmission device comprising:

an encoder to generate additional frames for increasing a frame rate of video data and to encode the video data with the additional frames by repeating or interpolating original frames included in the video data and to encode signaling information for the video data with the increased frame rate, the signaling information including a flag indicating that a frame in the video data with the increased frame rate is an additional frame; and a transmitter to transmit a broadcast signal comprising the encoded video data and the encoded signaling information.

15. A broadcast signal reception device comprising:

a receiver to receive a broadcast signal comprising video data with a increased frame rate compared with original video data and signaling information for the video data with the increased frame rate;

an extractor to extract the video data with the increased frame rate and the signaling information from the received broadcast signal, the signaling information including a flag indicating that a frame in the video data with the increased frame rate is an additional frame; and a decoder to decode the video data with the increased frame rate using the extracted signaling information, the decoding comprising:

selecting frames matched with frames included original video data among frames included in the video data.

* * * * *